US012649498B2

(12) United States Patent
Oba

(10) Patent No.: US 12,649,498 B2
(45) Date of Patent: *Jun. 9, 2026

(54) INFORMATION PROCESSING APPARATUS, MOVING APPARATUS, AND METHOD, AND PROGRAM

(71) Applicant: Sony Semiconductor Solutions Corporation, Kanagawa (JP)

(72) Inventor: Eiji Oba, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,173

(22) Filed: May 13, 2024

(65) Prior Publication Data

US 2024/0294194 A1 Sep. 5, 2024

Related U.S. Application Data

(63) Continuation of application No. 17/292,380, filed as application No. PCT/JP2019/041476 on Oct. 23, 2019, now Pat. No. 11,993,293.

(30) Foreign Application Priority Data

Nov. 15, 2018 (JP) ................................. 2018-214753

(51) Int. Cl.
*B60W 60/00* (2020.01)
*B60W 40/06* (2012.01)
(Continued)

(52) U.S. Cl.
CPC ........ *B60W 60/0061* (2020.02); *B60W 40/06* (2013.01); *B60W 40/08* (2013.01);
(Continued)

(58) Field of Classification Search
CPC .. B60W 60/0061; B60W 40/06; B60W 40/08; B60W 50/14; B60W 60/0015;
(Continued)

(56) References Cited

U.S. PATENT DOCUMENTS

| | | | |
|---|---|---|---|
| 10,319,039 B1 | 6/2019 | Konrardy et al. | |
| 2015/0006012 A1 | 1/2015 | Kammel et al. | |

(Continued)

FOREIGN PATENT DOCUMENTS

| | | | |
|---|---|---|---|
| DE | 102015001686 B4 | 3/2017 | |
| EP | 3 378 722 A1 | 9/2018 | |

(Continued)

OTHER PUBLICATIONS

Espacenet English translation of DE102015001686B4 (Year: 2015).*

(Continued)

*Primary Examiner* — James J Lee
*Assistant Examiner* — Andrew Sang Kim
(74) *Attorney, Agent, or Firm* — Wolf, Greenfield & Sacks, P.C.

(57) ABSTRACT

Evacuation control such as deceleration or stop of a vehicle is executed in response to an application from a driver of the vehicle for refusal of switching to manual driving. It is a moving apparatus that is switchable between automatic driving and manual driving and includes a driver information acquisition unit that acquires driver information of a driver of the moving apparatus, an environmental information acquisition unit that acquires surrounding information of the moving apparatus, a takeover abandonment input unit that inputs, to a system, takeover refusal information for a driver to refuse driving takeover to change automatic driving of the moving apparatus to manual driving, and a data processing unit that checks a switching point from automatic driving to manual driving on the basis of information (Continued)

10 AUTOMOBILE

15 NOTIFICATION UNIT (DISPLAY UNIT)

DISPLAY INFORMATION EXAMPLE

DURING AUTOMATIC DRIVING

PLEASE SWITCH TO MANUAL DRIVING acquired by the environmental information acquisition unit and executes a manual driving return request notification to the driver before reaching the switching point, in which the data processing unit further executes an evacuation process of a vehicle in response to a takeover abandonment input.

17 Claims, 38 Drawing Sheets

(51) Int. Cl.
  *B60W 40/08* (2012.01)
  *B60W 50/14* (2020.01)
(52) U.S. Cl.
  CPC ........ *B60W 50/14* (2013.01); *B60W 60/0015* (2020.02); *B60W 60/0053* (2020.02); *B60W 60/0057* (2020.02); *B60W 60/0059* (2020.02); *B60W 2050/146* (2013.01); *B60W 2556/10* (2020.02)
(58) Field of Classification Search
  CPC ......... B60W 60/0053; B60W 60/0057; B60W 60/0059; B60W 2050/146; B60W 2556/10; B60W 50/082; B60W 50/085; B60W 2540/215; B60W 2540/221; B60W 2540/223; B60W 2540/225; B60W 2540/229; B60W 2556/40; B60W 50/10; B60W 2050/007; G08G 1/16; G05D 1/0061
  See application file for complete search history.

(56) References Cited

U.S. PATENT DOCUMENTS

| | | | |
|---|---|---|---|
| 2015/0120124 A1 | 4/2015 | Bartels et al. | |
| 2016/0378114 A1* | 12/2016 | Laur | G05D 1/0061 |
| | | | 701/23 |
| 2017/0234689 A1 | 8/2017 | Gibson et al. | |
| 2017/0291560 A1 | 10/2017 | Schroeder et al. | |
| 2018/0046185 A1* | 2/2018 | Sato | G05D 1/0088 |
| 2018/0081358 A1* | 3/2018 | Laur | G01C 21/3807 |
| 2018/0088574 A1 | 3/2018 | Latotzk et al. | |

| | | | |
|---|---|---|---|
| 2018/0173231 A1 | 6/2018 | Takae et al. | |
| 2018/0329414 A1 | 11/2018 | Igarashi | |
| 2018/0374002 A1* | 12/2018 | Li | G06F 3/017 |
| 2019/0056732 A1 | 2/2019 | Aoi et al. | |
| 2019/0179309 A1* | 6/2019 | Mizutani | B60K 28/02 |
| 2022/0009524 A1 | 1/2022 | Oba | |

FOREIGN PATENT DOCUMENTS

| | | | |
|---|---|---|---|
| JP | 2002-163799 A | 6/2002 | |
| JP | 2014-106854 A | 6/2014 | |
| JP | 2015044432 A | 3/2015 | |
| JP | 2017-97518 A | 6/2017 | |
| JP | 2017-157067 A | 9/2017 | |
| JP | 2017-170973 A | 9/2017 | |
| JP | 2017188127 A | 10/2017 | |
| JP | 2018055691 A | 4/2018 | |
| KR | 20180026243 A | 3/2018 | |
| WO | WO-2016199379 A1 | 12/2016 | |
| WO | WO-2017085981 A1 | 5/2017 | |
| WO | WO 2018/135318 A1 | 7/2018 | |

OTHER PUBLICATIONS

Gene, Tesla Autopilot v8.0 restrictions: three strikes and you're out, Sep. 26, 2016, TESLARATI, https://www.teslarati.com/tesla-autopilot-version-8-0-nags-restrictions/ (Year: 2016).*

International Search Report and English translation thereof mailed Dec. 10, 2019 in connection with International Application No. PCT/JP2019/041476.

International Written Opinion and English translation thereof mailed Dec. 10, 2019 in connection with International Application No. PCT/JP2019/041476.

International Preliminary Report on Patentability and English translation thereof mailed May 27, 2021 in connection with International Application No. PCT/JP2019/041476.

Extended European Search Report for European Application No. 19884337.7 dated Nov. 19, 2021.

†U.S. Appl. No. 17/292,380, filed May 7, 2021, Oba.

PCT/JP2019/041476, Dec. 10, 2019, *International Search Report.

PCT/JP2019/041476, Dec. 10, 2019, *International Written Opinion.

PCT/JP2019/041476, May 27, 2021, *International Preliminary Report on Patentability.

EP19884337.7, Nov. 19, 2021, *Extended European Search Report.

* cited by examiner

10 AUTOMOBILE

30 SERVER

20 DRIVER

14 COMMUNICATION UNIT

11 DATA PROCESSING UNIT

12 DRIVER INFORMATION ACQUISITION UNIT

15 NOTIFICATION UNIT
(DISPLAY UNIT/AUDIO OUTPUT UNIT/VIBRATOR AND THE LIKE)

13 ENVIRONMENTAL INFORMATION ACQUISITION UNIT

DISPLAY INFORMATION EXAMPLE

DURING
AUTOMATIC DRIVING

PLEASE SWITCH TO
MANUAL DRIVING

10 AUTOMOBILE

15 NOTIFICATION UNIT (DISPLAY UNIT)

(a) NOTIFICATION PROCESS IN CASE WHERE AWAKENING LEVEL OF DRIVER WHILE EXECUTING AUTOMATIC DRIVING IS HIGH (b) NOTIFICATION PROCESS IN CASE WHERE AWAKENING LEVEL OF DRIVER WHILE EXECUTING AUTOMATIC DRIVING IS LOW

FIG. 5

(a) DRIVER SEAT

50 INFORMATION TERMINAL (b) LUGGAGE COMPARTMENT

50 INFORMATION TERMINAL

50 INFORMATION TERMINAL

DURING AUTOMATIC DRIVING

PLEASE SWITCH TO MANUAL DRIVING

20 DRIVER

50 INFORMATION TERMINAL

*FIG. 13*

GREEN YELLOW RED

Sb

Sc

Sa

Sb

Sc

Sa

Sd

Sa

Sc

Sb

Sa

Sd

Sa

FIG. 17
(b)
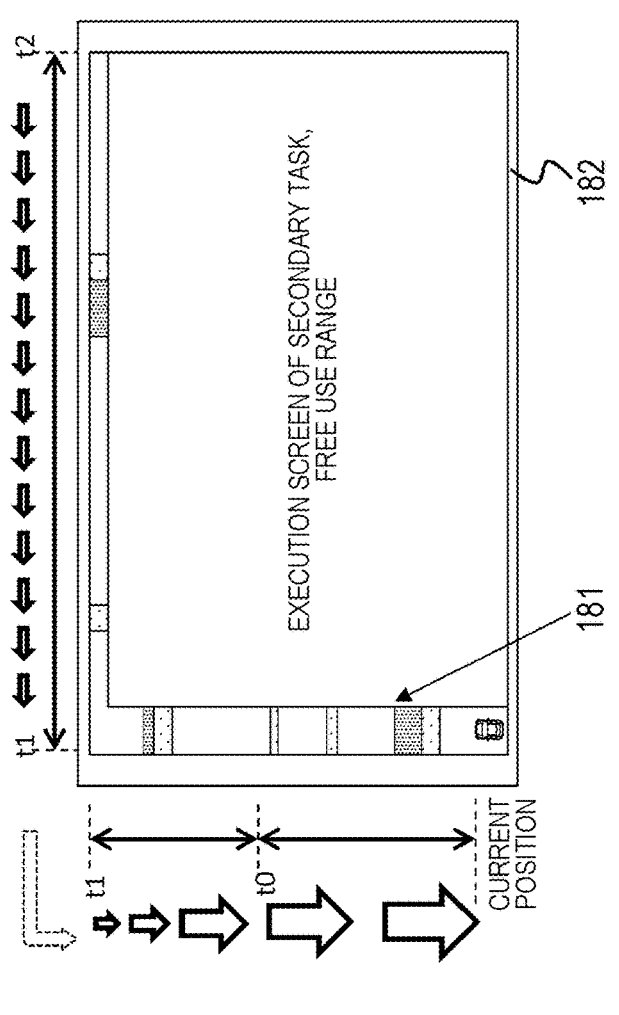
(a)
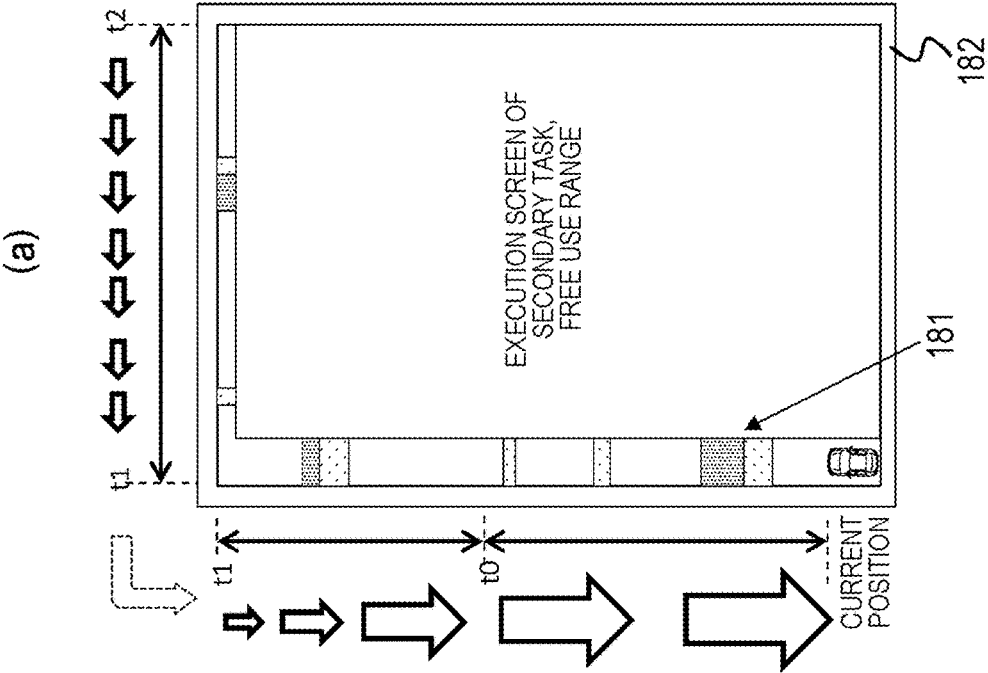

Figure 19:
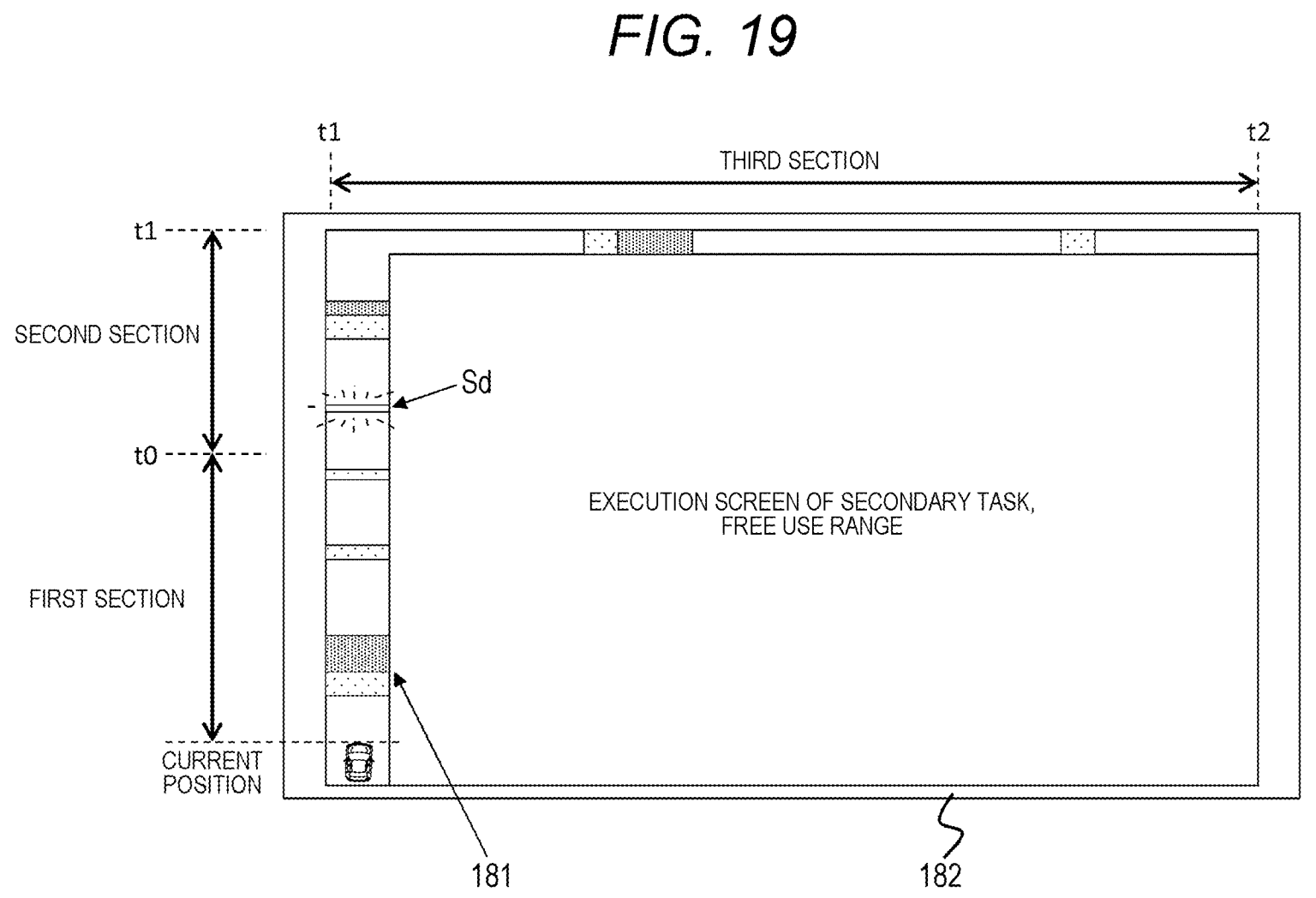

EXECUTION SCREEN OF SECONDARY TASK, FREE USE RANGE

THIRD SECTION

SECOND SECTION

FIRST SECTION

CURRENT POSITION

50 INFORMATION TERMINAL (a) TIME t1

Figure 22:
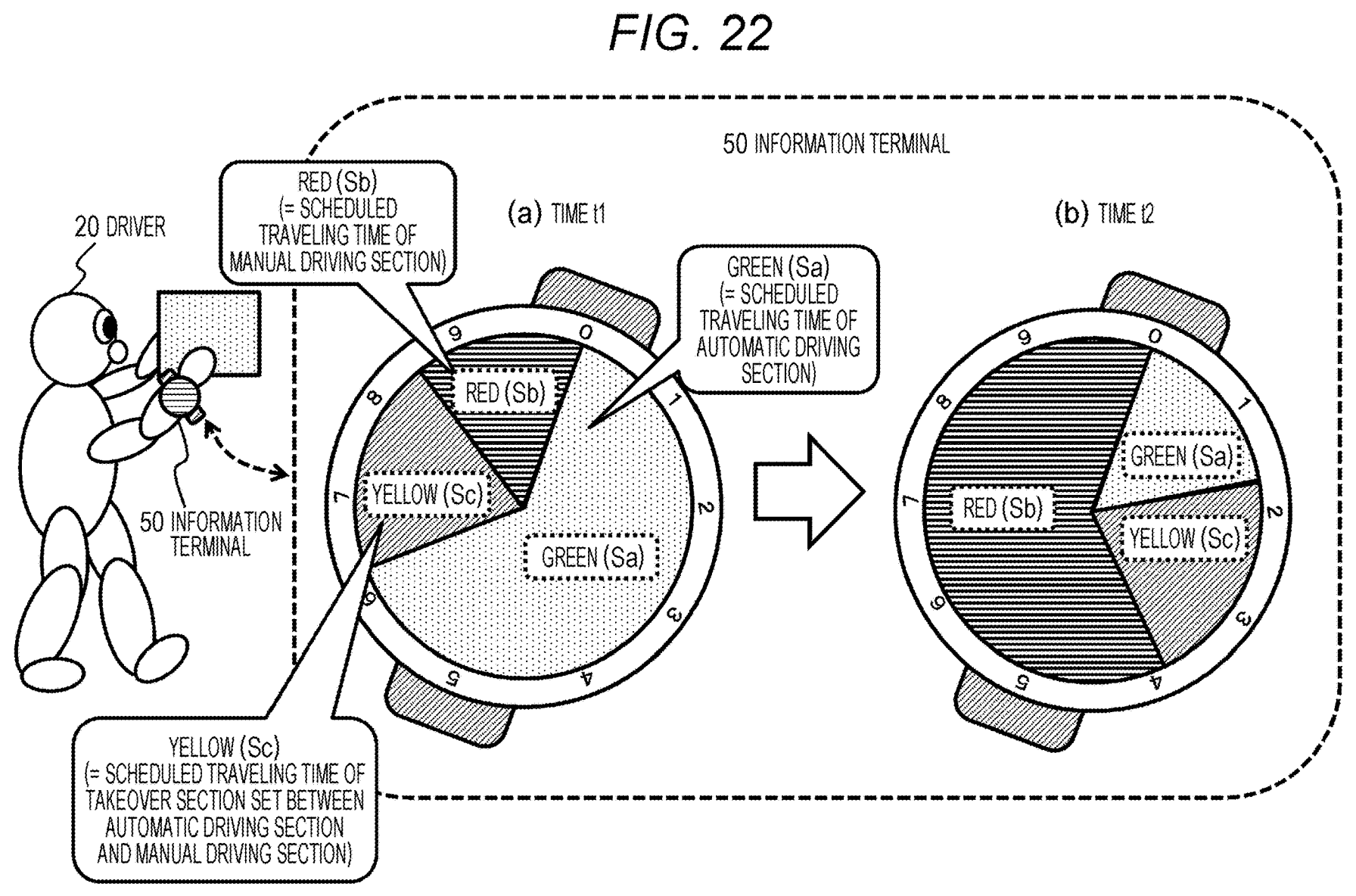

(b) TIME t2

GREEN (Sa)
(= SCHEDULED TRAVELING TIME OF AUTOMATIC DRIVING SECTION)

RED (Sb)
(= SCHEDULED TRAVELING TIME OF MANUAL DRIVING SECTION)

YELLOW (Sc)
(= SCHEDULED TRAVELING TIME OF TAKEOVER SECTION SET BETWEEN AUTOMATIC DRIVING SECTION AND MANUAL DRIVING SECTION)

20 DRIVER

50 INFORMATION TERMINAL

1: DRIVER STEERING
   INTERACTIVE EVALUATION

2: SITTING  LINE-OF-SIGHT AND POSTURE WHILE DRIVING
   Saccade EYEBALL OR THE LIKE OBSERVABLE EVALUATION

3: SITTING AND DRIVING POSTURE  USING TERMINAL

4: NON-DRIVING POSTURE
   IRREGULAR ROTATION SITTING

5: SITTING  DRIVING POSTURE EVALUATION

6: IN CASE OF DOZE
   RETURN TIME DELAY DISTRIBUTION

FIG. 27

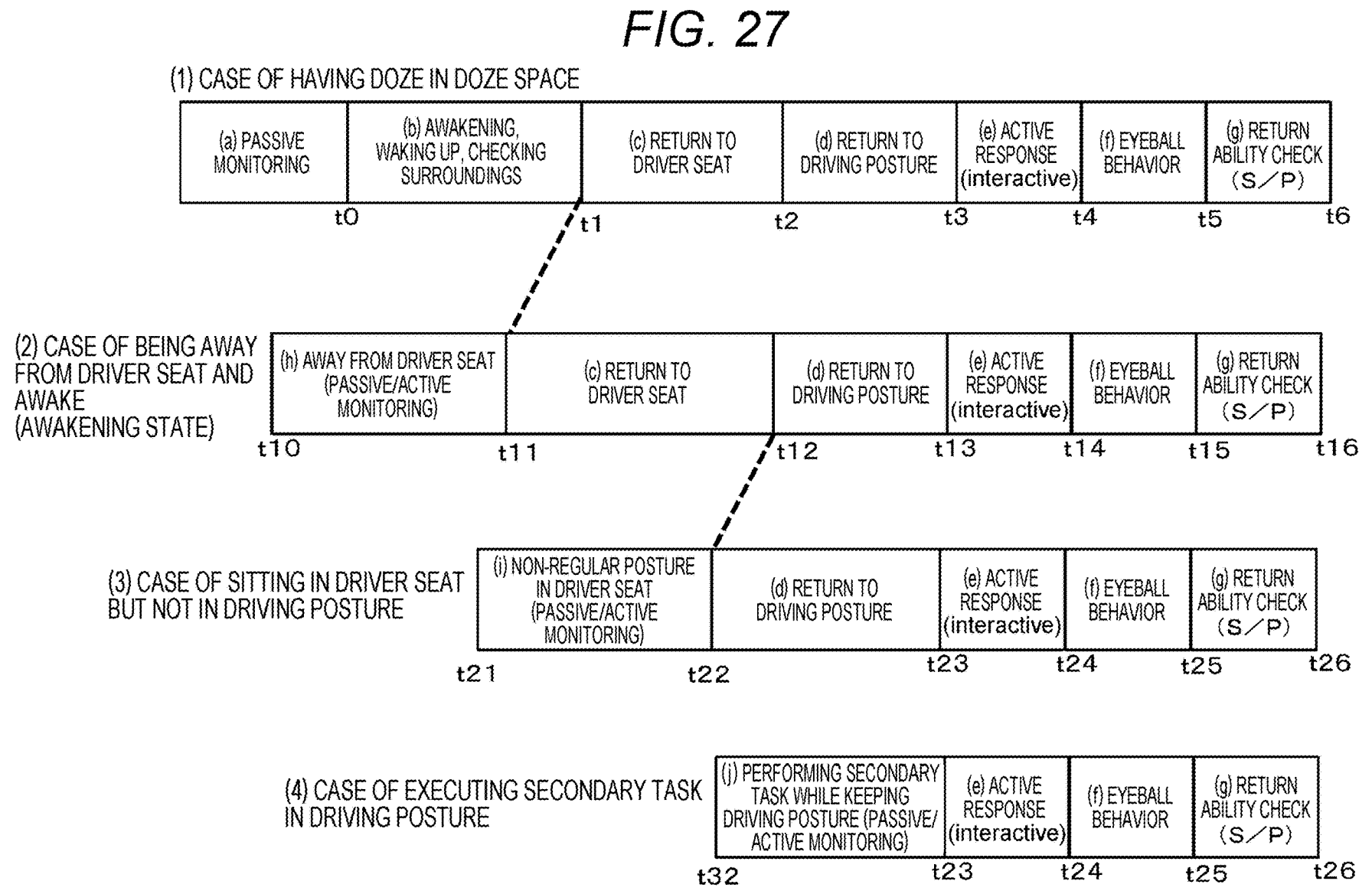

(1) CASE OF HAVING DOZE IN DOZE SPACE

| (a) PASSIVE MONITORING | (b) AWAKENING, WAKING UP, CHECKING SURROUNDINGS | (c) RETURN TO DRIVER SEAT | (d) RETURN TO DRIVING POSTURE | (e) ACTIVE RESPONSE (interactive) | (f) EYEBALL BEHAVIOR | (g) RETURN ABILITY CHECK (S／P) |
|---|---|---|---|---|---|---|
| t0 | t1 | t2 | | t3 | t4 | t5 | t6 |

(2) CASE OF BEING AWAY FROM DRIVER SEAT AND AWAKE (AWAKENING STATE)

| (h) AWAY FROM DRIVER SEAT (PASSIVE/ACTIVE MONITORING) | (c) RETURN TO DRIVER SEAT | (d) RETURN TO DRIVING POSTURE | (e) ACTIVE RESPONSE (interactive) | (f) EYEBALL BEHAVIOR | (g) RETURN ABILITY CHECK (S／P) |
|---|---|---|---|---|---|
| t10 | t11 | t12 | t13 | t14 | t15 | t16 |

(3) CASE OF SITTING IN DRIVER SEAT BUT NOT IN DRIVING POSTURE

| (i) NON-REGULAR POSTURE IN DRIVER SEAT (PASSIVE/ACTIVE MONITORING) | (d) RETURN TO DRIVING POSTURE | (e) ACTIVE RESPONSE (interactive) | (f) EYEBALL BEHAVIOR | (g) RETURN ABILITY CHECK (S／P) |
|---|---|---|---|---|
| t21 | t22 | t23 | t24 | t25 | t26 |

(4) CASE OF EXECUTING SECONDARY TASK IN DRIVING POSTURE

| (j) PERFORMING SECONDARY TASK WHILE KEEPING DRIVING POSTURE (PASSIVE/ ACTIVE MONITORING) | (e) ACTIVE RESPONSE (interactive) | (f) EYEBALL BEHAVIOR | (g) RETURN ABILITY CHECK (S／P) |
|---|---|---|---|
| t32 | t23 | t24 | t25 | t26 |

*FIG. 28*

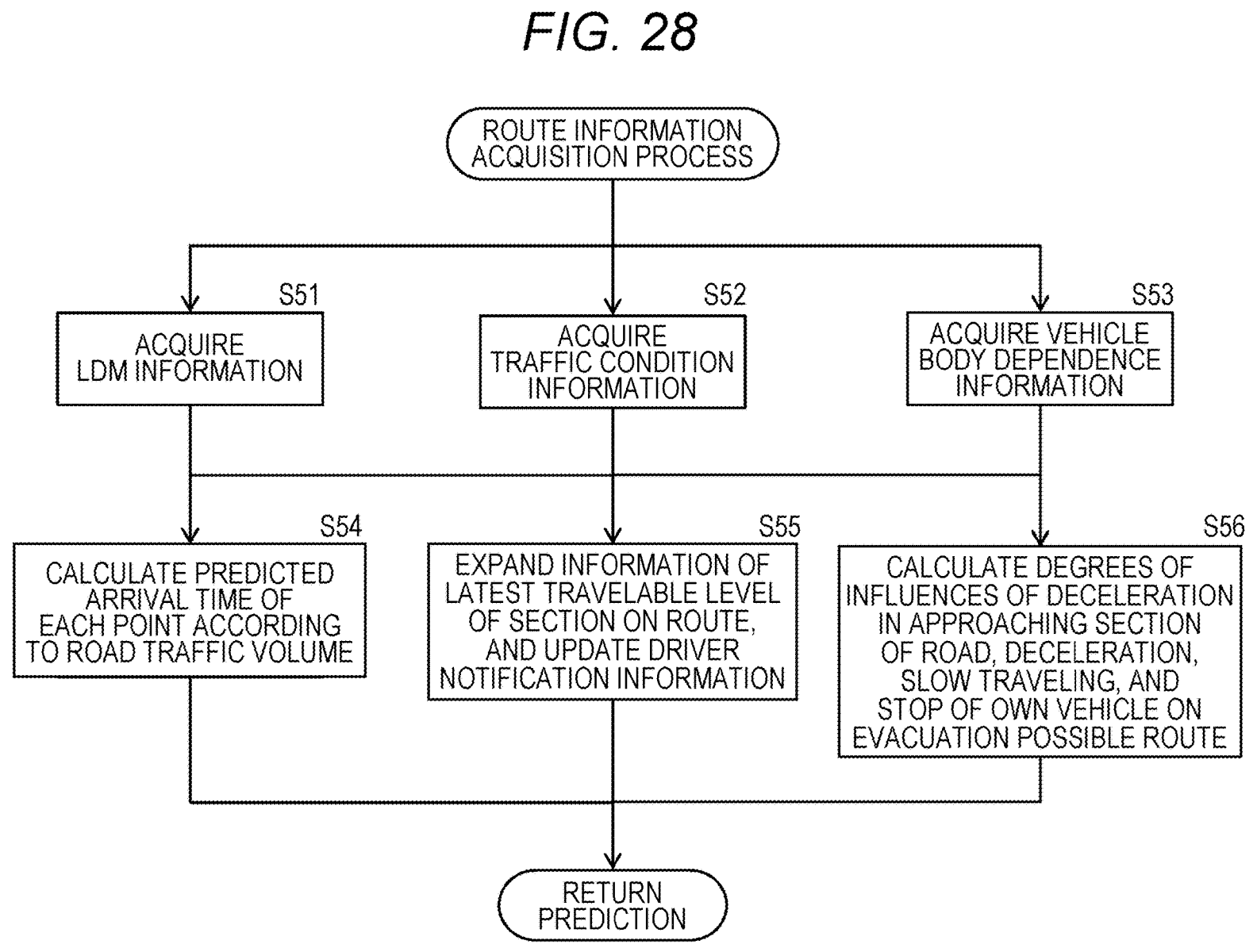

ROUTE INFORMATION ACQUISITION PROCESS

S51
ACQUIRE LDM INFORMATION

S52
ACQUIRE TRAFFIC CONDITION INFORMATION

S53
ACQUIRE VEHICLE BODY DEPENDENCE INFORMATION

S54
CALCULATE PREDICTED ARRIVAL TIME OF EACH POINT ACCORDING TO ROAD TRAFFIC VOLUME

S55
EXPAND INFORMATION OF LATEST TRAVELABLE LEVEL OF SECTION ON ROUTE, AND UPDATE DRIVER NOTIFICATION INFORMATION

S56
CALCULATE DEGREES OF INFLUENCES OF DECELERATION IN APPROACHING SECTION OF ROAD, DECELERATION, SLOW TRAVELING, AND STOP OF OWN VEHICLE ON EVACUATION POSSIBLE ROUTE

RETURN PREDICTION

INFORMATION PROCESSING APPARATUS, MOVING APPARATUS, AND METHOD, AND PROGRAM

CROSS-REFERENCE TO RELATED APPLICATIONS

The present application claims the benefit under 35 U.S.C. § 120 as a continuation application of U.S. application Ser. No. 17/292,380, filed on May 7, 2021, now U.S. Pat. No. 11,993,293, which claims the benefit under 35 U.S.C. § 371 as a U.S. National Stage Entry of International Application No. PCT/JP2019/041476, filed in the Japanese Patent Office as a Receiving Office on Oct. 23, 2019, which claims priority to Japanese Patent Application Number JP2018-214753, filed in the Japanese Patent Office on Nov. 15, 2018, each of which is hereby incorporated by reference in its entirety.

TECHNICAL FIELD

The present disclosure relates to an information processing apparatus, a moving apparatus, and a method, and a program. More specifically, the present disclosure relates to an information processing apparatus, a moving apparatus, and a method, and a program for controlling switching between automatic driving and manual driving.

BACKGROUND ART

Nowadays, technological development related to automatic driving is being actively carried out.

Automatic driving technology is technology that enables automatic driving on a road by using various sensors such as position detection means provided in a vehicle (automobile), and is expected to spread rapidly in the future.

However, at present, automatic driving is in the development stage, and it is thought that it takes time before 100% automatic driving becomes possible. For a while, it is predicted that traveling is performed while switching between automatic driving and manual driving by the driver as appropriate.

For example, on a straight road with a sufficient road width such as a highway, the vehicle travels in the automatic driving mode, but in a case where the vehicle leaves the highway and stops at a desired position in a parking lot, or on a narrow mountain road or the like, it is predicted that it will be necessary to switch the mode, such as switching to the manual driving mode and performing traveling by operation of the operator (driver).

While the vehicle is performing automatic driving, the operator (driver) does not have to look forward that is the traveling direction of the vehicle, and can take free action such as napping, watching TV, reading a book, or sitting backwards and talking with a person in the back seat, for example.

In a vehicle that travels by switching between automatic driving and manual driving, in a case where it becomes necessary to switch from the automatic driving mode to the manual driving mode, it is necessary to cause the operator (driver) to start manual driving.

However, for example, if the driver naps while executing automatic driving, the awakening level of the driver decreases. That is, it becomes a state that the consciousness level is lowered. If it is switched to the manual driving mode in such a state that the awakening level is lowered, normal manual driving cannot be performed, and an accident can occur in the worst case.

In order to ensure driving safety, it is necessary to cause the driver to start manual driving in a state that the driver is highly awake, that is, in a state of clear consciousness.

If the vehicle enters a manual driving traveling section from an automatic driving traveling possible section and the automatic driving function is interrupted while the ability of the driver to return to driving is insufficient, an accident can occur and it is dangerous.

In order to avoid such danger, for example, in a case where the system on the vehicle side cannot detect the ability of the driver to return to manual driving, it has been proposed to automatically perform emergency stopping or decelerating, or moving and traveling to an evacuation zone of the vehicle.

Note that as a conventional technique that discloses a configuration for controlling emergency stop or the like in a case where a situation such as a vehicle breakdown occurs while executing automatic driving, for example, there is Patent Document 1 (Japanese Patent Application Laid-Open No. 2017-157067).

The configuration disclosed in the above document is an emergency stop processing in the event of a vehicle breakdown while executing automatic driving, and does not disclose a response when switching to manual driving.

In the future, it is predicted that the automatic driving traveling possible sections will expand not only to expressways but also to general roads, and it is presumed that the need will increase for alternately traveling in automatic driving traveling possible sections and manual driving traveling sections where automatic driving is not allowed.

In such various road environments, in a case where the driver cannot return to manual driving, it is necessary to reliably perform stopping or decelerating, or moving to an evacuation zone, or the like of the vehicle.

However, if emergency stop or deceleration, or movement and travel to an evacuation zone are frequently executed, there is a problem that a rear-end collision risk of a following vehicle or traffic congestion is likely to occur.

CITATION LIST

Patent Document

Patent Document 1: Japanese Patent Application Laid-Open No. 2017-157067

SUMMARY OF THE INVENTION

Problems to be Solved by the Invention

The present disclosure is made in view of, for example, the above-mentioned problems, and it is an object thereof to provide an information processing apparatus, a moving apparatus, and a method, and a program capable of safely switching from automatic driving to manual driving.

In one embodiment of the present disclosure, it is an object to provide an information processing apparatus, a moving apparatus, and a method, and a program that enable the driver to refuse to switch from automatic driving to manual driving and that perform safe control in a case where the driver refuses to do so.

Solutions to Problems

A first aspect of the present disclosure is an information processing apparatus including:

a takeover abandonment input unit that inputs, to a system, takeover refusal information for a driver to refuse driving takeover to change automatic driving of a vehicle to manual driving; and a data processing unit that executes an evacuation process of an automatic driving vehicle in response to an input from the takeover abandonment input unit.

Moreover, a second aspect of the present disclosure is a moving apparatus that is switchable between automatic driving and manual driving, the moving apparatus including:

a driver information acquisition unit that acquires driver information of a driver of the moving apparatus;

an environmental information acquisition unit that acquires surrounding information of the moving apparatus;

a takeover abandonment input unit that inputs, to a system, takeover refusal information for a driver to refuse driving takeover to change automatic driving of the moving apparatus to manual driving; and a data processing unit that checks a switching point from automatic driving to manual driving on the basis of information acquired by the environmental information acquisition unit and executes a manual driving return request notification to the driver before reaching the switching point, in which the data processing unit further executes an evacuation process of an automatic driving vehicle in response to an input from the takeover abandonment input unit.

Moreover, a third aspect of the present disclosure is an information processing method to be executed in an information processing apparatus, the method including executing, by a data processing unit:

a step of detecting an input to a system of takeover refusal information for a driver to refuse driving takeover to change automatic driving of a vehicle to manual driving; and a step of executing an evacuation process of an automatic driving vehicle in response to an input of the takeover abandonment information.

Moreover, a fourth aspect of the present disclosure is an information processing method to be executed in a moving apparatus, the moving apparatus being switchable between automatic driving and manual driving, the method including:

a driver information acquisition step of acquiring, by a driver information acquisition unit, driver information of a driver of the moving apparatus;

an environmental information acquisition step of acquiring, by an environmental information acquisition unit, surrounding information of the moving apparatus; and by a data processing unit, executing a step of checking a switching point from automatic driving to manual driving on the basis of information acquired by the environmental information acquisition unit and executing a manual driving return request notification to the driver before reaching the switching point, a step of detecting an input to a system of takeover refusal information for a driver to refuse driving takeover to change automatic driving of the moving apparatus to manual driving, and a step of executing an evacuation process of an automatic driving vehicle in response to an input of the takeover abandonment information.

Moreover, a fifth aspect of the present disclosure is a program for causing an information processing apparatus to execute information processing including executing, by a data processing unit:

a step of detecting an input to a system of takeover refusal information for a driver to refuse driving takeover to change automatic driving of a vehicle to manual driving; and a step of executing an evacuation process of an automatic driving vehicle in response to an input of the takeover abandonment information.

Note that a program of the present disclosure is a program that can be provided by, for example, a storage medium or a communication medium provided in a computer-readable format to an information processing apparatus or a computer system that can execute various program codes. By providing such a program in a computer-readable format, processing corresponding to the program is implemented on the information processing apparatus or the computer system.

Other objects, features, and advantages of the present disclosure will become apparent from a more detailed description based on embodiments of the present disclosure described below and the accompanying drawings. Note that a system in the present description is a logical set configuration of a plurality of devices, and is not limited to one in which devices with respective configurations are in the same housing.

Effects of the Invention

According to a configuration of one embodiment of the present disclosure, a configuration is achieved in which evacuation control such as deceleration or stop of a vehicle is executed in response to an application from the driver of the vehicle for refusal of switching to manual driving.

Specifically, for example, it is a moving apparatus that is switchable between automatic driving and manual driving and includes a driver information acquisition unit that acquires driver information of a driver of the moving apparatus, an environmental information acquisition unit that acquires surrounding information of the moving apparatus, a takeover abandonment input unit that inputs, to a system, takeover refusal information for a driver to refuse driving takeover to change automatic driving of the moving apparatus to manual driving, and a data processing unit that checks a switching point from automatic driving to manual driving on the basis of information acquired by the environmental information acquisition unit and executes a manual driving return request notification to the driver before reaching the switching point, in which the data processing unit further executes an evacuation process of a vehicle by an optimized method in response to a takeover abandonment input.

With this configuration, a configuration is achieved in which evacuation control such as deceleration or stop of a vehicle is executed in response to an application from the driver of the vehicle for refusal of switching to manual driving.

Note that effects described in the present description are merely examples and are not limited, and additional effects may be provided.

BRIEF DESCRIPTION OF DRAWINGS

FIG. 5 is a diagram describing an example of actions of a driver in the moving apparatus of the present disclosure.

FIG. 6 is a diagram describing an example of data display for a terminal held by the driver.

FIG. 7 is a diagram describing an example of data display for a terminal held by the driver.

FIG. 13 is a diagram illustrating an example of a traveling route in which an automatic driving possibility section determined by a driver setting a destination is set in a spot or has occurred.

FIG. 17 is a diagram illustrating an example of traveling section display in a traveling route displayed on a screen of a tablet terminal device (hereinafter, simply referred to as "tablet").

FIG. 18 is a diagram illustrating an example of a state in which a driver is actually executing a secondary task using a tablet.

FIG. 19 is a diagram illustrating a state in which a cautious traveling section Sd is newly generated in a second section and a blinking display warns the driver.

FIG. 20 is a diagram illustrating a state in which a small window is popped up on the screen of the tablet.

FIG. 22 is a diagram describing a usage configuration example of the information terminal of the present disclosure.

FIG. 27 is a diagram describing an example of a transition and transition timing of a state change according to different initial states of a driver.

FIG. 28 is a diagram illustrating a flowchart describing a sequence example of a route information acquisition process.

MODE FOR CARRYING OUT THE INVENTION

Figure 1:
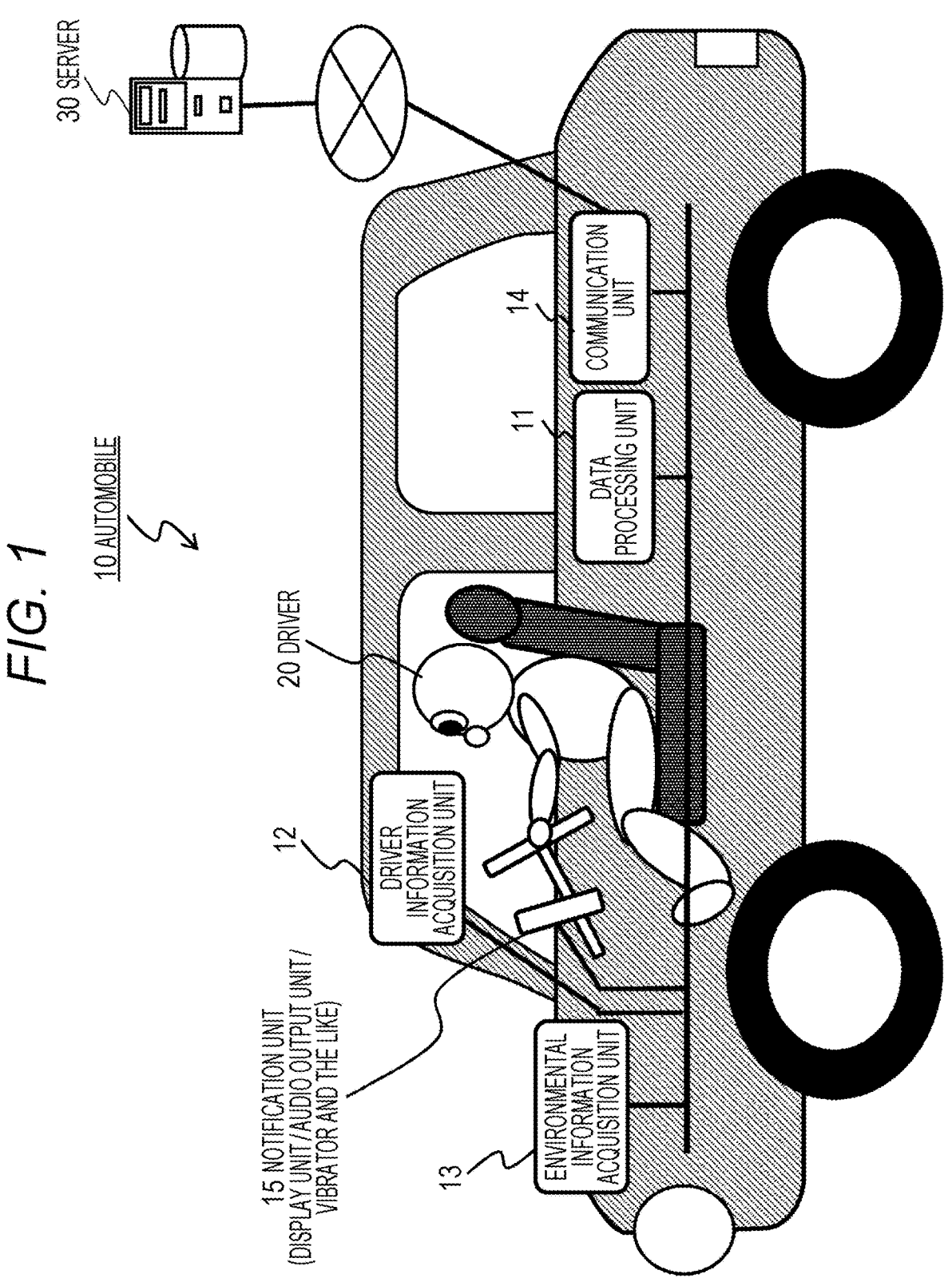
FIG. 1 is a diagram describing a configuration example of a moving apparatus of the present disclosure.

Hereinafter, details of an information processing apparatus, a moving apparatus, and a method, and a program of the present disclosure will be described with reference to the drawings. Note that the description will be made according to the following items.

1. Outline of configuration and processing of moving apparatus and information processing apparatus
2. Specific configuration and processing example of moving apparatus
3. Mode switching sequence from automatic driving mode to manual driving mode
4. Operation sequence example of automatic driving
5. Configuration for performing response process in case where takeover to manual driving is difficult
5-1. Specific examples in case where takeover to manual driving is difficult
5-2. Configuration example of apparatus that executes response in case where takeover to manual driving is difficult 5-3. Specific examples of detection of manual driving return point based on traveling route information and manual driving return necessary time calculation process based on manual driving return time estimation 5-4. Sequence of processing that allows manual driving takeover abandonment by driver 5-5. Processing in case where driver or passenger expresses intention to abandon takeover to manual driving 5-6. Processing example when approaching manual driving switching point 5-7. Pre-processing and post-processing for input of abandonment (rejection) of manual driving takeover from driver or passenger 5-8. Configuration example of information processing apparatus that executes processing for takeover abandonment input 6. Configuration example of information processing apparatus 7. Summary of configuration of present disclosure

1. Outline of Configuration and Processing of Moving Apparatus and Information Processing Apparatus First, the outline of a configuration and processing of the moving apparatus and the information processing apparatus will be described with reference to FIG. 1 and so on.

The moving apparatus of the present disclosure is, for example, an automobile capable of traveling by switching between automatic driving and manual driving.

In such an automobile, in a case where it becomes necessary to switch from an automatic driving mode to a manual driving mode, it is necessary to cause the operator (driver) to start manual driving.

However, there are various processes (secondary tasks) performed by the driver during execution of automatic driving.

For example, just by taking the hands off the steering wheel, the driver may be looking at the front of the automobile similarly to when driving, may be reading a book, or may be napping.

Due to differences in these processes, the awakening level (consciousness level) of the driver will be different.

For example, napping reduces the awakening level of the driver. That is, it becomes a state that the consciousness level is lowered. In such a state that the awakening level is lowered, normal manual driving cannot be performed, and if it is switched to the manual driving mode in this state, an accident may occur in the worst case.

In order to ensure driving safety, it is necessary to cause the driver to start manual driving in a state that the driver is highly awake, that is, in a state of clear consciousness.

For this purpose, it is necessary to change a notification timing for requesting switching from automatic driving to manual driving according to the awakening level of the driver while executing automatic driving.

For example, in a case where the driver is looking forward at the road while executing automatic driving, the awakening level of the driver is high, that is, manual driving can be started at any time.

In such a case, the notification of switching to manual driving is only required to be given at a timing immediately before a time when manual driving is necessary. This is because the driver can immediately start safe manual driving.

However, in a case where the driver is napping while executing automatic driving, the awakening level of the driver is extremely low.

In such a case, if the notification of switching to manual driving is given at the timing immediately before a time when manual driving is required, the driver has no choice but to start manual driving in a state that the consciousness is not clear. Consequently, the possibility of causing an accident increases. Therefore, in a case where the awakening level is low as described above, it is necessary to perform the notification of switching to manual driving at an earlier stage.

The moving apparatus of the present disclosure or the information processing apparatus that can be mounted on the moving apparatus controls, for example, the notification timing of switching to manual driving according to the awakening level of the driver.

With reference to FIG. 1 and so on, configurations and processing of the moving apparatus of the present disclosure and the information processing apparatus that can be mounted in the moving apparatus will be described.

FIG. 1 is a diagram illustrating a configuration example of an automobile 10 which is an example of the moving apparatus of the present disclosure.

The information processing apparatus of the present disclosure is mounted in the automobile 10 illustrated in FIG. 1.

The automobile 10 illustrated in FIG. 1 is an automobile capable of driving in two driving modes, a manual driving mode and an automatic driving mode.

In the manual driving mode, traveling based on the operation of the operator (driver) 20, that is, a steering wheel operation, an operation of accelerator or brake, or the like is performed.

On the other hand, in the automatic driving mode, the operation by the operator (driver) 20 is not necessary, and driving based on sensor information such as a position sensor and other surrounding information detection sensors is performed, for example.

For example, the position sensor is a GPS receiver or the like, and the surrounding information detection sensor is, for example, a camera, an ultrasonic sensor, a radar, a LiDAR (Light Detection and Ranging, Laser Imaging Detection and Ranging), a sonar, or the like.

Note that FIG. 1 is a diagram describing an outline of the present disclosure and schematically illustrates main components. A detailed configuration will be described later.

As illustrated in FIG. 1, the automobile 10 has a data processing unit 11, a driver information acquisition unit 12, an environmental information acquisition unit 13, a communication unit 14, and a notification unit 15.

The driver information acquisition unit 12 acquires, for example, information for determining the awakening level of the driver, operation information of the driver, and the like. Specifically, the driver information acquisition unit 12 includes, for example, a camera that captures a face image of the driver, an operation information acquisition unit of each operating unit (steering wheel, accelerator, brake, or the like), and the like.

The environmental information acquisition unit 13 acquires traveling environment information of the automobile 10. For example, it is image information of the front, rear, left, and right of the automobile, position information by GPS, surrounding obstacle information from a LiDAR (Light Detection and Ranging, Laser Imaging Detection and Ranging), a sonar, or the like, and the like.

The data processing unit 11 inputs driver information acquired by the driver information acquisition unit 12 and environmental information acquired by the environmental information acquisition unit 13, and calculates a safety index value indicating whether or not the driver in the vehicle during automatic driving is in a state of being capable of executing safe manual driving, and moreover indicating whether or not the driver who is manually driving is executing safe driving, or the like.

Moreover, for example, in a case where it becomes necessary to switch from the automatic driving mode to the manual driving mode, a process of giving notification via the notification unit 15 is executed so as to switch to the manual driving mode.

The timing of this notification processing is, for example, an optimum timing calculated by inputting from the driver information acquisition unit 12 and the environmental information acquisition unit 13.

That is, the timing is set so that the driver 20 can start safe manual driving.

Specifically, a process is performed such that, in a case where the awakening level of the driver is high, the notification is performed immediately before, for example, five seconds before a manual driving start time, and in a case where the awakening level of the driver is low, processing is performed with a margin such as performing twenty seconds before the manual driving start time. The calculation of the optimum timing for specific notification will be described later.

Figure 2:
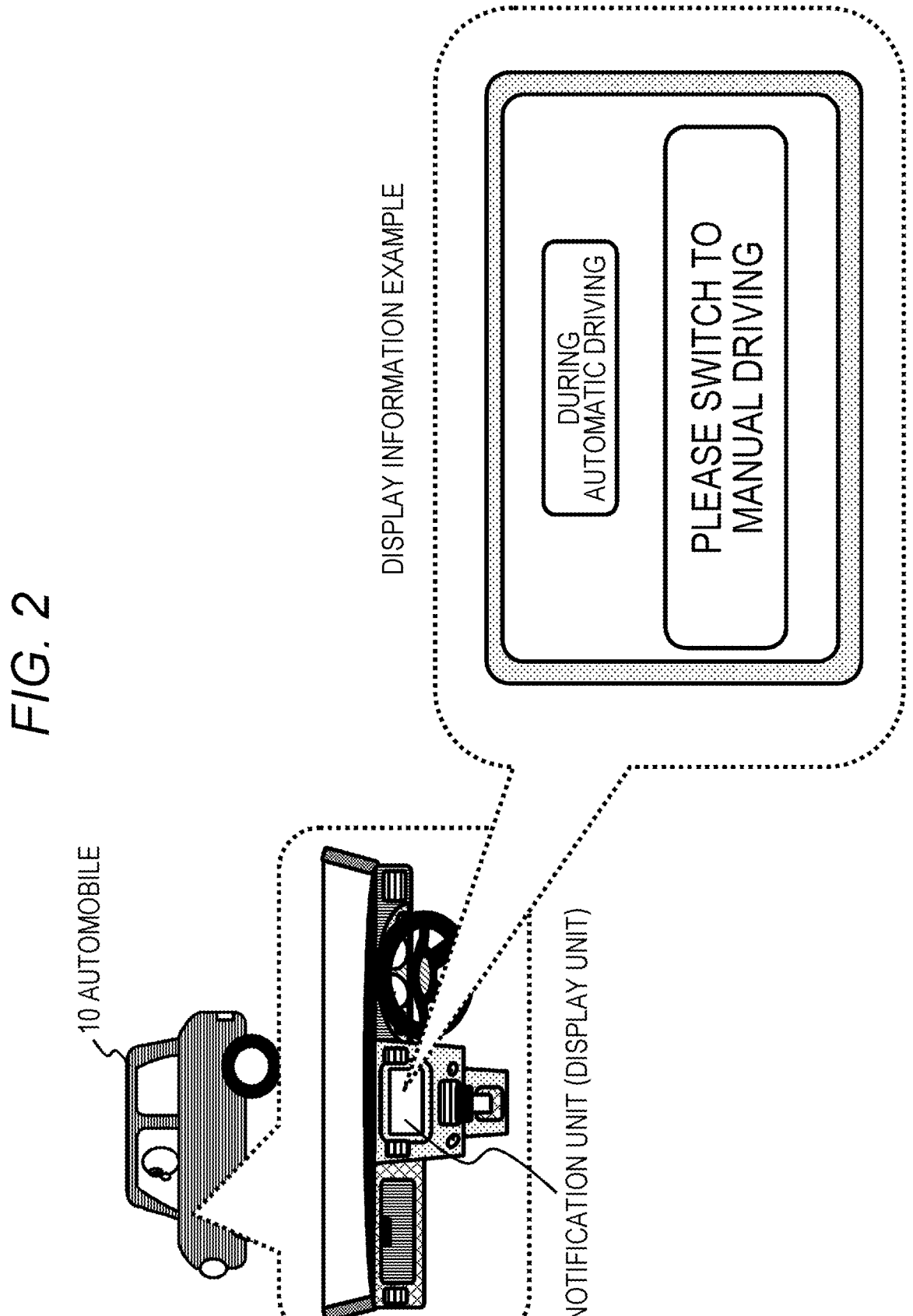
FIG. 2 is a diagram describing an example of data displayed on a display unit of the moving apparatus of the present disclosure.

An example of warning display on a display unit that constitutes the notification unit 15 is illustrated in FIG. 2, in which the notification unit 15 includes a display unit, an audio output unit, or a vibrator of a steering wheel or a seat that performs this notification.

As illustrated in FIG. 2, the following displays are performed on a display unit 30. Driving mode information="During automatic driving", Warning display="Please switch to manual driving"

In the driving mode information display area, "automatic driving in progress" is displayed when the automatic driving mode is executed, and "manual driving in progress" is displayed when the manual driving mode is executed.

The display area of the warning display information is a display area for displaying the following while the automatic driving is being executed in the automatic driving mode. Note that although the entire display screen is used in the present embodiment, a part of the screen may be displayed.

"Please switch to manual driving"

Note that although this is an example in which the explanation is presented in text, it is not limited to such a text display, and display by a symbol such as a pictogram may be performed.

Note that as illustrated in FIG. 1, the automobile 10 has a configuration capable of communicating with the server 30 via the communication unit 14.

For example, a part of the process of calculating an appropriate time for notification output in the data processing unit 11, specifically, a learning process can be performed in the server 30.

A specific example of this will be described later.

Figure 3:
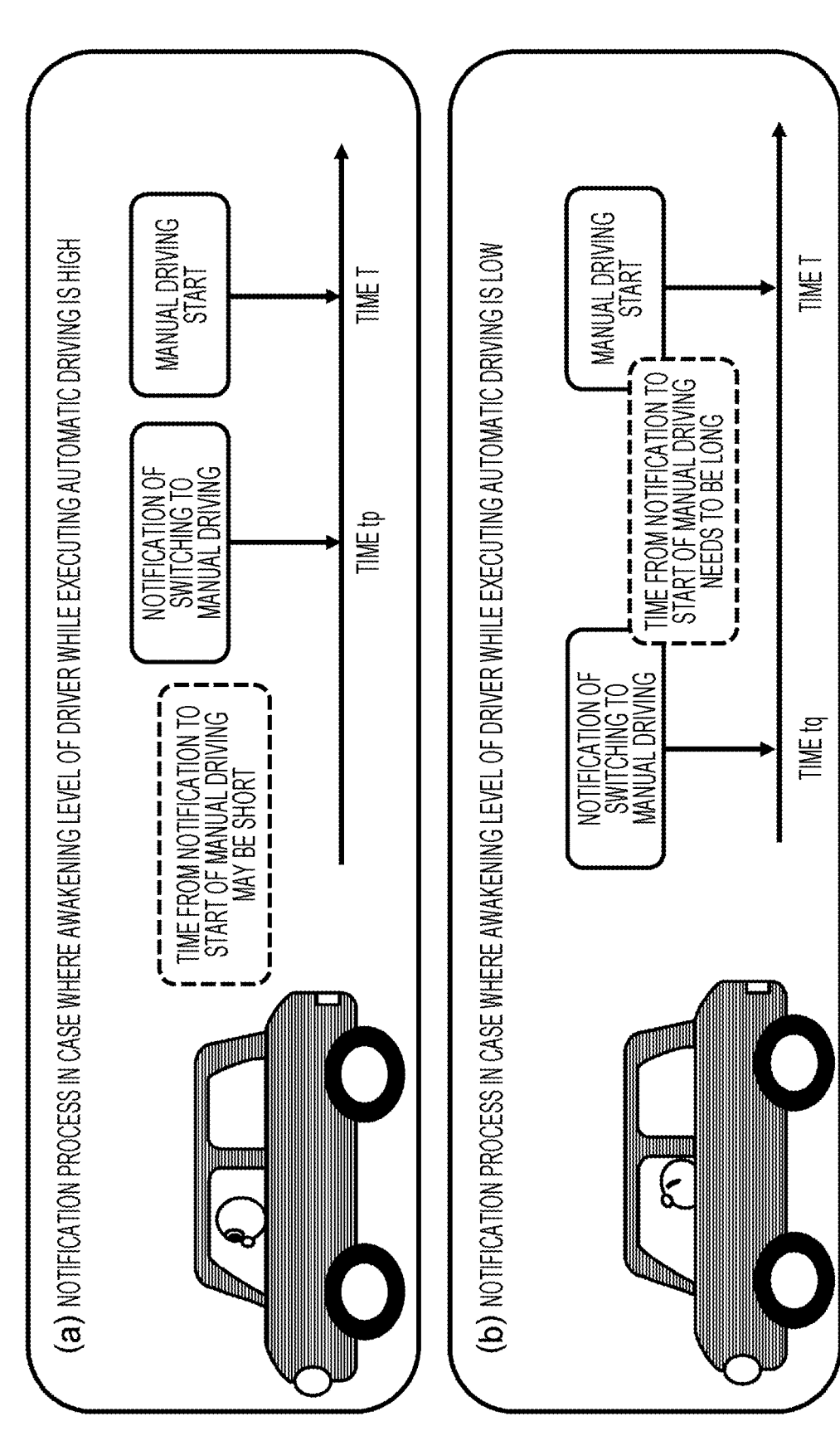
FIG. 3 is a diagram describing a process executed by the moving apparatus of the present disclosure.

FIG. 3 is a diagram illustrating a specific example of processing executed by the moving apparatus and the information processing apparatus of the present disclosure.

FIG. 3 is a diagram illustrating an example of setting an appropriate timing of notification for making a request for switching to manual driving while executing automatic driving in the automatic driving mode, and illustrates notification process examples of the following two examples.

(a) Notification process in case where awakening level of driver while executing automatic driving is high (b) Notification process in case where awakening level of driver while executing automatic driving is low The example of (a) is an example in which the driver looks forward at the road while executing automatic driving. In this case, the awakening level of the driver is high, that is, the manual driving can be started at any time.

In such a case, the driver can immediately start safe manual driving even if the notification of switching to manual driving is given at a timing immediately before the time when the manual driving becomes necessary.

In the example of (b), in a case where the driver is napping while executing automatic driving, the awakening level of the driver is extremely low.

In such a case, if the notification of switching to manual driving is given at the timing immediately before the time when manual driving becomes necessary, the driver starts the manual driving with unclear consciousness, which increases the possibility of causing an accident. Therefore, in a case where the awakening level is low as described above, it is necessary to perform the notification of switching to manual driving at an earlier stage.

Figure 4:
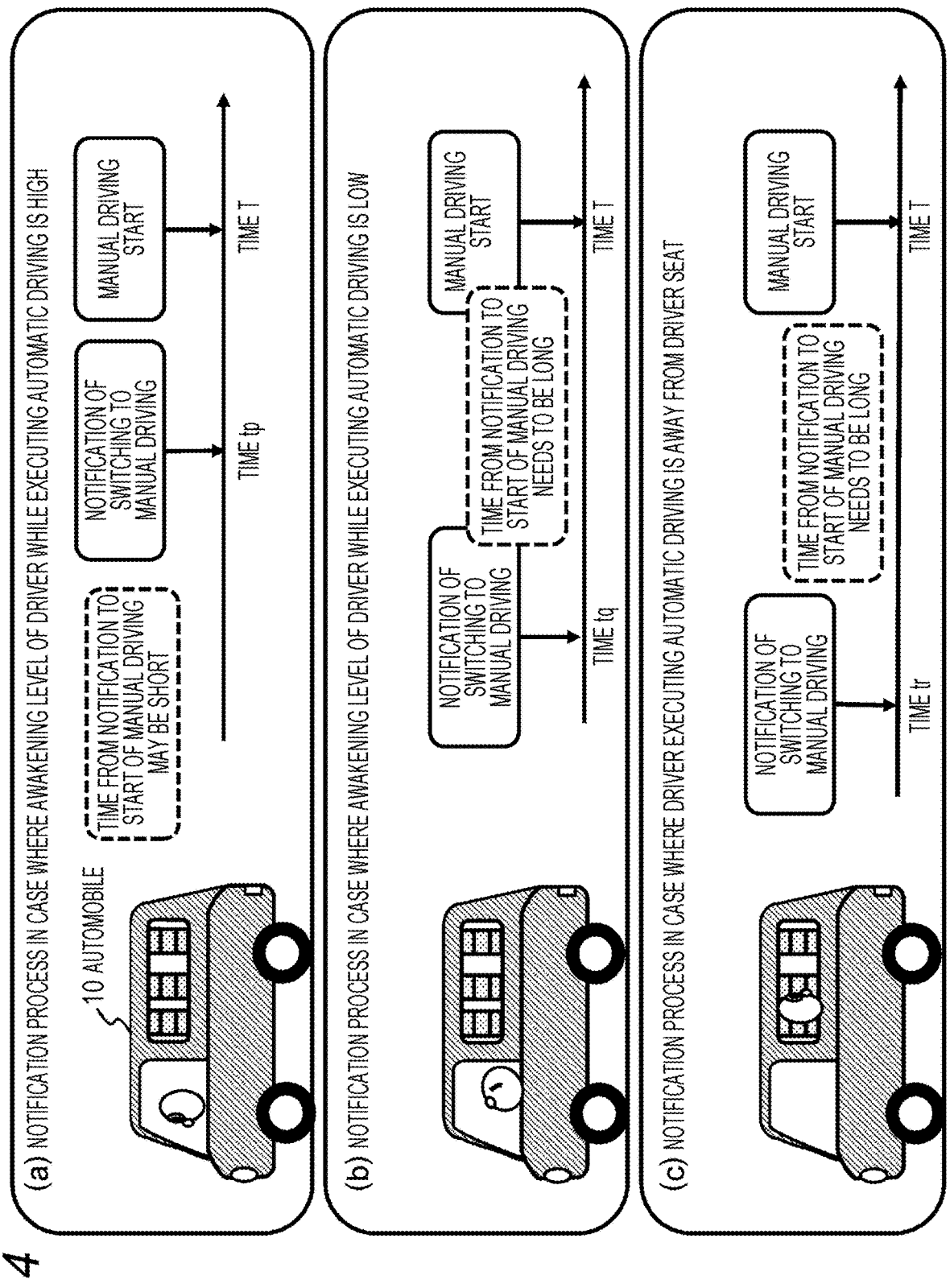
FIG. 4 is a diagram describing a process executed by the moving apparatus of the present disclosure.

Moreover, in a vehicle having a luggage compartment such as a delivery vehicle and allowing the driver to move to the luggage compartment to perform work while executing automatic driving, it is preferable that a notification timing for requesting switching to manual driving is set different depending on the following three types of cases, as illustrated in FIG. 4 for example.

(a) Notification process in case where awakening level of driver while executing automatic driving is high (b) Notification process in case where awakening level of driver while executing automatic driving is low (c) Notification process in case where driver executing automatic driving is away from driver seat The example of (a) is an example in which the driver looks forward at the road while executing automatic driving. In this case, the awakening level of the driver is high, that is, the manual driving can be started at any time.

In such a case, the driver can immediately start safe manual driving even if the notification of switching to manual driving is given at a timing immediately before the time when the manual driving becomes necessary.

The example of (b) is an example in which the driver is napping during automatic driving, and in this case, the awakening level of the driver is extremely low.

In such a case, if the notification of switching to manual driving is given at the timing immediately before the time when manual driving becomes necessary, the driver starts the manual driving with unclear consciousness, which increases the possibility of causing an accident.

Therefore, in a case where the awakening level is low as described above, it is necessary to perform the notification of switching to manual driving at an earlier stage.

The example of (c) is an example in which the driver is working away from the driver seat while executing automatic driving, and in such a case, the driver takes time to return to the driver seat.

In such a case, if the notification of switching to manual driving is given immediately before the time when manual driving becomes necessary, it is possible that the vehicle approaches the manual driving section before the driver returns to the driver seat. Therefore, in a case where the driver is away from the driver seat in this way, it is necessary to perform the notification of switching to manual driving at an earlier stage.

Furthermore, in a case where the operator (driver) 20 in the automobile 10 is away from the driver seat, the driver 20 cannot notice even if the display as described above with reference to FIG. 2 is performed on the notification unit (display unit) 15 at the driver seat.

Figure 5:
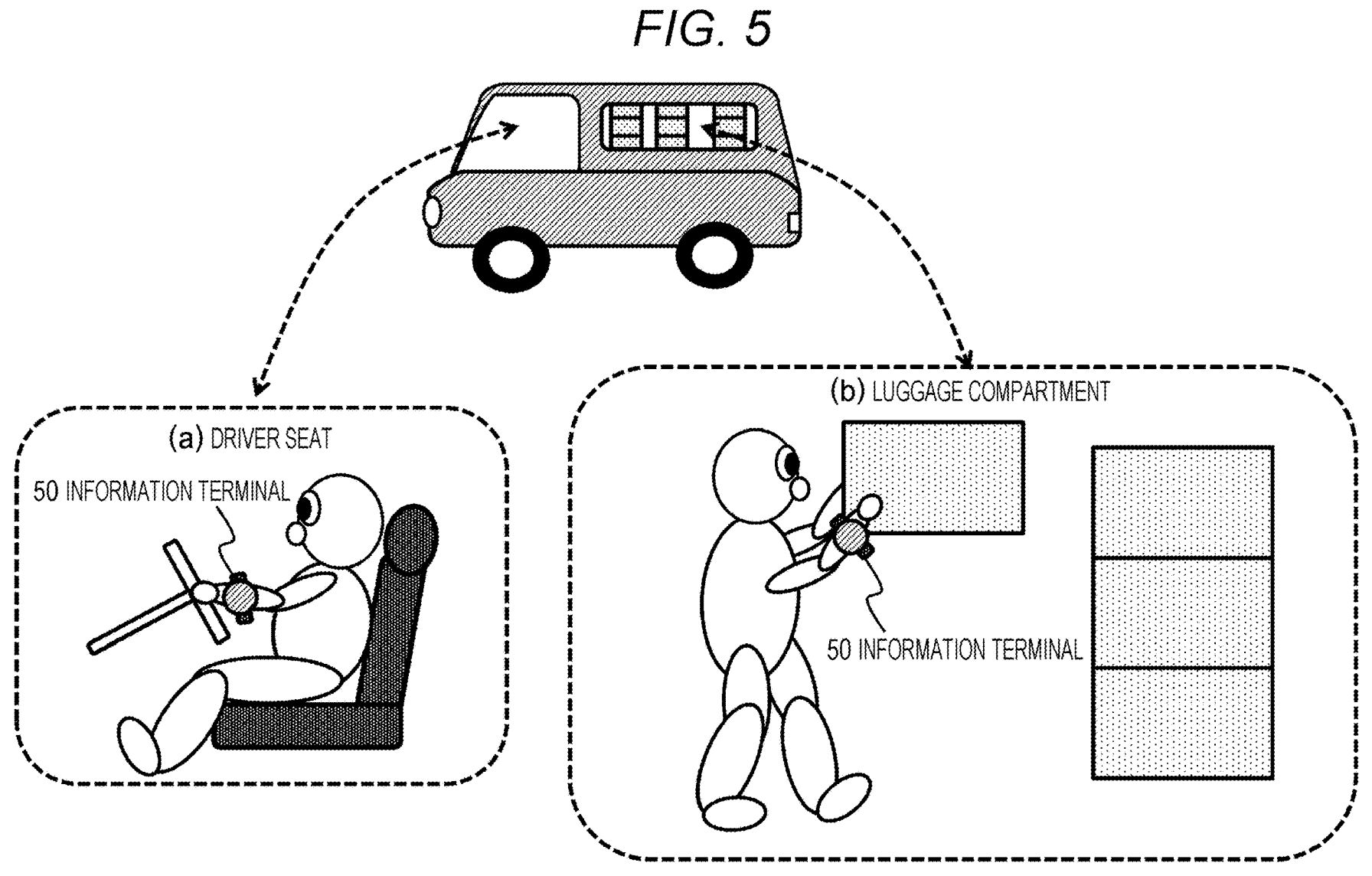

In order to solve this, the operator (driver) 20 is notified of and provided with information via an information terminal 50 worn on the arm, for example, a wristwatch-type information terminal 50 as illustrated in FIG. 5. The information terminal 50 performs a display process of display data similar to that described with reference to FIG. 2, and further displays approach information or the like of the road section (automatic driving section or manual driving section) in which the automobile 10 is traveling. Moreover, it has an alarm output, voice output, and vibration function, and notifies the driver 20 of various notifications and warnings.

FIG. 5 is a diagram illustrating a usage example of the information terminal 50. The operator (driver) 20 in the automobile 10 may be in the driver seat as illustrated in FIG. 4(*a*) while the automobile 10 is performing automatic driving, but in some cases, he or she leaves the driver seat and works in the luggage compartment as illustrated in FIG. 4(*b*). However, the driver 20 always wears the information terminal 50 on his or her arm, and can notice display information displayed on the information terminal 50, or voice, alarm, vibrations, or the like output therefrom. Further, the wearable information terminal 50 is interlocked with the driver information acquisition unit 12 of the vehicle, and also has a response input function as response checking means. This configuration enables cognitive response of notifications and warnings. Furthermore, it is also possible to send a refusal notice to the vehicle system for the early return to manual driving, which will be described later.

Figure 6:
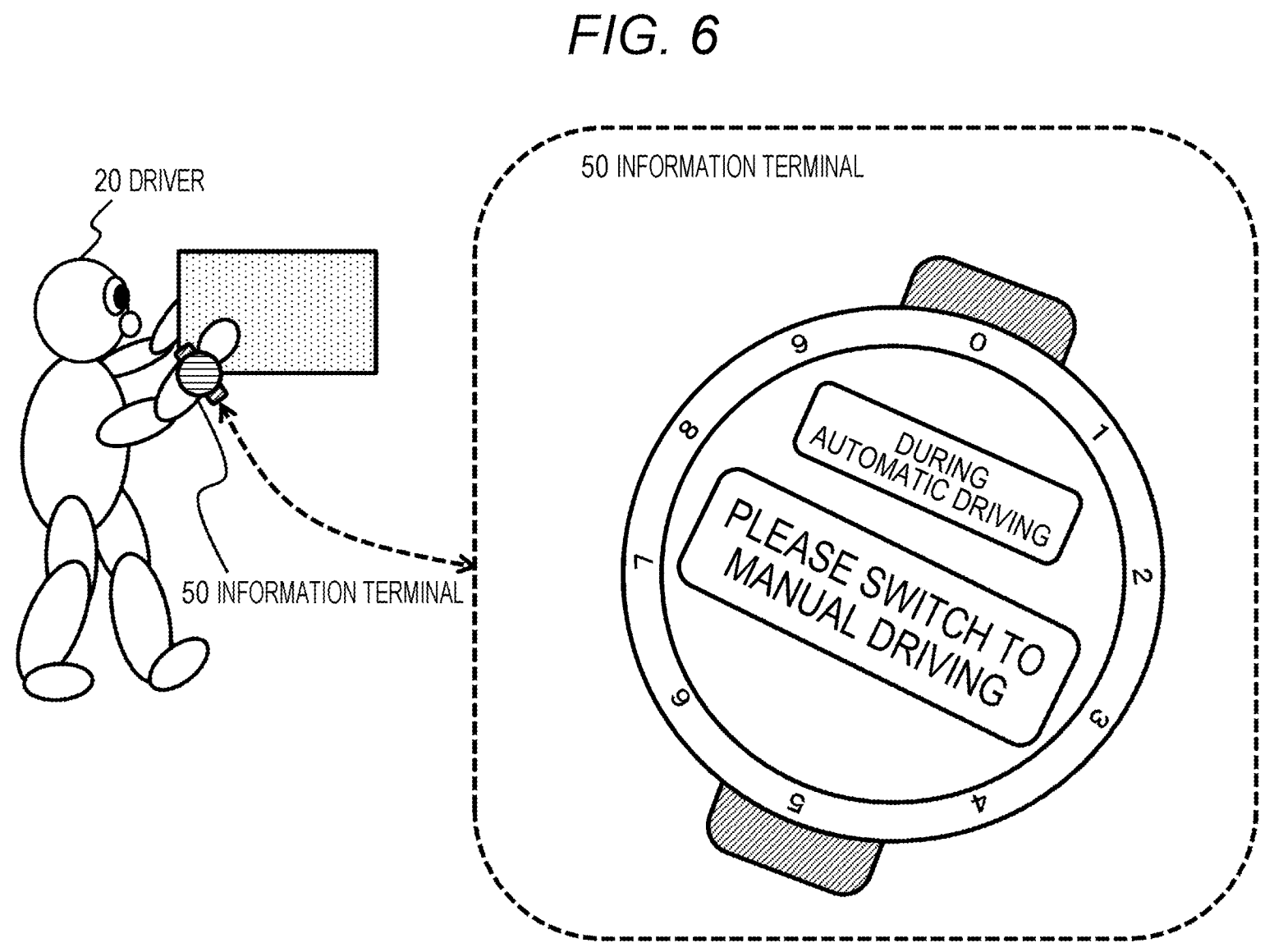

FIG. 6 is a diagram illustrating an example of display information of the information terminal 50. The example illustrated in FIG. 6 illustrates a display example similar to the display example of the notification unit (display unit) 15 described above with reference to FIG. 2. The following displays are displayed on the information terminal 50.

Driving mode information="During automatic driving", Warning display="Please switch to manual driving"

The driver 20 can check this display wherever he or she is.

Figure 7:
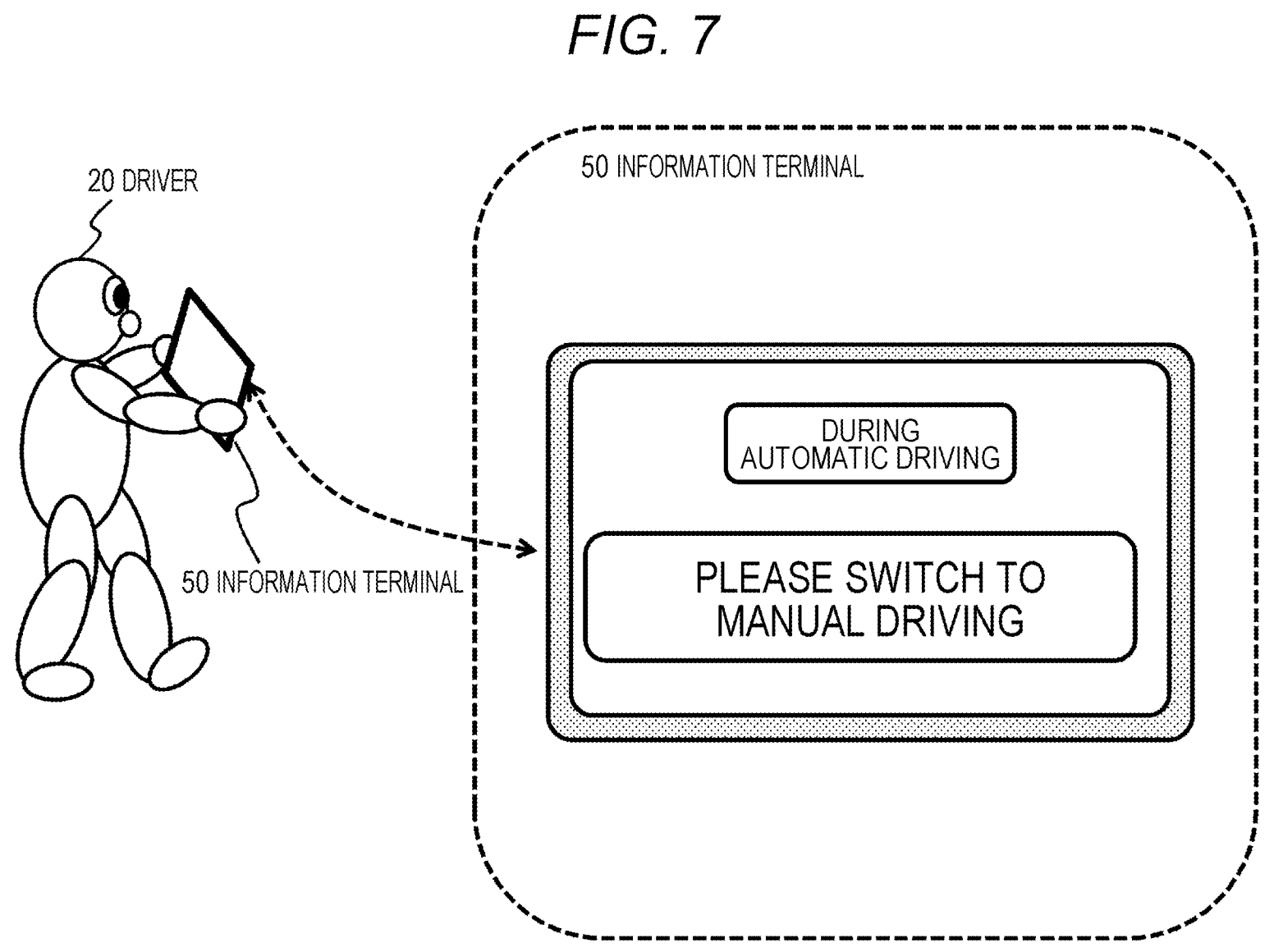

Moreover, a tablet-type information terminal 50 as illustrated in FIG. 7 may be used to provide notification and information.

2. Specific Configuration and Processing Example of Moving Apparatus

Next, a specific configuration and a processing example of the moving apparatus of the present disclosure will be described with reference to FIG. 8 and so on.

Figure 8:
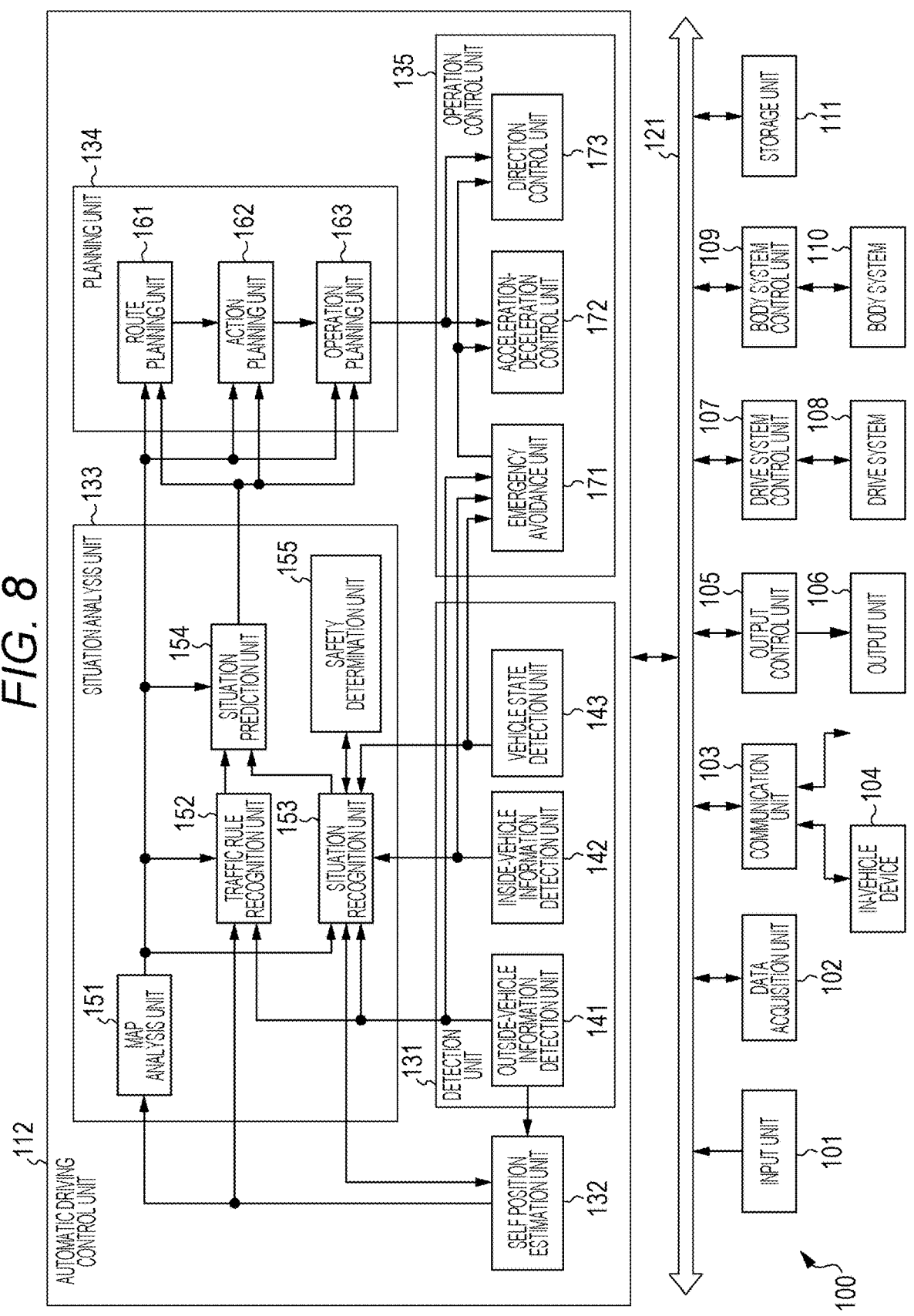
FIG. 8 is a diagram describing a configuration example of the moving apparatus of the present disclosure.

FIG. 8 illustrates a configuration example of the moving apparatus 100. Note that, hereinafter, in a case where a vehicle provided with the moving apparatus 100 is distinguished from other vehicles, the vehicle will be referred to as an own car or an own vehicle.

The moving apparatus 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112.

The input unit 101, the data acquisition unit 102, the communication unit 103, the output control unit 105, the drive system control unit 107, the body system control unit 109, the storage unit 111, and the automatic driving control unit 112 are connected to each other via a communication network 121. The communication network 121 is, for example, an in-vehicle communication network, a bus, or the like, that conforms to any standard such as controller area network (CAN), local interconnect network (LIN), local area network (LAN), or FlexRay (registered trademark). Note that respective units of the moving apparatus 100 can also be directly connected without passing through the communication network 121.

Note that hereinafter, in a case where each unit of the moving apparatus 100 communicates via the communication network 121, description of the communication network 121 is omitted. For example, in a case where the input unit 101 and the automatic driving control unit 112 perform communication via the communication network 121, it is simply described that the input unit 101 and the automatic driving control unit 112 perform communication.

The input unit 101 includes a device used by a passenger for inputting various data, instructions, and the like. For example, the input unit 101 includes operating devices such as a touch panel, a button, a microphone, a switch, and a lever, an operating device that allows input by a method other than manual operation by a voice, a gesture, or the like, and the like. Furthermore, for example, the input unit 101 may be a remote control device using infrared rays or other radio waves, or an externally connected device such as a mobile device or a wearable device or the like corresponding to operation of the moving apparatus 100. The input unit 101 generates an input signal on the basis of data, instructions, and the like input by a passenger, and supplies the input signal to each unit of the moving apparatus 100.

The data acquisition unit 102 includes various sensors and the like for acquiring data used for processing of the moving apparatus 100, and supplies the acquired data to each unit of the moving apparatus 100.

For example, the data acquisition unit 102 includes various sensors for detecting a state or the like of the own vehicle. Specifically, for example, the data acquisition unit 102 includes a gyro sensor, an acceleration sensor, an inertial measurement device (IMU), and a sensor or the like for detecting an operating amount of an accelerator pedal, an operating amount of a brake pedal, a steering angle of a steering wheel, an engine speed, a motor rotation speed, or a rotation speed of the wheel, or the like.

Further, for example, the data acquisition unit 102 includes various sensors for detecting information outside the own vehicle. Specifically, for example, the data acquisition unit 102 includes an imaging device such as a time-of-flight (ToF) camera, a stereo camera, a monocular camera, an infrared camera, and other cameras. Furthermore, for example, the data acquisition unit 102 includes an environment sensor for detecting weather or climate or the like and a surrounding information detection sensor for detecting objects around the own vehicle. The environmental sensor includes, for example, a raindrop sensor, a fog sensor, a sunshine sensor, a snow sensor, and the like. The surrounding information detection sensor includes, for example, an ultrasonic sensor, a radar, a LiDAR (Light Detection and Ranging, Laser Imaging Detection and Ranging), a sonar, and the like.

Figure 9:
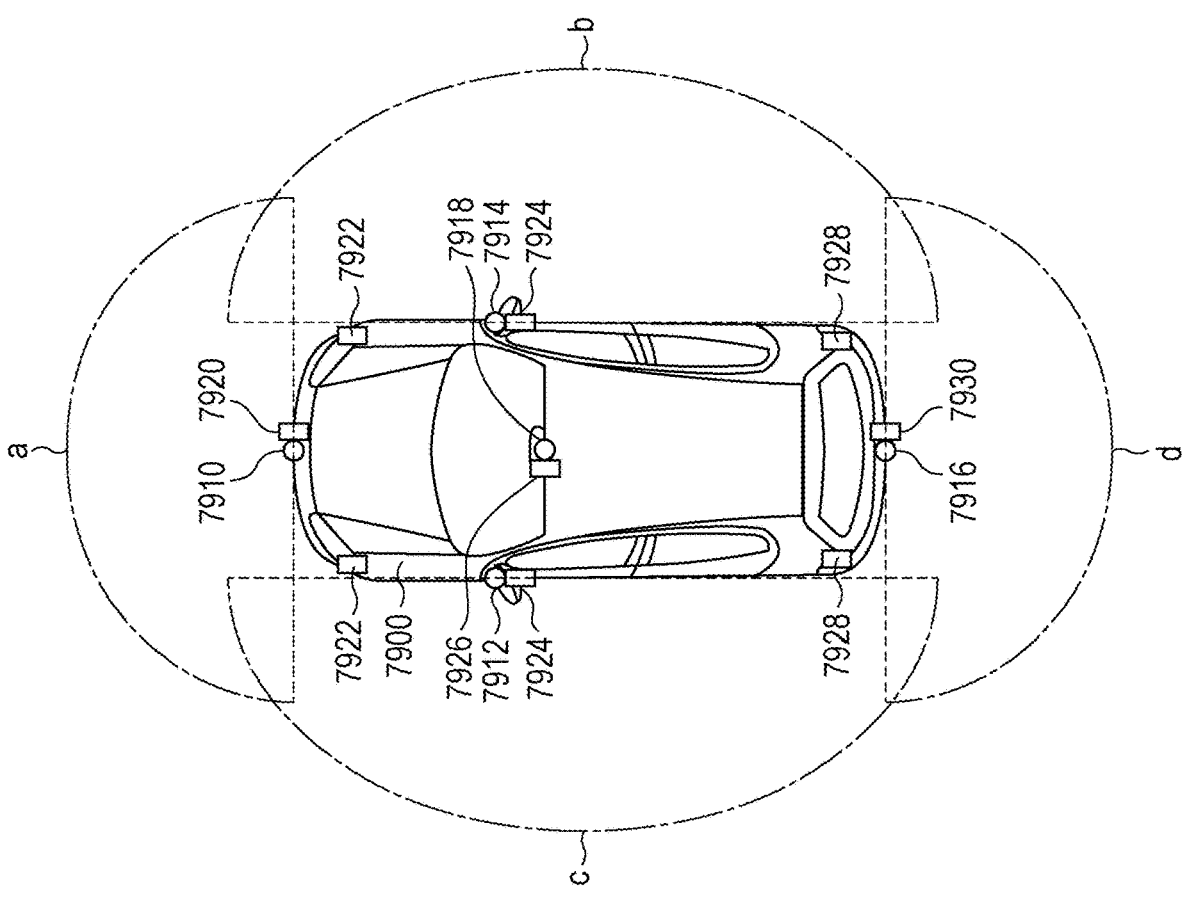
FIG. 9 is a diagram describing a configuration example of the moving apparatus of the present disclosure.

For example, FIG. 9 illustrates an installation example of various sensors for detecting external information of the own vehicle. Imaging devices 7910, 7912, 7914, 7916, and 7918 are provided, for example, at at least one of a front nose, a side mirror, a rear bumper, a back door, or an upper part of a windshield in the cabin of a vehicle 7900.

The imaging device 7910 provided on the front nose and the imaging device 7918 provided on the upper part of the windshield in the cabin mainly obtain a forward image of the vehicle 7900. The imaging devices 7912 and 7914 provided in the side mirrors mainly obtain images of sides of the vehicle 7900. The imaging device 7916 provided on a rear bumper or a back door mainly obtains an image behind the vehicle 7900. The imaging device 7918 provided on the upper part of the windshield in the cabin is mainly used for detecting a preceding vehicle, a pedestrian, an obstacle, a traffic signal, a traffic sign, a lane, or the like. Further, in future automatic driving, when the vehicle turns left or right, extended use may be made to a pedestrian crossing the road to which the vehicle turns left or right, or even to the range of an object approaching the crossroads.

Note that FIG. 9 illustrates an example of imaging ranges of the respective imaging devices 7910, 7912, 7914, and 7916. An imaging range a indicates the imaging range of the imaging device 7910 provided on the front nose, imaging ranges b and c indicate imaging ranges of the imaging devices 7912 and 7914 provided in the side mirrors, respectively, and an imaging range d indicates an imaging range of an imaging device 7916 provided on the rear bumper or the back door. For example, by superimposing the image data imaged by the imaging devices 7910, 7912, 7914, and 7916, an overhead image of the vehicle 7900 seen from above, and an omnidirectional stereoscopic display image in which the peripheral part of the vehicle is surrounded by a curved plane, or the like is obtained.

Sensors 7920, 7922, 7924, 7926, 7928, and 7930 provided on the front, rear, sides, corners, and upper part of the windshield in the cabin of the vehicle 7900 may be, for example, ultrasonic sensors or radars. The sensors 7920, 7926, and 7930 provided on the front nose, rear bumper, back door, and upper part of the windshield in the cabin of the vehicle 7900 may be, for example, LiDAR. These sensors 7920 to 7930 are mainly used for detecting a preceding vehicle, a pedestrian, an obstacle, or the like. These detection results may be further applied to the improvement in the three-dimensional object display of the overhead display and the omnidirectional stereoscopic display.

Returning to FIG. 8, the description of each component is continued. The data acquisition unit 102 includes various sensors for detecting a current position of the own vehicle. Specifically, for example, the data acquisition unit 102 includes a global navigation satellite system (GNSS) receiver that receives a GNSS signal from a GNSS satellite, or the like.

Further, for example, the data acquisition unit 102 includes various sensors for detecting information in the vehicle. Specifically, for example, the data acquisition unit 102 includes an imaging device that captures an image of a driver, a biological sensor that detects biological information of the driver, a microphone that collects sound in the cabin, and the like. The biological sensor is provided on, for example, a seat surface or a steering wheel or the like, and detects biological information of a passenger sitting in the seat or a driver holding the steering wheel. As biological signals, various observable data such as heart rate, pulse rate, blood flow, breathing, psychosomatic correlation, visual stimulation, brain waves, sweating state, head posture behavior, eyes, gaze, blinking, saccade, microsaccade, fixation, drift, gaze, and iris pupillary reaction can be used. These pieces of biological activity observable information reflecting the observable driving state are aggregated as observable evaluation values estimated from observation, and are used to calculate a return notification timing by a safety determination unit 155, which will be described later, as a unique characteristic of a return delay case of the corresponding driver from a return delay time characteristic linked with a log of evaluation values.

Figure 10:
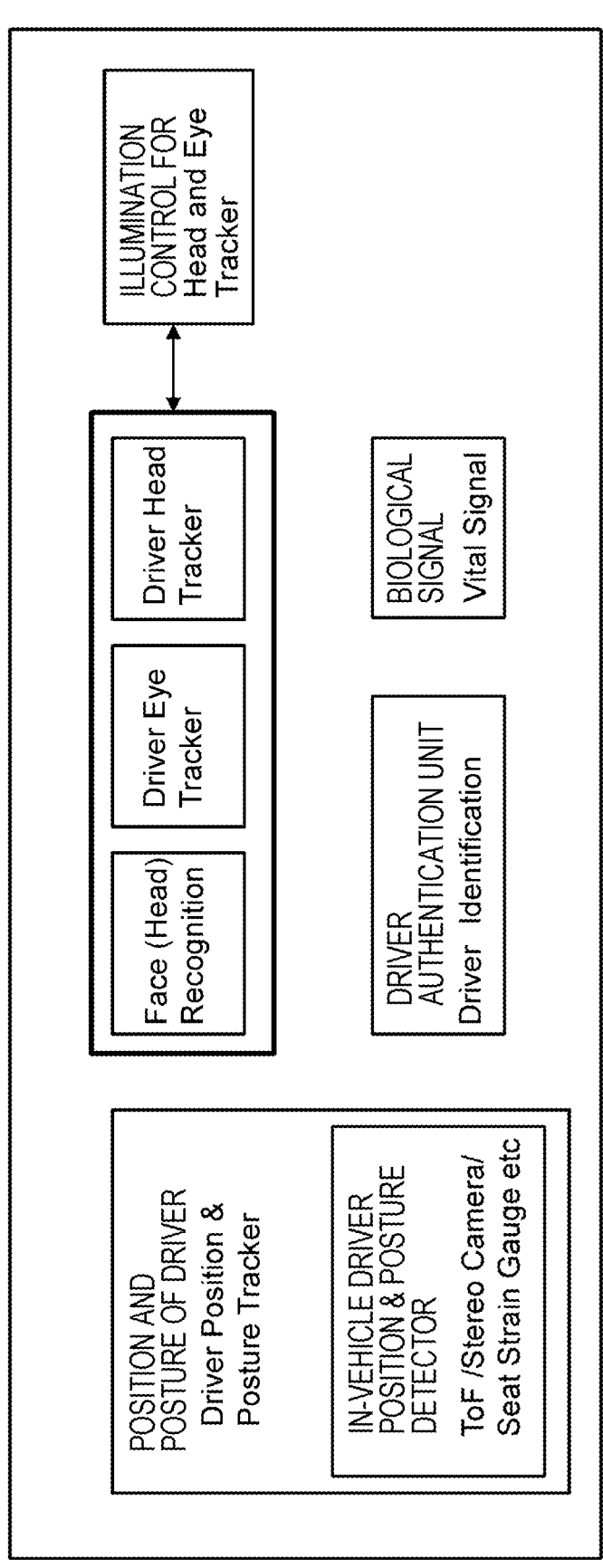
FIG. 10 is a diagram describing an example of a sensor configuration of the moving apparatus of the present disclosure.

FIG. 10 illustrates an example of various sensors for obtaining information of the driver in the vehicle included in the data acquisition unit 102. For example, the data acquisition unit 102 includes a ToF camera, a stereo camera, a seat strain gauge, and the like as detectors for detecting the position and posture of the driver. Furthermore, the data acquisition unit 102 includes a face recognition device (Face (Head) Recognition), a driver eye tracker, a driver head tracker, and the like as detectors for obtaining the biological activity observable information of the driver.

Further, the data acquisition unit 102 includes a biological signal (vital signal) detector as a detector for obtaining the biological activity observable information of the driver. Furthermore, the data acquisition unit 102 includes a driver authentication (driver identification) unit. Note that as an authentication method, in addition to knowledge authentication using a password, PIN, or the like, biological authentication using a face, fingerprint, eye iris, voice print, or the like can be considered.

The communication unit 103 communicates with the in-vehicle device 104 and various devices, a server, a base station, and the like outside the vehicle, transmits data supplied from each unit of the moving apparatus 100, and supplies received data to each unit of the moving apparatus 100. Note that a communication protocol supported by the communication unit 103 is not particularly limited, and the communication unit 103 can support a plurality of types of communication protocols.

For example, the communication unit 103 performs wireless communication with the in-vehicle device 104 by wireless LAN, Bluetooth (registered trademark), Near Field Communication (NFC), Wireless USB (WUSB), or the like. Further, for example, the communication unit 103 performs wired communication with the in-vehicle device 104 by a Universal Serial Bus (USB), High-Definition Multimedia Interface (HDMI) (registered trademark), Mobile High-definition Link (MHL), or the like via a connection terminal (and a cable if necessary) that is not illustrated.

Moreover, for example, the communication unit 103 communicates with a device (for example, an application server or a control server) existing on an external network (for example, the Internet, a cloud network, or an operator-specific network) via a base station or an access point. Further, for example, the communication unit 103 uses peer-to-peer (P2P) technology to communicate with a terminal (for example, a terminal of a pedestrian or a store, or a machine-type communication (MTC) terminal) that exists in the vicinity of the own vehicle.

Moreover, for example, the communication unit 103 performs V2X communication such as vehicle-to-vehicle communication, vehicle-to-infrastructure communication, vehicle-to-home communication, and vehicle-to-pedestrian communication. Furthermore, for example, the communication unit 103 includes a beacon receiving unit to receive radio waves or electromagnetic waves transmitted from wireless stations and the like installed on the road, and acquires information such as the current position, traffic congestion, traffic regulation, or required time. Note that pairing may be performed with a vehicle traveling ahead while traveling in a section that can be a leading vehicle through the communication unit, and information acquired from a data acquisition unit mounted on the vehicle in front may be acquired as pre-travel information, and used in a complementing manner with data of the data acquisition unit 102 of the own vehicle, which will be means for ensuring safety of a following convoy, particularly when running in a convoy with a leading vehicle, for example.

The in-vehicle device 104 includes, for example, a mobile device (such as a tablet or a smartphone) possessed by a passenger, an information device that is carried in or attached to the own vehicle, a navigation device that searches for a route to an arbitrary destination, and the like. Note that considering that an occupant is not always fixed in a fixed seating position due to popularization of automatic driving, in the future, it may be used in extension to a video player, a game device, or the like that can be attached to and detached from the vehicle installation. In the present embodiment, an example is described in which presentation of information of the intervention necessary point of the driver is limited to the corresponding driver, but information provision may be further performed to the following vehicle in a convoy running or the like, or may be used in combination with remote driving support as appropriate by constantly providing the information to the operation management center of a passenger transportation shared bus or a long-distance distribution commercial vehicle.

The output control unit 105 controls output of various information to a passenger of the own vehicle or the outside of the vehicle. For example, the output control unit 105 generates an output signal including at least one of visual information (for example, image data) or auditory information (for example, audio data), and supplies the output signal to the output unit 106, so as to control output of visual and auditory information from the output unit 106. Specifically, for example, the output control unit 105 generates an overhead image or a panoramic image or the like by combining image data of image capturing by different imaging devices of the data acquisition unit 102, and supplies an output signal including the generated image to the output unit 106. Furthermore, for example, the output control unit 105 generates audio data including a warning sound or a warning message or the like for danger such as collision, contact, or entry into a danger zone, and supplies an output signal including the generated sound data to the output unit 106.

The output unit 106 includes a device capable of outputting visual information or auditory information to a passenger of the own vehicle or to the outside of the vehicle. For example, the output unit 106 includes a display device, an instrument panel, an audio speaker, headphones, a wearable device such as a glasses-type display worn by a passenger, a projector, a lamp, and the like. The display device included in the output unit 106 may be, besides a device having a normal display, a device that displays visual information in a visual field of a driver, for example, a head-up display, a transmission type display, a device having an augmented reality (AR) display function, or the like.

The drive system control unit 107 controls the drive system 108 by generating various control signals and supplying them to the drive system 108. Furthermore, the drive system control unit 107 supplies a control signal to each unit other than the drive system 108 as necessary, and performs notification of a control state of the drive system 108, and the like.

The drive system 108 includes various devices related to the drive system of the own vehicle. For example, the drive system 108 includes a driving force generator for generating a driving force, such as an internal combustion engine or a driving motor, a driving force transmission mechanism for transmitting the driving force to wheels, a steering mechanism that adjusts a steering angle, a braking device that generates a braking force, an antilock brake system (ABS), an electronic stability control (ESC), and an electric power steering device, and the like.

The body system control unit 109 controls the body system 110 by generating various control signals and supplying them to the body system 110. Furthermore, the body system control unit 109 supplies a control signal to each unit other than the body system 110 as necessary, and performs notification of a control state of the body system 110, or the like.

The body system 110 includes various body devices that are mounted on the vehicle body. For example, the body system 110 includes a keyless entry system, a smart key system, a power window device, a power seat, a steering wheel, an air conditioner, and various lamps (for example, a head lamp, a back lamp, a brake lamp, a blinker, a fog lamp, and the like), and the like.

The storage unit 111 includes, for example, a read only memory (ROM), a random access memory (RAM), a magnetic storage device such as a hard disc drive (HDD), a semiconductor storage device, an optical storage device, a magneto-optical storage device, and the like. The storage unit 111 stores various programs, data, and the like used by respective units of the moving apparatus 100. For example, the storage unit 111 stores map data of a three-dimensional high-precision map such as a dynamic map, a global map that is less accurate than the high-precision map and covers a wide area, a local map that includes information around the own vehicle, and the like.

The automatic driving control unit 112 performs control related to automatic driving such as autonomous traveling or driving support. Specifically, for example, the automatic driving control unit 112 performs cooperative control for the purpose of achieving advanced driver assistance system (ADAS) functions including collision avoidance or impact mitigation of the own vehicle, follow-up traveling based on the inter-vehicle distance, vehicle speed-maintaining traveling, warning of collision of the own vehicle, own vehicle lane departure warning, or the like. Further, for example, the automatic driving control unit 112 performs cooperative control for the purpose of automatic driving or the like to autonomously travel without depending on operation of the driver. The automatic driving control unit 112 includes a detection unit 131, an own position estimation unit 132, a situation analysis unit 133, a planning unit 134, and an operation control unit 135.

The detection unit 131 detects various information necessary for controlling automatic driving. The detection unit 131 includes an outside-vehicle information detection unit 141, an inside-vehicle information detection unit 142, and a vehicle state detection unit 143.

The outside-vehicle information detection unit 141 performs a detection process of information outside the own vehicle on the basis of data or signals from each unit of the moving apparatus 100. For example, the outside-vehicle information detection unit 141 performs a detection process, a recognition process, and a tracking process of an object around the own vehicle, and a detection process of the distance to and relative velocity with the object. Examples of objects to be detected include vehicles, people, obstacles, structures, roads, traffic lights, traffic signs, road markings, and the like.

Furthermore, for example, the outside-vehicle information detection unit 141 performs a detection process of a surrounding environment of the own vehicle. The surrounding environment as a detection target includes, for example, weather, temperature, humidity, brightness, and road surface conditions, and the like. The outside-vehicle information detection unit 141 supplies data indicating results of detection processes to the own position estimation unit 132, a map analysis unit 151, a traffic rule recognition unit 152, and a situation recognition unit 153 of the situation analysis unit 133, an emergency avoidance unit 171 of the operation control unit 135, and the like.

The information acquired by the outside-vehicle information detection unit 141 can be supplied mainly from the infrastructure if the traveling section is a section where the local dynamic map (LDM), in which the traveling section is constantly updated as a section where traveling of automatic driving is possible with priority, is supplied from the infrastructure, or traveling may be performed while constantly receiving information updates in advance prior to entering the section from a vehicle or group of vehicles traveling ahead in the relevant section. Furthermore, road environment information obtained from a section entering-leading vehicle for the purpose of obtaining road information immediately before a safe entering section may be further used in a complementary manner in a case where the latest local dynamic map is not constantly updated from the infrastructure, particularly in a case where it is traveling in a convoy, for example. Whether it is a section where automatic driving is possible often depends on whether or not there is such prior information provided by the infrastructure. The updated fresh local dynamic map (LDM) that constitutes automatic driving traveling possibility information on the route provided by the infrastructure is equivalent to just as if providing an invisible track as what is called "information", or the like. Note that, for convenience, the outside-vehicle information detection unit 141 is illustrated on the assumption that it is mounted on the own vehicle, but by using the information captured by the preceding vehicle as "information", prior predictability during traveling is further improved.

The inside-vehicle information detection unit 142 performs a detection process of inside-vehicle information on the basis of data or signals from each unit of the moving apparatus 100. For example, the inside-vehicle information detection unit 142 performs an authentication process and a recognition process of a driver, a state detection process of the driver, a detection process of a passenger, a detection process of in-vehicle environment, and the like. The state of the driver to be detected includes, for example, physical condition, awakening level, concentration level, fatigue level, line-of-sight direction, detailed behaviors of eyeballs, and the like.

Moreover, use of automatic driving in which the driver is completely disengaged from a driving steering work is expected in the future, and it will be necessary for the system to grasp that the driver has temporary napped or started some other work and how far the awakening and returning of consciousness necessary for returning to driving are in progress. In other words, while the driver monitoring system that has conventionally been considered has been directed mainly to detection means for detecting decreases in consciousness such as drowsiness, since it becomes a state that the driver will not intervene in driving steering at all in the future, the system will no longer have means for directly observing the degree of driving intervention of the driver from the steering stability of the steering equipment, or the like, and it is necessary to observe the consciousness returning transition necessary for driving from a state that the accurate consciousness state of the driver is unknown, and to proceed with transfer of intervention of steering from automatic driving to manual driving after grasping the accurate internal awakening state of the driver.

Therefore, the inside-vehicle information detection unit 142 mainly has two major roles, a first role is passive monitoring of the state of the driver during automatic driving, and the second role is to detect and judge peripheral cognition, perception, and judgment, as well as operating ability of the steering device of the driver, until the level at which manual driving is possible by the time the vehicle reaches a section of cautious driving after the return request is issued from the system. As the control, self-diagnosis of failure of the entire vehicle may be further performed, and even in a case where a partial functional failure of the automatic driving causes a deterioration of the automatic driving function, the driver may similarly be prompted to return early to manual driving. The passive monitoring here refers to detection means of the type that does not require a conscious response reaction of the driver and does not exclude an object that originates a physical radio wave, light, or the like from an apparatus and detects a response signal. That is, the passive monitoring refers to state monitoring of the driver under unconsciousness such as during a doze, and a classification that is not a cognitive response reaction of the driver is determined as a passive type. It does not exclude active response devices that analyze and evaluate reflected and diffused signals obtained by irradiation with radio waves, infrared rays, and the like. In contrast, one that requests for a conscious response that requires the driver for a response reaction is assumed as active.

The in-vehicle environment to be detected includes, for example, temperature, humidity, brightness, smell, and the like. The inside-vehicle information detection unit 142 supplies data indicating a result of a detection process to the situation recognition unit 153 of the situation analysis unit 133, and the operation control unit 135. Note that in a case where it has been found that the driver could not achieve manual driving within an accurate deadline after a driving return instruction is issued to the driver by the system, and it is determined that the takeover will not be in time even with deceleration control being performed to have a grace time while continuing automatic driving, an instruction is given to the emergency avoidance unit 171 and so on of the system, so as to start deceleration and evacuation-stop procedure of the vehicle to evacuate. That is, even in a situation where the initial state is not in time, it is possible to earn the time to reach the takeover limit by decelerating the vehicle at an early stage. By earning the time to reach the takeover limit, there will be a margin time for the system to deal with events, and a response for ensuring safety becomes possible. However, as will be described later, the application of unreasonable deceleration and slowing down is limited because it increases congestion-inducing factors and rear-end collision risk.

The vehicle state detection unit 143 performs a detection process of the state of the own vehicle on the basis of data or signals from each unit of the moving apparatus 100. The state of the own vehicle to be detected includes, for example, speed, acceleration, steering angle, presence or absence and content of abnormality, driving operation state, position and inclination of power seat, door lock state, and states of other in-vehicle devices, and the like. The vehicle state detection unit 143 supplies data indicating results of detection processes to the situation recognition unit 153 of the situation analysis unit 133, the emergency avoidance unit 171 of the operation control unit 135, and the like.

The own position estimation unit 132 performs an estimation process of the position, posture, and the like of the own vehicle on the basis of data or signals from respective units of the moving apparatus 100 such as the outside-vehicle information detection unit 141 and the situation recognition unit 153 of the situation analysis unit 133. Furthermore, the own position estimation unit 132 generates a local map (hereinafter referred to as an own position estimation map) used for own position estimation as necessary.

The own position estimation map is, for example, a highly accurate map using a technique such as simultaneous localization and mapping (SLAM). The own position estimation unit 132 supplies data indicating a result of the estimation process to the map analysis unit 151, the traffic rule recognition unit 152, and the situation recognition unit 153 of the situation analysis unit 133, and the like. Further, the own position estimation unit 132 stores the own position estimation map in the storage unit 111.

The situation analysis unit 133 performs an analysis process of the own vehicle and the surrounding situation. The situation analysis unit 133 includes a map analysis unit 151, a traffic rule recognition unit 152, a situation recognition unit 153, a situation prediction unit 154, and a safety determination unit 155.

The map analysis unit 151 performs an analysis process of various types of maps stored in the storage unit 111 using data or signals from each unit of the moving apparatus 100 such as the own position estimation unit 132 and the outside-vehicle information detection unit 141 as necessary, and constructs a map that contains information necessary for processing of automatic driving. The map analysis unit 151 supplies the constructed map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs a recognition process of traffic rules around the own vehicle on the basis of data or signals from each unit of the moving apparatus 100 such as the own position estimation unit 132, the outside-vehicle information detection unit 141, and the map analysis unit 151. By this recognition process, for example, positions and states of signals around the own vehicle, contents of traffic restrictions around the own vehicle, and lanes that can be traveled, and the like are recognized. The traffic rule recognition unit 152 supplies data indicating a recognition processing result to the situation prediction unit 154 and the like.

The situation recognition unit 153 performs a recognition process of a situation related to the own vehicle on the basis of data or signals from each unit of the moving apparatus 100 such as the own position estimation unit 132, the outside-vehicle information detection unit 141, the inside-vehicle information detection unit 142, the vehicle state detection unit 143, and the map analysis unit 151. For example, the situation recognition unit 153 performs a recognition process of a situation of the own vehicle, a situation around the own vehicle, a situation of the driver of the own vehicle, and the like. Further, the situation recognition unit 153 generates a local map (hereinafter referred to as a situation recognition map) used for recognizing the situation around the own vehicle as necessary. The situation recognition map is, for example, an occupancy grid map.

The situation of the own vehicle to be recognized includes, for example, vehicle-specific and further loaded cargo-specific conditions, such as the position, posture, and movement (for example, the speed, acceleration, moving direction, and the like) of the own vehicle, and the movement of the center of gravity of the vehicle body in association with a loaded cargo quantity that determines motion characteristics of the own vehicle and loading of the cargo, the tire pressure, braking distance movement in association with brake braking pad wear status, permissible maximum deceleration braking for preventing movement of the cargo caused by braking due to a loaded object, and centrifugal relaxation limit speed when traveling on curves due to liquid loading, and the like, and furthermore, since the return start timing required for control differs depending on the properties of the vehicle itself even in a completely identical road environment such as the coefficient of friction of a road surface, a road curve, a slope, and the like and on a loaded object, and the like, and thus it is necessary to collect such various conditions, learn them, and reflect them on the optimum timing for performing control. Upon determining a control timing according to the vehicle type or the loaded object, it is not sufficient if the presence or absence and the contents of abnormality and the like of the own vehicle are simply observed and monitored. In transportation industries and the like, a parameter that determines addition of a desired return grace time in order to ensure a certain level of safety according to the characteristics unique to the loaded object may be set in advance as a fixed value, and it is not always necessary to employ a method of uniformly determining all notification timing determination conditions from self-cumulative learning.

The situation around the own vehicle to be recognized includes, for example, type and position of a stationary object in the surroundings, type, position, and movement (for example, speed, acceleration, moving direction, and the like) of a moving object in the surroundings, configuration of a surrounding road and road surface condition, and weather, temperature, humidity, and brightness of the surroundings, and the like. The state of the driver to be recognized includes, for example, physical condition, awakening level, concentration level, fatigue level, line-of-sight movement, and driving operation, and the like. To drive a vehicle safely, the control start point that needs to be responded differs greatly depending on the loaded amount loaded in a unique state of the vehicle, a chassis fixed state of a mounting part, a biased state of the center of gravity, a maximum deceleration possible acceleration value, a maximum loadable centrifugal force, a return response delay amount depending on the state of the driver, and the like.

The situation recognition unit 153 supplies data indicating a result of the recognition process (including a situation recognition map as necessary) to the own position estimation unit 132, the situation prediction unit 154, and the like. Further, the situation recognition unit 153 stores the situation recognition map in the storage unit 111.

The situation prediction unit 154 performs a prediction process of a situation related to the own vehicle on the basis of data or signals from each unit of the moving apparatus 100 such as the map analysis unit 151, the traffic rule recognition unit 152, and the situation recognition unit 153. For example, the situation prediction unit 154 performs a prediction process of a situation of the own vehicle, a situation around the own vehicle, a situation of the driver, and the like.

The situation of the own vehicle to be predicted includes, for example, behavior of the own vehicle, occurrence of abnormality, travelable distance, and the like. The situation around the own vehicle to be predicted includes, for example, a behavior of a moving object around the own vehicle, a change in a signal state, a change in the environment such as weather, and the like. The situation of the driver as a prediction target includes, for example, a behavior and physical condition and the like of the driver.

The situation prediction unit 154 supplies data indicating a result of the prediction process, together with data from the traffic rule recognition unit 152 and the situation recognition unit 153, to the route planning unit 161, the action planning unit 162, and the operation planning unit 163 of the planning unit 134, and the like.

The safety determination unit 155 learns the optimum return timing according to a return behavior pattern of the driver, vehicle characteristics, and the like, and provides the learning information to the situation recognition unit 153 and the like. Thus, for example, it is possible to present to the driver a statistically obtained optimum timing required for the driver to normally return from automatic driving to manual driving at a predetermined constant rate or higher.

The route planning unit 161 plans a route to a destination on the basis of data or signals from each unit of the moving apparatus 100, such as the map analysis unit 151 and the situation prediction unit 154. For example, the route planning unit 161 sets a route from the current position to a designated destination on the basis of the global map. Furthermore, for example, the route planning unit 161 changes the route as appropriate on the basis of situations of traffic congestion, accident, traffic restriction, construction, and the like and physical condition of the driver, and the like. The route planning unit 161 supplies data indicating a planned route to the action planning unit 162 and the like.

On the basis of data or signals from each unit of the moving apparatus 100 such as the map analysis unit 151 and the situation prediction unit 154, the action planning unit 162 plans actions of the own vehicle for safely traveling the route planned by the route planning unit 161 within a planned time. For example, the action planning unit 162 performs plans of start, stop, traveling direction (for example, forward, backward, left turn, right turn, direction change, and the like), travel lane, travel speed, overtaking, or the like. The action planning unit 162 supplies data indicating planned actions of the own vehicle to the operation planning unit 163 and the like.

The operation planning unit 163 plans operations of the own vehicle for implementing the actions planned by the action planning unit 162 on the basis of data or signals from each unit of the moving apparatus 100 such as the map analysis unit 151 and the situation prediction unit 154. For example, the operation planning unit 163 performs planning of acceleration, deceleration, traveling track, and the like. The operation planning unit 163 supplies data indicating planned operations of the own vehicle to the acceleration-deceleration control unit 172 and the direction control unit 173 of the operation control unit 135, and the like.

The operation control unit 135 controls operations of the own vehicle. The operation control unit 135 includes the emergency avoidance unit 171, an acceleration-deceleration control unit 172, and a direction control unit 173.

The emergency avoidance unit 171 performs a detection process of an emergency situation such as a collision, a contact, an entry into a danger zone, a driver abnormality, or a vehicle abnormality, on the basis of detection results of the outside-vehicle information detection unit 141, the inside-vehicle information detection unit 142, and the vehicle state detection unit 143. In a case where the emergency avoidance unit 171 detects occurrence of an emergency, the emergency avoidance unit 171 plans an operation of the own vehicle to avoid the emergency such as a sudden stop or a sudden turn. The emergency avoidance unit 171 supplies data indicating the planned operation of the own vehicle to the acceleration-deceleration control unit 172, the direction control unit 173, and the like.

The acceleration-deceleration control unit 172 performs acceleration-deceleration control for implementing the operation of the own vehicle planned by the operation planning unit 163 or the emergency avoidance unit 171. For example, the acceleration-deceleration control unit 172 calculates a control target value of the driving force generator or a braking device for implementing a planned acceleration, deceleration, or sudden stop, and supplies a control command indicating the calculated control target value to the drive system control unit 107. Note that there are two main cases where an emergency can occur. That is, there are a case where an unexpected accident occurs due to an unexpected reason during automatic driving on a road that is originally considered safe by the local dynamic map or the like acquired from the infrastructure on the traveling route during automatic driving, and emergency return of the driver will not be in time, and a case where it is difficult for the driver to accurately return from automatic driving to manual driving.

The direction control unit 173 performs direction control for implementing the operation of the own vehicle planned by the operation planning unit 163 or the emergency avoidance unit 171. For example, the direction control unit 173 calculates a control target value of the steering mechanism for implementing a traveling track or a sudden turn planned by the operation planning unit 163 or the emergency avoidance unit 171 and supplies a control command indicating the calculated control target value to the drive system control unit 107.

3. Mode Switching Sequence from Automatic Driving Mode to Manual Driving Mode Next, the takeover sequence from the automatic driving mode to the manual driving mode will be described.

Figure 11:
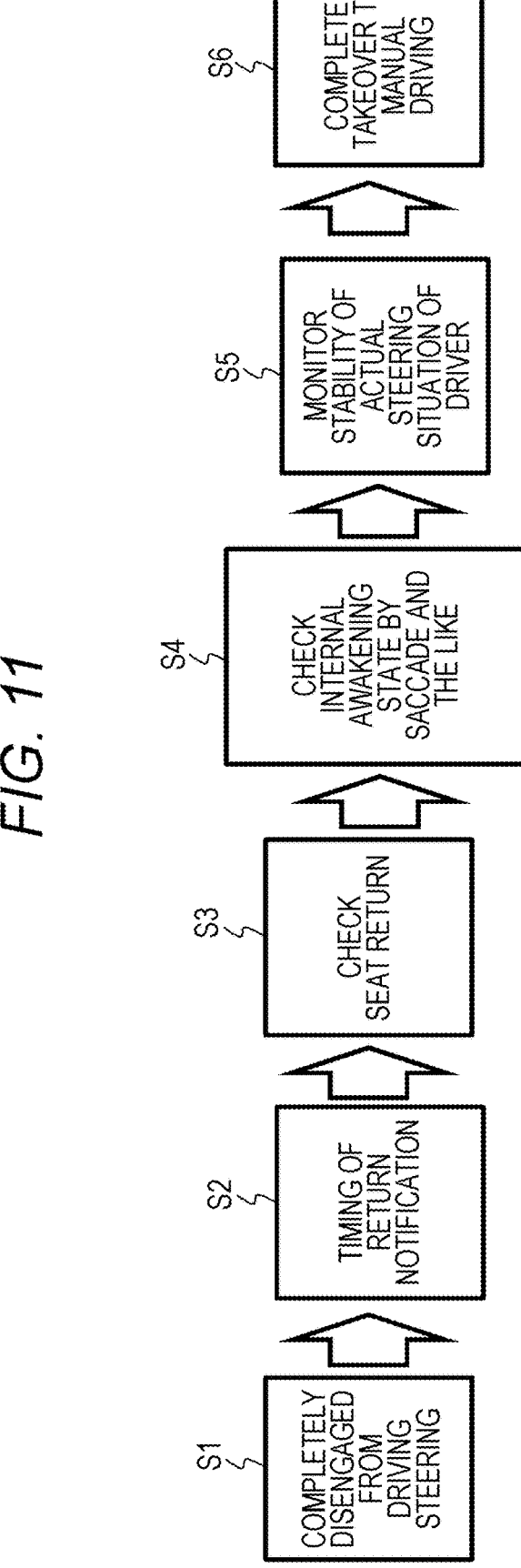
FIG. 11 is a diagram illustrating an example of a mode switching sequence from an automatic driving mode to a manual driving mode executed by the moving apparatus of the present disclosure.

FIG. 11 schematically illustrates an example of a mode switching sequence from the automatic driving mode to the manual driving mode in the automatic driving control unit 112.

In step S1, the driver is completely disengaged from driving steering. In this state, the driver can perform, for example, a secondary task such as having a doze, watching video, concentrating on a game, or work using a visual tool such as a tablet or smartphone. It is conceivable that the work using a visual tool such as a tablet or a smartphone may be performed, for example, with the seat of the driver shifted or in a seat different from the driver seat.

Depending on these states of the driver, when approaching a section on the route where manual driving return is required, it is assumed that the time until the driver returns will vary greatly depending on the work content at that time, and there may occur situations that a notification immediately before the event approaches causes the time until returning to be insufficient, or that the time until the timing actually needed for returning is too long in a case where the notification is given too early to give a margin for the approach of the event. Consequently, if a situation that the notification is not performed at an accurate timing occurs repeatedly, the driver loses confidence in a notification timing of the system, the consciousness with respect to the notification is lowered, and accordingly, the driver neglects to respond accurately. Consequently, the risk of poor takeover increases, and at the same time, it becomes an obstacle to the execution of secondary tasks with peace of mind. Therefore, the system needs to optimize the notification timing in order for the driver to start a response for accurately returning to driving with respect to the notification.

Step S2 is the timing of a manual driving return request notification as described above with reference to FIG. 2. The driver is notified of returning to driving by dynamic haptics such as vibration or visually or audibly. In the automatic driving control unit 112, for example, the steady state of the driver is monitored, the timing of issuing the notification is grasped, and the notification is given at an appropriate timing. In other words, during a passive monitoring period in the previous stage, the execution state of a secondary task of the driver is constantly monitored passively, the system can calculate an optimum timing for an optimum timing of the notification, the passive monitoring during the period of step S1 is constantly and continuously performed, and it is desirable to perform the return timing and the return notification according to the unique return characteristics of the driver.

That is, by learning the optimum return timing according to the return behavior pattern of the driver, vehicle characteristics, and the like, it is desirable to present to the driver a statistically obtained optimum timing required for the driver to normally return from automatic driving to manual driving at a predetermined constant rate or higher. In this case, in a case where the driver does not respond to the notification within a certain period of time, a warning is given by sounding an alarm or the like.

In step S3, it is checked whether the driver has returned to the seat. In step S4, the internal awakening state of the driver is checked by eyeball behavior analysis of the face, saccade, and the like. In step S5, the stability of the actual steering situation of the driver is monitored. Then, in step S6, it becomes a state that the takeover from the automatic driving to the manual driving is completed.

4. Operation Sequence Example of Automatic Driving

Next, an example of the operation sequence of the automatic driving will be described with reference to a flowchart illustrated in FIG. 12.

Figure 12:
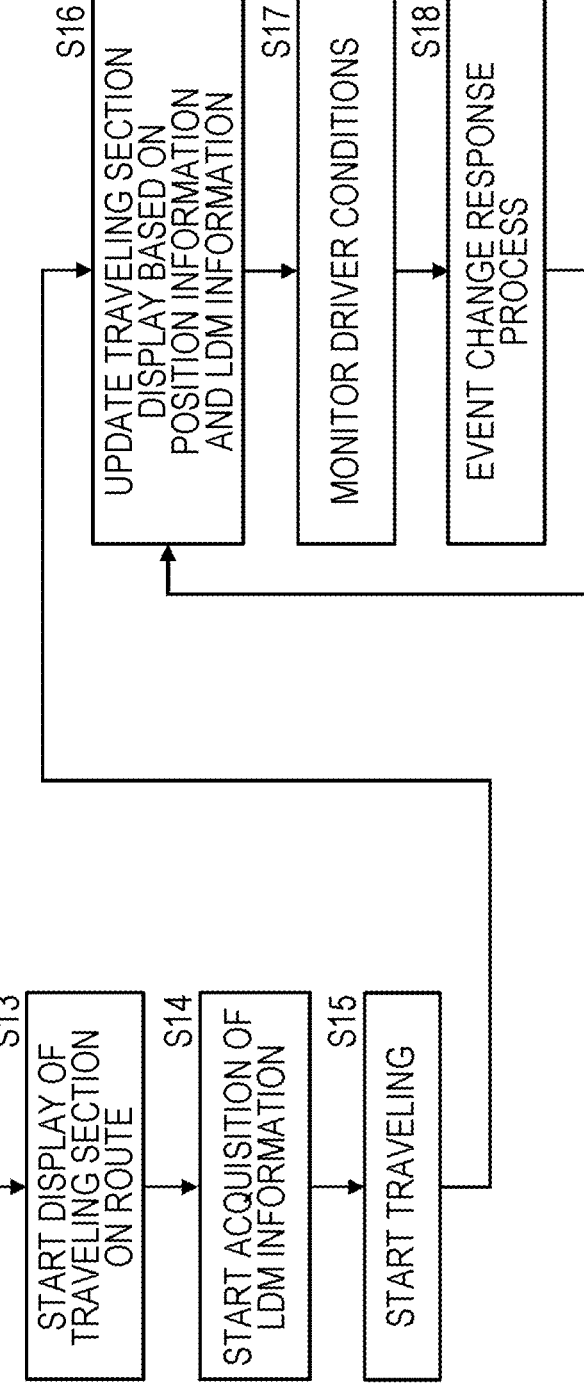
FIG. 12 is a diagram illustrating a flowchart describing an example of an operation sequence of automatic driving.

The flowchart illustrated in FIG. 12 is a flowchart describing an operation sequence of automatic driving for executing 100 of the moving apparatus.

First, in step S11, driver authentication is performed. This driver authentication is performed by knowledge authentication using a password or PIN, biological authentication using a face, fingerprint, pupil iris, voiceprint, or the like, and further by a combination of knowledge authentication and biological authentication. By performing the driver authentication in this manner, even in a case where a plurality of drivers drives the same vehicle, it is possible to accumulate information for determining a notification timing in association with each driver.

Next, in step S12, the driver operates the input unit 101 to set the destination. In this case, an input operation of the driver is performed on the basis of display of the instrument panel.

Note that although an example of a case in which an itinerary setting after getting in the vehicle is assumed is described as the present embodiment, remote advance reservation setting or the like may be performed from a smartphone in advance before getting in the vehicle or from a personal computer before leaving the own home. Moreover, the vehicle system may perform pre-planning setting according to a schedule assumed by the driver in conformity with a schedule table, may update or acquire LDM information of the road environment, that is, what is called local dynamic map (LDM) information that constantly updates, with high density, traveling map information of the road on which the vehicle travels, and further perform actual traveling advice display like a concierge when or before getting in the vehicle, for example.

Next, in step S13, traveling section display on the traveling route is started. In addition to being displayed on the instrument panel, this traveling section display is also displayed side by side with a work window on, for example, a tablet in which the driver performs a secondary task, or the like. Consequently, the driver working in the work window can easily recognize a driver intervention required section and an automatic driving possible section of the traveling route on a predicted arrival time axis from the current position.

In this traveling section display, a forward schedule and approach information to each point are presented. In this traveling section display, the driver intervention required section and the automatic driving possible section of the traveling route are displayed on the predicted arrival time axis from the current position. Then, the driver intervention required section includes a manual driving section, a takeover section from automatic driving to manual driving, and a cautious traveling section from automatic driving. The details of this traveling section display will be described later.

Next, in step S14, acquisition of LDM update information is started. With the acquisition of this LDM update information, the contents of the traveling section display can be changed to the latest state. Next, in step S15, traveling is started. Next, in step S16, the display of the traveling section display is updated on the basis of the position information of the own vehicle and the acquired LDM update information. Thus, the traveling section display is scroll-displayed so that each section approaches the own vehicle accompanying the traveling.

It is not necessary to limit the means of presenting information, such as a traveling environment in front of the vehicle that relatively approaches accompanying traveling and a necessary timing for takeover of the own vehicle, to the scrolling means, and as another method, means is preferable that allows knowing when to start returning to driving by means that presents the imminent time interval intuitively and explicitly and with less misunderstanding. For example, a time presentation method imitating an hourglass or means for directly presenting a takeover remaining time to a user-worn device in the form of a chronograph-type wristwatch may be interposed.

Next, in step S17, the driver conditions are monitored. Next, in step S18, an event change response process is performed. This event change response process includes a mode switching process for responding to a case where a switching point of the automatic driving mode and the manual driving mode that already exist in the traveling route or a cautious traveling section is approaching, and an event generation process for responding to a case where the mode switching point or the driver intervention required section of the cautious traveling section is newly generated in the traveling route. After that, the processes of steps S16 to S18 are repeated as appropriate.

"Details of Traveling Section Display"

Figure 13:
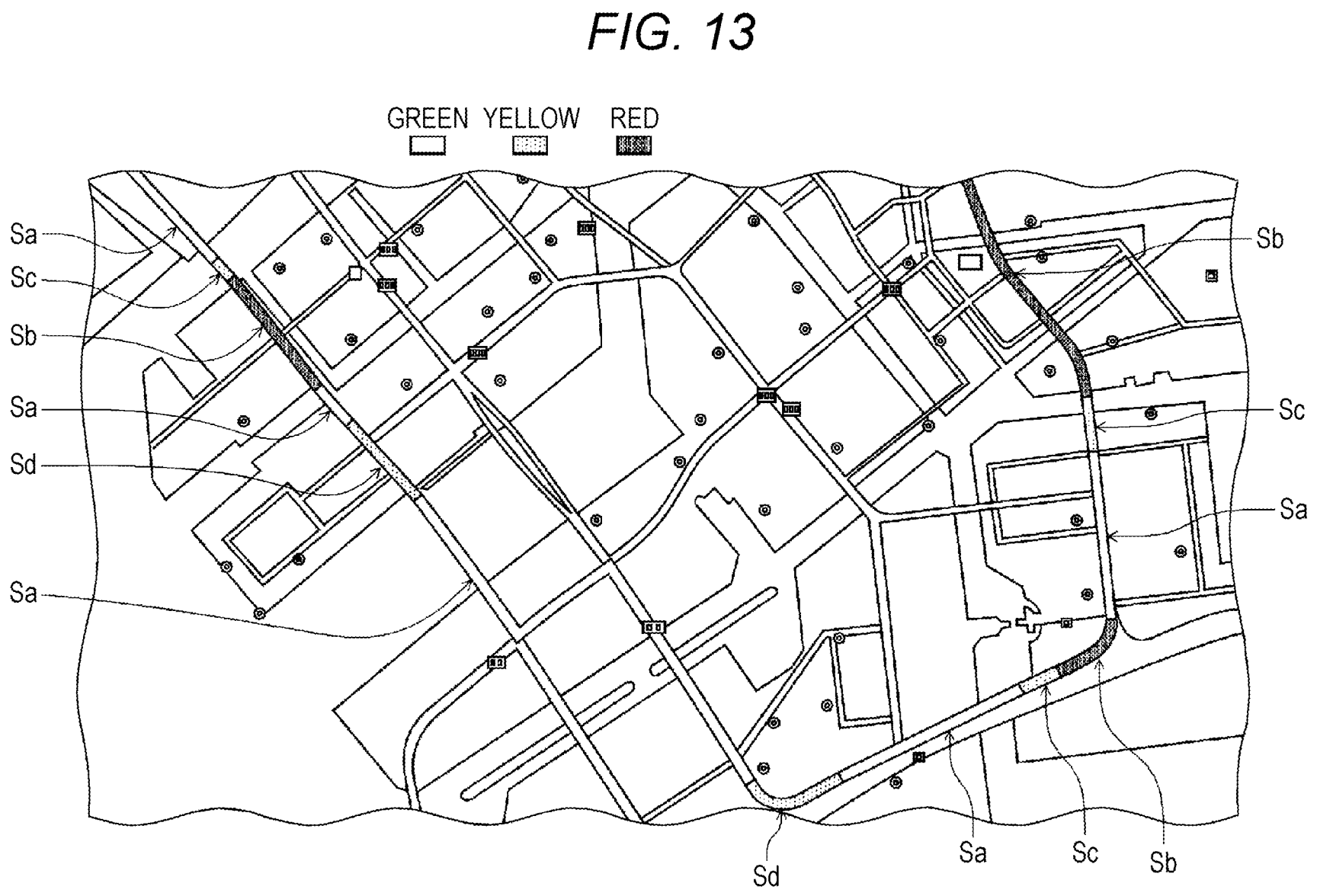

FIG. 13 illustrates an example of a traveling route determined by the driver setting a destination. In this traveling route, there are an automatic driving possible section Sa, a manual driving section Sb, a takeover section Sc from automatic driving to manual driving, and a cautious traveling section Sd from automatic driving. Here, the takeover section Sc always exists immediately before the manual driving section Sb, and the driver needs to be in the posture to return to manual driving. In addition, the cautious traveling section Sd is a section in which traveling is possible by decelerating while continuing automatic driving under cautious monitoring by the driver in the posture to return to manual driving.

In the illustrated example, the automatic driving possible section Sa is depicted in green, the manual driving section Sb is depicted in red, and the takeover section Sc and the cautious traveling section Sd are depicted in yellow. Note that for convenience, respective colors are represented by different patterns.

In the traveling section display on a display device such as a center information display or a tablet, each section of the traveling route as described above is displayed on the predicted arrival time axis from the current position. The automatic driving control unit 112 performs information processing for the traveling section display on the traveling route on the basis of the traveling route information and traffic information.

FIG. 14(a) illustrates each section of the traveling route in a constant scale on the moving distance axis from the current position. FIG. 14(b) illustrates flow velocity v (t) of an average road traffic at each point. FIG. 14(c) illustrates each section represented by a moving distance axis converted into the time axis using the velocity v(t). Thus, each section of the traveling route is represented by the predicted arrival time axis from the current position. That is, the physical distance of the traveling route can be represented by the time axis in which it is divided by the average speed for every applicable section.

In this embodiment, all sections displayed as traveling sections are divided into three sections as illustrated in FIG. 14(d), and the time axis of each section is changed. That is, the first section from the current point to a first point (time t0, for example, approximately 10 minutes) is displayed as a time linear display nearest section on a first time axis. For example, the time t0 is set to a time necessary and sufficient for a general driver to finish the secondary task and return to the driving. Since the nearest section approaching by traveling has a visual intuition effect equivalent to that illustrated on the map advancing at a constant speed, there is a merit that the driver can start preparing for an accurate return to driving accompanying the approaching event, and can sensuously grasp the point to start returning to driving with a certain degree of accuracy. That is, the purpose of displaying this section is to provide the user with information for determining the start of an accurate return point of the driver.

In addition, the second section from the first point (time t0) to a second point (time t1, for example, approximately one hour) is displayed as a time reciprocal display section on a time axis that sequentially changes from the first time axis to a second time axis that is reduced by a predetermined ratio with respect to the first time axis. The purpose of displaying this second section is a device to accurately provide the driver with the road condition of a longer period in a narrow display because it is difficult to display a long period in a narrow display space if the display is mainly performed at the same scale magnification as the first section ahead. Thus, there is a merit that the driver can easily grasp how far the driving intervention is not required in a certain section ahead accompanying traveling, and can engage in the secondary task in a deliberate way. The driving intervention becomes clear, and in the secondary task or the like which accompanies the interaction with the third party, this display plays a role of presenting important information in planning of releasing the driver from the secondary task, or the like.

Here, in FIG. 14(d), the method of setting this second display section will be described. When the height of a triangle is h0, time t at a point h before the tip thereof is calculated by the following equation (1).

$$t = t0 * h0/h \qquad (1)$$

Furthermore, the second time axis at a second point (time t1) is reduced by the ratio of hs/h0 with respect to the first time axis. For example, in a case where hs=h0/8, the reduction ratio is 1/8.

The display of the second display section illustrated above corresponds to a display of viewing a map in which a traveling straight line extension display section on the map is tilted diagonally in the traveling direction in a case where the vehicle is traveling at a constant speed, or a state of diagonally viewing the front on the road plane. In other words, the visual effect of this display section allows intuitively understanding a distance at the position of a displayed image height, and thus it can be said as a display that the sensuous distance can be easily grasped without displaying an accurate position display scale or the like on the screen. Then, although a distant section is reduced, it is not a point that will be reached immediately by traveling. Thus, although a rough prediction is important, it is not necessary for the driver to sensuously grasp the arrival time information as strict as at the nearby point, and hence it is also preferable for making a secondary task execution plan.

Further, a third section from the second point (time t1) to a third point (time t2) is displayed on the second time axis (reduction ratio hs/h0) as a time linear display distant section. By dividing the display into three sections in this manner, it becomes possible for the driver to know the details of information of the temporally most recent section, and also know section information that is temporally farther in a limited display space. Note that if a distant part is displayed while remaining in the display mode of the second section as it is, it will become lower than the human visual resolution and further the limit of the system display resolution, information necessary for planning and determination of the secondary task can no longer be determined, and the meaning of the display function is lost. Therefore, the most effective display is to finish the reduction of the display scale at the stage of a degree that the sense of time interval can be grasped intuitively and a necessary intervening section and an unnecessary section division are properly displayed, and perform display returned to the constant scale again for the subsequent sections.

Note that the vehicle control system 100 has default values of times t0, t1, and t3. Because it is conceivable to separate the values of times to, t1, and t3 for long-distance driving and short-distance driving, the default value is not limited to one, and a plurality of types may be provided and selectively used by the driver (user) or the system according to the traveling route. Furthermore, it is also conceivable to allow the driver (user) to arbitrarily set the values of times to, t1, and t3.

Figure 15:
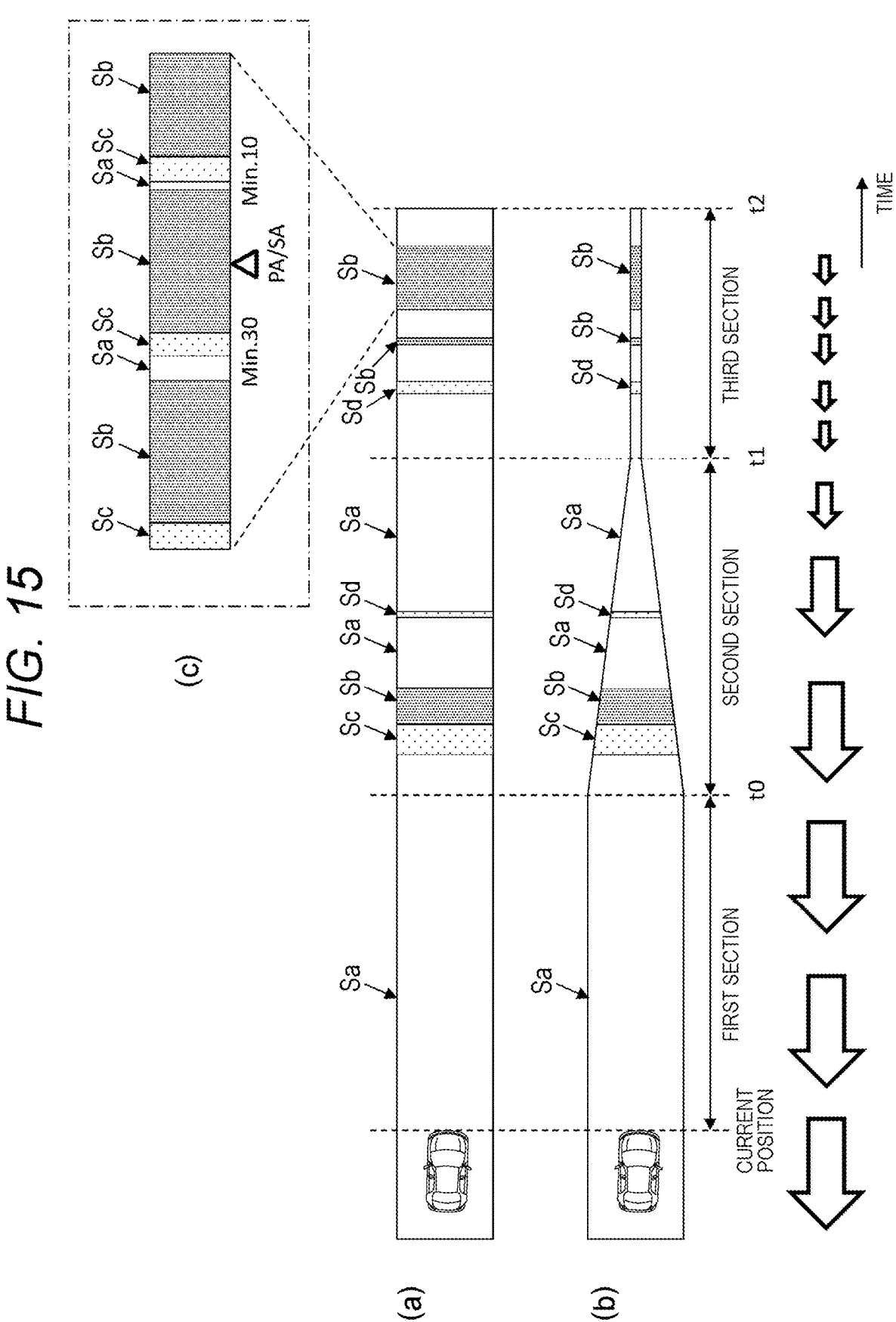
FIG. 15 is a diagram illustrating an example of traveling section display that is finally displayed.

FIGS. 15(*a*) and 15(*b*) illustrate examples of traveling section display that is finally displayed. Note that the length of an arrow indicates whether or not the time axis is linear, and further a change in the reduction rate of the time axis. In the case of FIG. 15(*a*), all sections of a first section, a second section, and a third section are displayed with a first width as it is.

Figure 14:
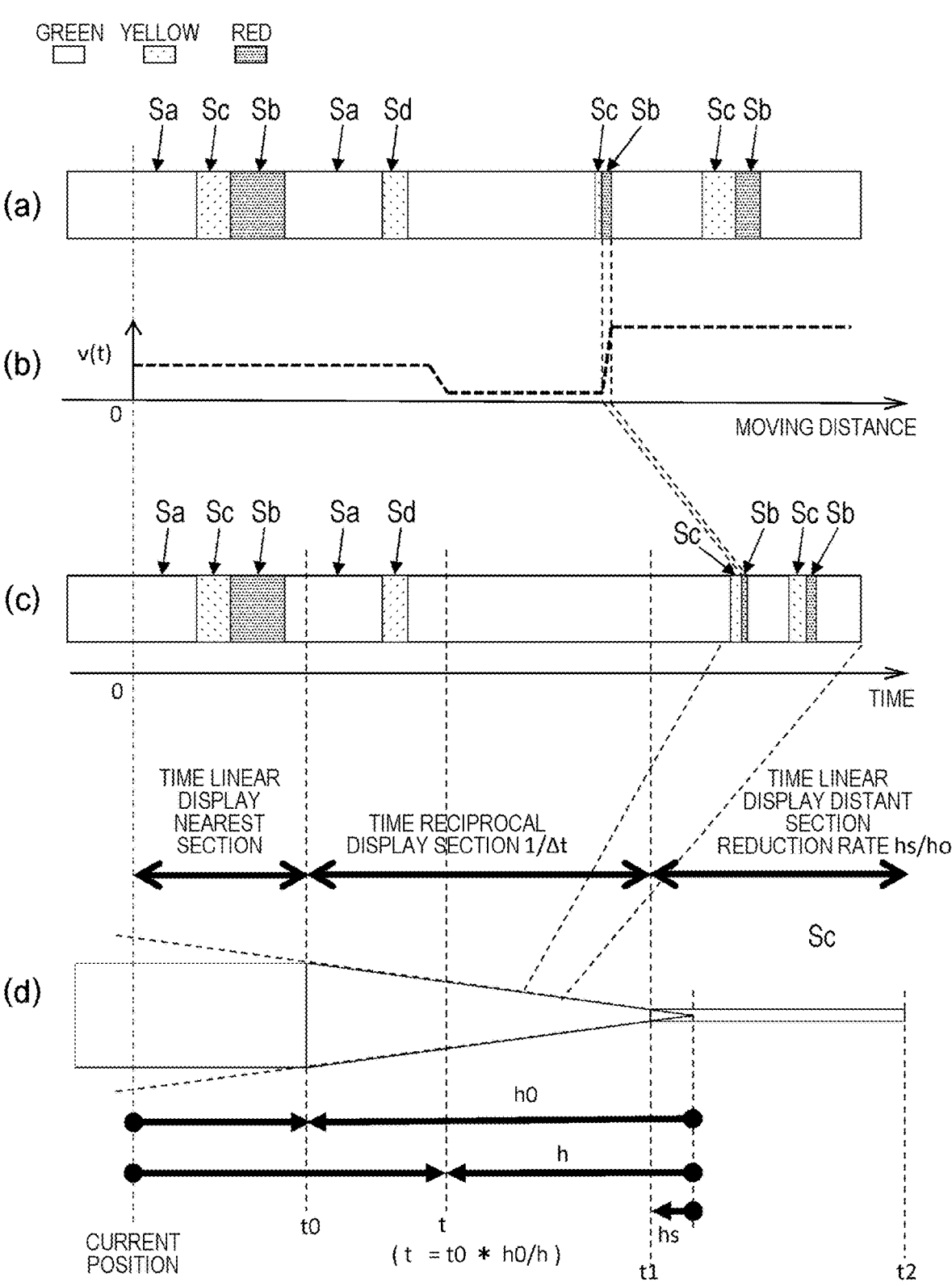
FIG. 14 is a diagram for explaining information processing for traveling section display on a traveling route.

On the other hand, in the case of FIG. 15(*b*), the first section from the current point to a first point (time t0) is displayed with a first width, the second section from the first point (time t0) to a second point (time t1) is displayed with a width that gradually changes from the first width to a second width that is narrower than this first width, and the third section from the second point (time T1) to a third point (time T2) is displayed with the second width. Thus, the driver can visually recognize the degree of reduction of the time axes of the second section and the third section with respect to the first section. In other words, the display mode in FIG. 14 is a display that considers only the reduction ratio in the traveling direction, by further changing a transverse width of the displayed information with respect to the traveling direction in an artificial manner according to the perspective, the same perspective effect as looking infinitely along with advancement of the road or map can be obtained, and it becomes easier to intuitively grasp the distribution of driving intervention required sections than just looking at the screen for a moment. In particular, in a case where only the second section is rotated counterclockwise, it is comparable to the road width in front of the road and the arrival time at each corresponding point just like the case of traveling at a constant speed, and thus it can be said that it is a display mode that enables to intuitively grasp the actual feeling of reaching each point and allows time allocation without visually checking an accurate position memory.

Note that, for example, in a part where the reduction ratio hs/h0 is small as in the third section, if the section with a short time length is displayed without changing the time length, the section is displayed very thin and it is expected to be difficult for the driver to recognize. Thus, even if the driver intervening section (manual driving section, takeover section, cautious traveling section) is actually equal to or shorter than a certain time length, it is displayed with a certain time length. In this case, for example, in a case where the takeover section and the manual driving section are continuous, the display of the takeover section may be omitted. In FIGS. 15(*a*) and 15(*b*), the display of the first manual driving section Sb of the third section indicates such a state. Accordingly, in the third section where the time axis is greatly reduced, it becomes possible to display the driver intervention required section for a short time length in a manner recognizable by the driver.

Further, in a part where the reduction ratio hs/h0 is small as in the third section, in a case where the manual driving section Sb is intermittently continuous in a short cycle, it is displayed as the manual driving section Sb in which the whole is connected. In FIGS. 15(*a*) and 15(*b*), the display of the second manual driving section Sb of the third section illustrates the state of being connected and displayed in this manner. As illustrated in FIG. 15(*c*), the manual driving section Sb displayed in this manner actually includes a short-term takeover section Sd and an automatic driving possible section Sa in addition to the manual driving section Sb. Note that as will be described later, detailed display is possible by, for example, double-touching the point while the traveling section display is displayed on the tablet or the like.

Figure 16:
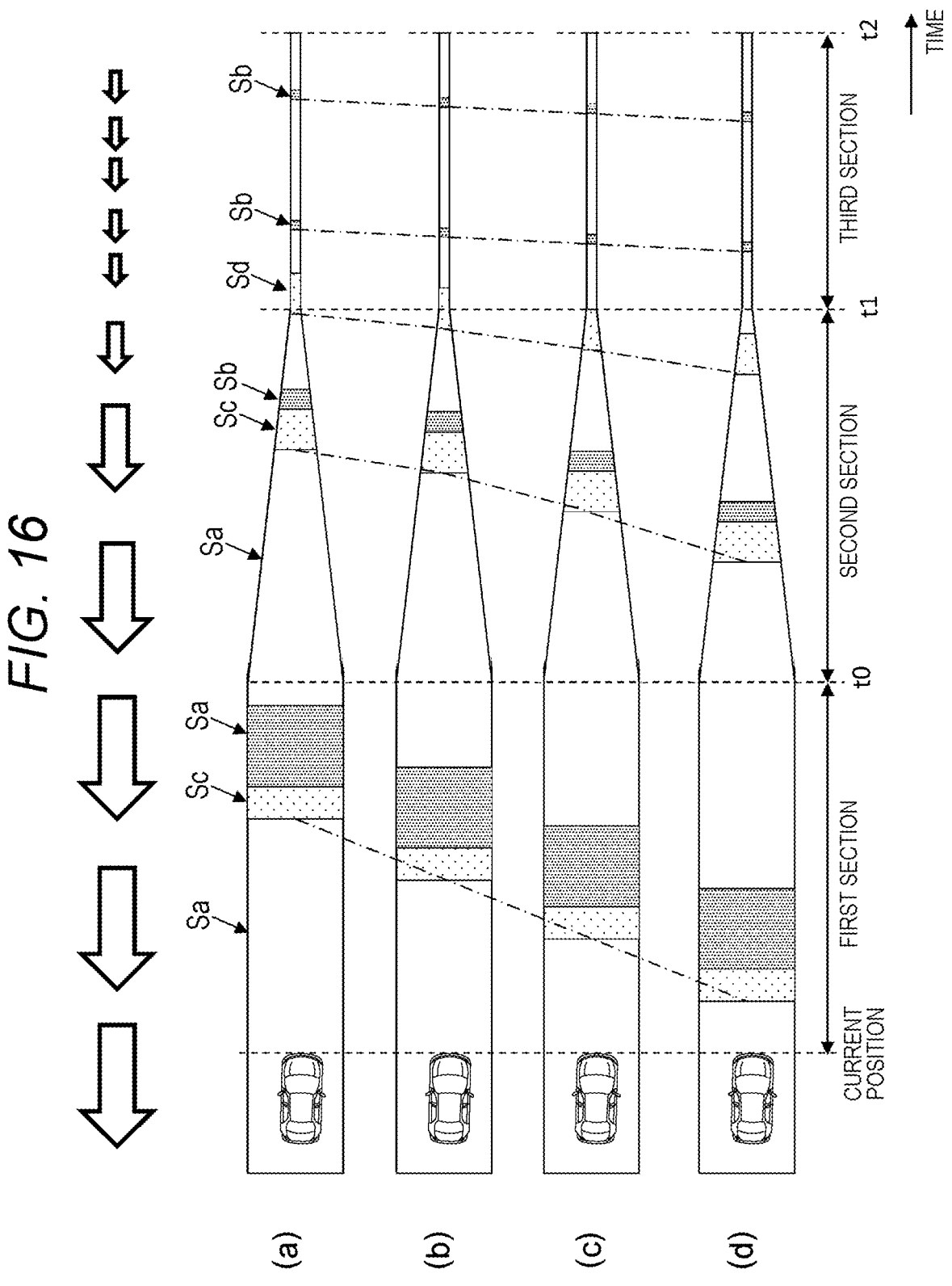
FIG. 16 is a diagram illustrating an example (scrolling example) of a change in the traveling section display over time.

The traveling section display on the above-mentioned traveling route is updated on the basis of the position information of the own vehicle and the acquired LDM update information. Thus, the traveling section display is scroll-displayed so that each section approaches the own vehicle over time. FIGS. 16(*a*) to 16(*d*) illustrate examples of changes in the traveling section display over time. This example illustrates an example in which the second section is tapered, but it is similar in a case where all the sections are displayed with the same width.

In this case, the movement of each section is fast in the first section. Further, in the second section, the reduction of the time axis decreases and thus the movement of each section becomes faster from the third section side to the first section side. Further, in the third section, the reduction of the time axis is large, so that the movement of each section is slow.

FIGS. 17(*a*) and 17(*b*) illustrate examples of a traveling section display 181 in the traveling route displayed on a screen of a tablet 182. FIG. 17(*a*) illustrates an example of a case in which the tablet 182 is used in portrait orientation. In this case, the traveling section display 181 is displayed in a bent state from the left side to the upper side, and is displayed in parallel with a work window, which is an execution screen of the secondary task performed on the tablet 182. FIG. 17(*b*) illustrates an example of a case in which the tablet 182 is used in landscape orientation. Also in this case, the traveling section display 181 is displayed in a bent state from the left side to the upper side, and is displayed in parallel with the work window, which is the execution screen of the secondary task performed on the tablet 182. Note that in the illustrated examples, the traveling section display 181 is arranged in a bent state on the screen of the tablet 182, but it may be arranged linearly in a case where a sufficient arrangement space can be taken.

Figure 18:
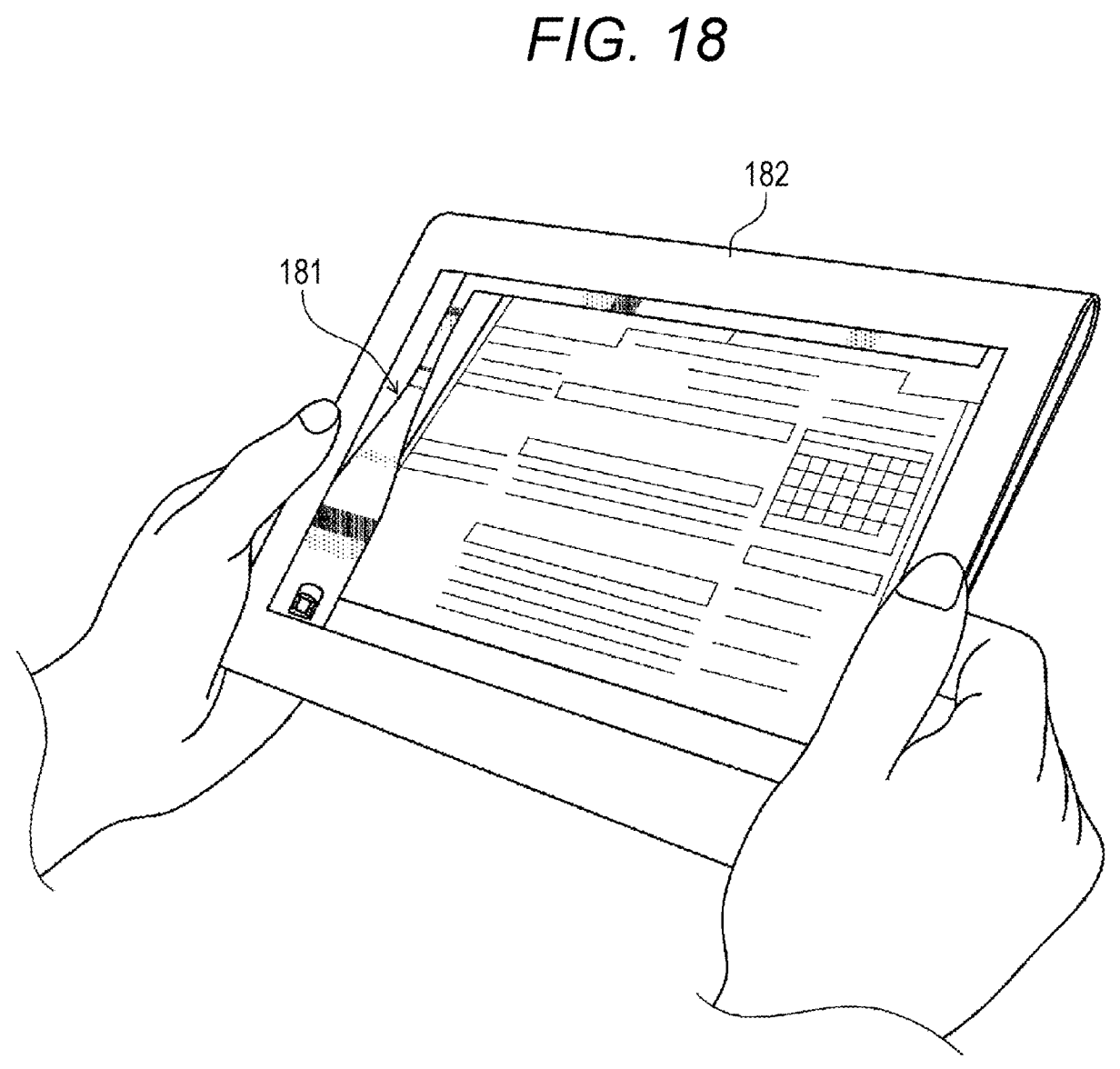

FIG. 18 illustrates an example of a state in which the driver is actually executing the secondary task using the tablet 182. In this example, the tablet 182 is used in landscape orientation. On the screen of the tablet 182, the traveling section display 181 is displayed in a state of being bent from the left side to the upper side. Note that whether or not to display the traveling section display 181 on the screen may be selectively determined by an operation of the driver (user). In that case, for example, in a case where the traveling section display 181 is not displayed on the screen, when the driver intervention required section comes in within a certain period of time and the driver is notified, the traveling section display 181 may be automatically displayed on the screen.

In a state that the traveling section display 181 is displayed on the screen of the tablet 182, in a case where a new driver intervention required section occurs in the display section thereof, a display of the newly generated driver intervention required section newly occurs. In this case, this newly generated driver intervention required section is displayed by, for example, blinking for a certain period of time so as to be distinguishable from others. This blinking display may be accompanied by a caution alarm sound. Here, in a case where the new driver intervention required section is generated, it includes a case where a cautious traveling section and a manual driving section are newly generated, and further includes a case where the cautious traveling section is changed to the manual driving section.

FIG. 19 illustrates a state in which a cautious traveling section Sd is newly generated in the second section and the driver is warned by blinking display. Note that in this case, the driver may be able to stop the blinking, that is, the warning state by touching the display position of the cautious traveling section Sd that is displayed blinking. Alternatively, by the driver touching the display position of the cautious traveling section Sd that is displayed blinking, a small window may pop up and allow stopping the blinking, that is, the warning state by touching a consent screen.

Figure 20:
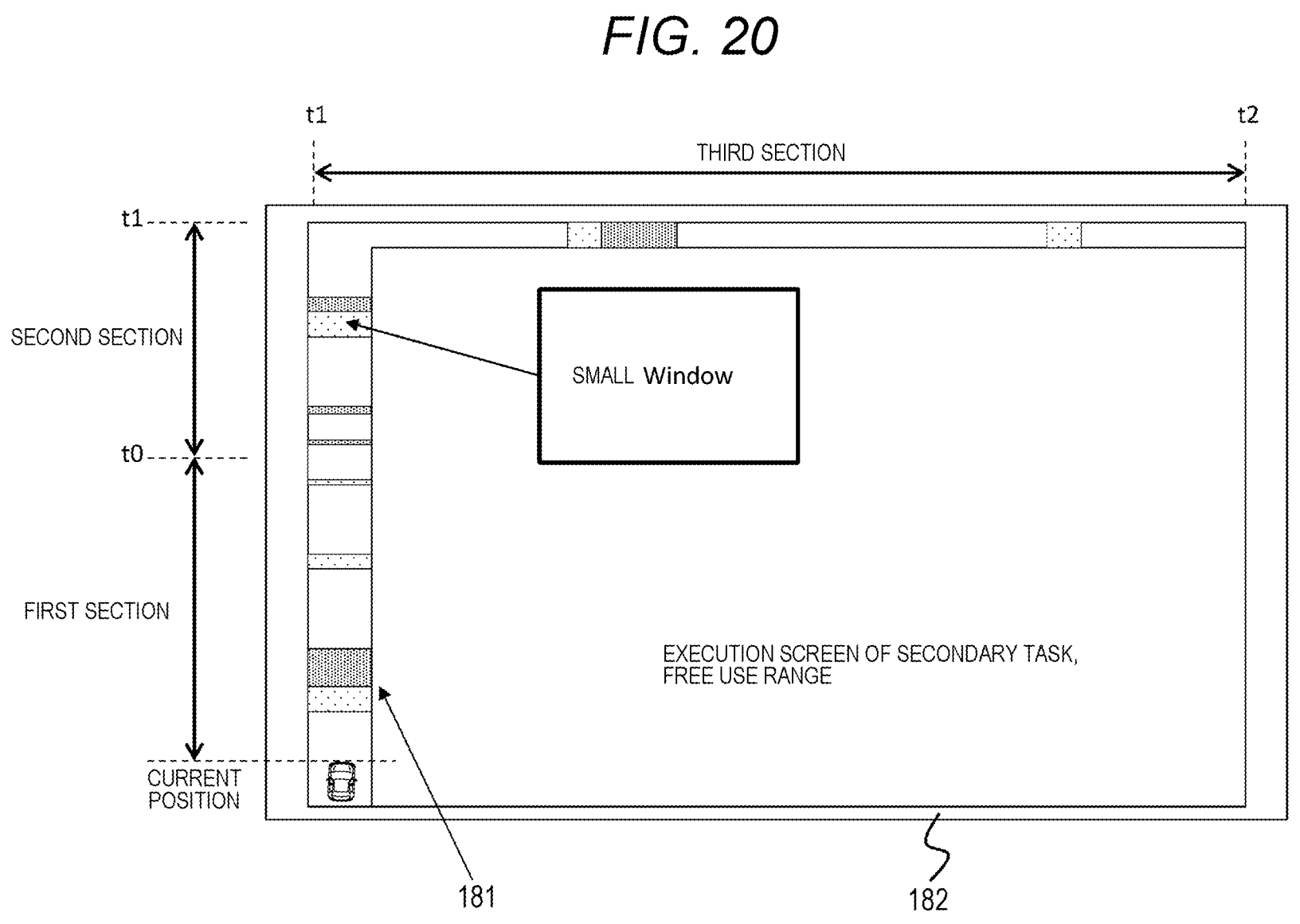

Further, in a state that the traveling section display 181 is displayed on the screen of the tablet 182, in a case where the driver (user) specifies any point by double touching, for example, a small window pops up and a display related to the point is performed as illustrated in FIG. 20.

Figure 21:
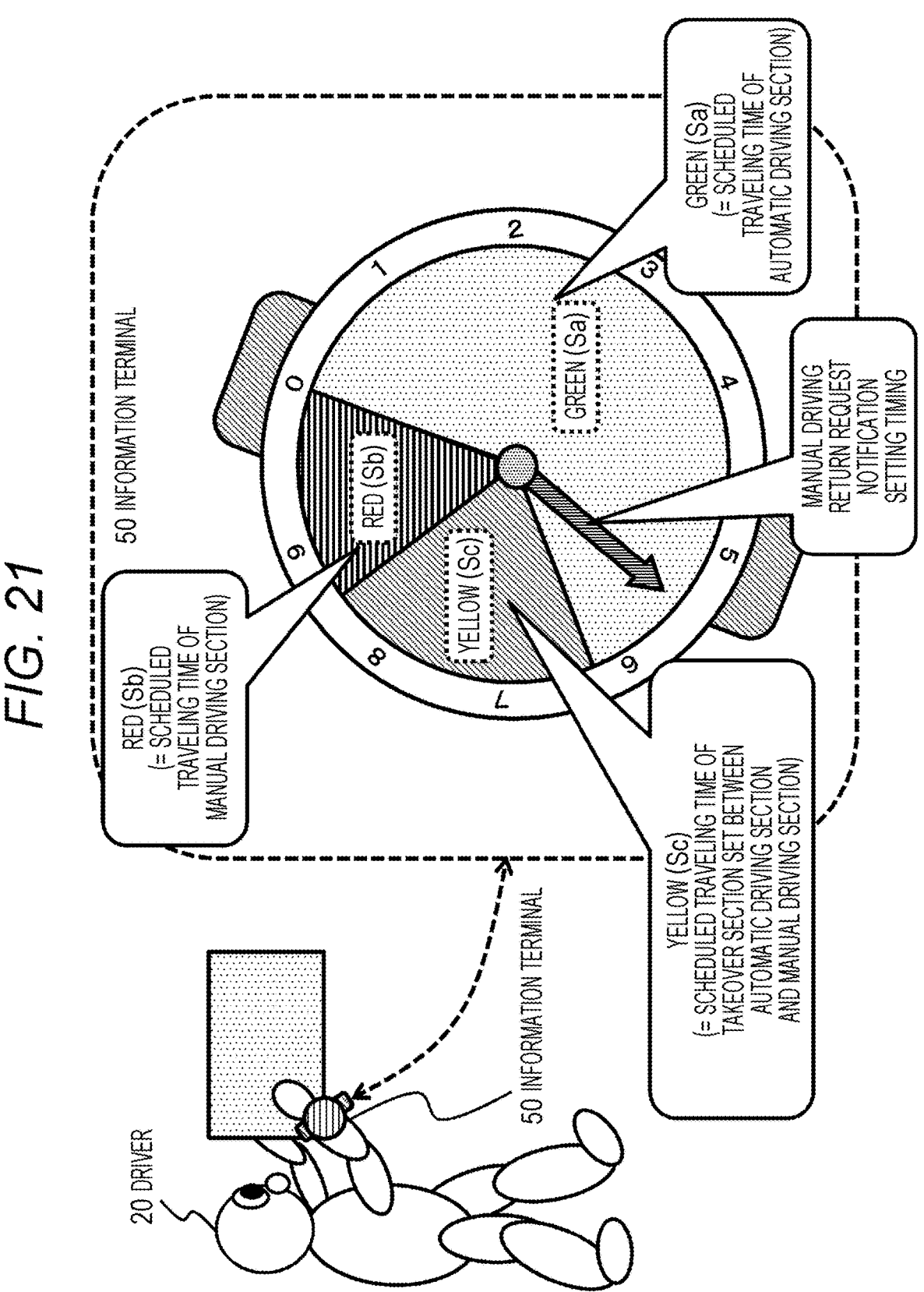
FIG. 21 is a diagram describing a usage configuration example of an information terminal of the present disclosure.

Moreover, as illustrated in FIG. 21, the wristwatch-type information terminal 50 described above with reference to FIGS. 5 and 6 may be configured to display with different colors in units of sections similarly to as described with reference to FIGS. 14 to 20.

The example illustrated in FIG. 21 is an example of displaying information of each section such as an automatic driving section and a manual driving section of a road according to a traveling route determined by setting a destination by the driver. The numerical values from 0 to 9 around the display unit indicate the elapsed time of zero to nine minutes from the current time. The entire display area indicates the section information of scheduled traveling of the automobile from the current time (0) to ten minutes later.

The traveling route includes an automatic driving section Sa and a manual driving section Sb, and further includes a takeover section Sc from automatic driving to manual driving, a cautious traveling section Sd set in the automatic driving section Sa, and the like.

In the display example illustrated in FIG. 21, the following three different display areas are set in the display unit of the information terminal 50.

(Sa) automatic driving section Sa (=displayed in green)
(Sc) takeover driving section Sc (=displayed in yellow)
(Sb) manual driving section Sb (=displayed in red)

The display example illustrated in FIG. 21 illustrates scheduled traveling of the automobile for the next ten minutes. That is, this example illustrates that the vehicle is (Sa) scheduled to travel the automatic driving section Sa (=displayed in green) zero to six minutes and ten seconds later from the current time, and thereafter (Sc) scheduled to travel the takeover driving section Sc (=displayed in yellow) six minutes and ten seconds later to eight minutes and forty seconds later from the current time, and further thereafter (Sb) scheduled to travel the manual driving section Sb (=displayed in red) in eight minutes and forty seconds later from the current time.

Note that the information terminal 50 receives, via a communication unit, scheduled traveling time information for each section, which is calculated by the data processing unit 11 in the automobile 10 on the basis of the travel speed of the automobile 10 or the average speed information of the vehicle on the traveling route of the automobile 10, and displays the information.

By looking at the information displayed on the information terminal 50, the driver 20 can check the remaining time until he or she enters the manual driving section, and can finish the work in the luggage compartment 21 and return to the driver seat on time by that time.

Note that in the example illustrated in FIG. 21, it is possible for the driver 20 to grasp that the vehicle will enter the manual driving section approximately eight minutes and forty seconds later from now on the basis of the display of the information terminal 50, and can proceed with the work so as to return to the driver seat by then.

Furthermore, an arrow is further displayed on the information terminal 50 illustrated in FIG. 21. This arrow is set at a time for a notification of the manual driving return request, for example, for notifying the driver 20 of warning by switching to the display illustrated in FIG. 5, or alarm output or vibration activation. This notification timing is determined, for example, on the moving apparatus (automobile 10) side on the basis of information of at least one of the awakening level or the position of the driver. The determined notification timing information is transmitted to the information terminal 50. The time display of the notification by the arrow is only an example, and it is not necessary to limit the means to the arrow if the time interval can be visually presented, such as providing a visual attention attracting function by color classification, mesh display, blinking flash, or the like. Note that the calculation process of an optimum notification timing to be executed in the moving apparatus will be described later.

The information terminal 50 executes the manual driving return request notification at the notification timing received from the moving apparatus. That is, the information terminal 50 executes at least one of the display process or the alarm output or the vibration activation described above with reference to FIG. 5 at the notification timing determined by the moving apparatus. Note that notification settings can be changed or stopped by the user.

Note that in the present embodiment, the display unit of the information terminal 50 is illustrated as a circular display unit but this is an example, and as the shape of the display unit, various settings such as an elliptical shape, a rectangular shape, and the like are possible without being limited to the circular shape.

FIG. 22 is a diagram illustrating an example of changes in display data of the information terminal over time. FIG. 22 illustrates an example of display information of the information terminal 50 at time t1 and display information of the information terminal 50 at subsequent time t2.

Time t2 illustrates an example of display data approximately four minutes after time t1.

The display data at time t2 indicates that it is scheduled to travel the manual driving section Sb (=displayed in red) approximately three minutes and fifty seconds later from the current time.

At the point of time t2, the driver 20 can grasp that the manual driving section Sb (=display in red) is approaching on the basis of the display of the information terminal 50, finish the work in a hurry, and start preparing to return to the driver seat.

Note that the information terminal 50 has an alarm output function and a vibration function. For example, when the remaining time until the manual driving section Sb (=display in red) reaches a predetermined time (for example, one minute), alarm output or vibration activation is performed to notify the driver 20 of a warning. Note that the activation time of the alarm and vibrations can be changed or stopped by user settings.

5. Configuration for Performing Response Process in Case where Takeover to Manual Driving is Difficult Next, a configuration for performing a response process in a case where takeover to manual driving is difficult for the driver will be described.

The configuration described below is a configuration that enables the system to promptly announce abandonment of takeover when switching from automatic driving to manual driving in a case where the driver is not confident of switching completely to manual driving.

When a vehicle performing automatic driving enters a section where the vehicle cannot be driven by automatic driving, it is possible that the manual driving ability of the driver has not been restored, and failure in takeover to manual driving may occur. In such a case, the automatic driving system needs to execute an evacuation process such as urgently stopping the vehicle on a road shoulder, or the like.

However, for example, even if some vehicles suddenly decelerate in a vehicle flow that flows at high speed, it will affect the traveling of surrounding vehicles, and it is possible that traffic congestion occurs, or follow-up braking for the deceleration is not made on time and induces secondary damage such as a rear-end collision. In order to minimize such influences, it is necessary to slow down gradually or start deceleration early.

The current automatic driving technology has not yet reached the level of autonomously recognizing the environment and achieving safe driving according to the environment. However, it is possible to use automatic driving as long as it is a section where a certain environment is maintained.

The advantage of a car is that it enables moving between any two different points by the same transportation means called a car. In order to travel between two points entirely by automatic driving, it is necessary that the road between the two points is a section where an environment suitable for automatic driving is maintained.

However, it takes an enormous amount of time and cost to create an environment where automatic driving is possible on all roads, and it is assumed that it will be necessary for a while to switch between automatic driving and manual driving while traveling. In other words, in a case where the means called a car is used to move between any two points and automatic driving is usable on the way, the need for performing takeover smoothly during traveling arises unless the car is temporarily stopped on evacuation site or the like and run again in a different mode.

If this switching between automatic driving and manual driving is not performed smoothly during traveling, there is a risk of causing traffic congestion and rear-end collisions. For example, in a case where the switching point from the automatic driving section to the manual driving section is approaching, the vehicle system and the driver need to prepare a state in which complete manual driving can be performed before reaching the switching point. If the vehicle enters the next section with the driver or system being not ready, necessary control for the vehicle will not be performed or will be delayed, and there is a risk that it will not be possible to respond appropriately to unforeseen circumstances.

It is quite inconvenient to stop the vehicle at the time of switching and switch to automatic driving or switch from automatic driving to manual driving after the preparation for switching is completed. That is, in a case where there is a section in which automatic driving can be used, it can be said that a desirable mode is to switch between the sections without stopping the vehicle as appropriate.

At the time of entering the manual driving section, the driver has to be in a state that complete manual driving can be performed, but in order to ensure this, the driver must manually drive during automatic driving, it is necessary for the vehicle system to determine whether the driver is at a consciousness level of being able to return to driving by manual driving during traveling by automatic driving, and to entrust the steering of the vehicle to the driver in a case where it is determined that the driver is able to return to driving.

However, the vehicle system cannot always grasp the internal awakening state of the driver 100% accurately. At the stage that the vehicle system determines that the driver is unable to return to manual driving during traveling in the automatic driving section, the system needs to slow down, drive slowly, or stop the vehicle. If this determination is delayed, the need for sudden stopping occurs at the stage of approaching the takeover point, which will cause various problems such as obstruction of traveling of the following vehicle, a congestion-inducing factor, a rear-end collision factor, and the like.

It is extremely difficult for the system to determine the level of internal awakening state to know if the driver can return to operation at the stage before the driver starts manual driving. For example, although it may be a rare event, thinking and determination of the driver after waking up from sleep have not always reached a state of being able to perform normal driving. In some cases, the posture during that time may be poor and a part of the body may be numb.

For example, after the driver has been involved in the secondary task and received a takeover notification, the driver himself or herself may determine that the preparation for returning to manual driving from the secondary task is insufficient.

In such a case, if the driver can announce to the vehicle system that he or she abandons returning to manual driving, that is, refuses to start manual driving at an early timing, the vehicle system can execute various evacuation actions at an early timing before approaching the manual driving section according to the intention of the driver. For example, it is possible to respond with deceleration, slow driving, stopping, changing a low influence bypass route, or the like with a time grace. The influence on the following vehicle can also be avoided.

By allowing the driver to input the intention to abandon (refuse) returning to manual driving to the vehicle system in this manner, it is expected that secondary adverse effects due to failure in takeover will be limited.

For use of automatic driving to be widely recognized in society, and to apply the automatic driving to ordinary vehicles and use it, it is necessary to ensure that reliable takeover is performed at the takeover point between an automatic driving possible section and a manual driving required section.

However, there are various physical conditions and circumstances of drivers, and there is no guarantee that all drivers are able to perform reliable takeover at a takeover point. The configuration of the present disclosure is made in view of such reality, and by allowing the driver to refuse takeover to manual driving, it enables the evacuation process to be smoothly executed on the system side.

Currently, there are researches on introduction of automatic driving in which the driver monitors the system and it is assumed that the driver will return to steering instead of the system in a case where a system control response is difficult, that is, what is called level 3 automatic driving vehicles.

However, when the driver uses the level 3 automatic driving continuously for a long time and observes the situation in which the system normally performs steering while being self-driving under various situations, it is expected that the driver no longer feels the need for monitoring driving during the automatic driving.

Even if the driver is obligated by regulations to constantly monitor the system while using the level 3 automatic driving, the driver would no longer feel the need for monitoring. That is, even at a level where the driver is originally supposed to supplement the limits of the system as in the level 3 automatic driving, if the state that a person does not intervene in driving continues for a long period of time, the driver will forget the importance of monitoring. Consequently, there occurs a situation that even if the system requests the driver for takeover to manual driving, the driver is not necessarily retaining the state of consciousness of being able to return.

In order to avoid such a problem, it is necessary for the system to constantly monitor the conditions of the driver and determine at what stage the return request should be made so that the takeover can be performed at an accurate timing. However, monitoring means by which the system can monitor thinking activities in the brain without binding the driver to electrodes or devices are limited, and the observation of readiness of the driver to return is possible only through limited external actions and the like of the driver.

For example, even in a case where the driver himself or herself realizes that it is difficult to return to manual driving, it is not possible to detect the contents of thoughts in the brain of the driver just by monitoring of the vehicle system, and it is not possible to grasp that the driver thinks of refusing manual driving.

Accordingly, the driver is enabled to execute an input to the vehicle system indicating that the driver intends to abandon and refuse to return to manual driving. By enabling this process, the system side can start the evacuation action at an early stage.

For example, in a case where the vehicle system detects from the driver an input of intention to abandon and refuse to return to manual driving, the system can perform a process of slowly decelerating and stop the vehicle at the point when the input is detected, or can perform various types of evacuation control such as an evacuation process to a detour, evacuation to a parking lot, and evacuation to a roadside zone, or the like. Consequently, it is possible to prevent induced accidents and the like and to reduce damage.

However, if the driver uses the manual driving refusal without much thought, the evacuation process by the system occurs frequently, which may cause a hindrance to the traveling of surrounding vehicles, such as traffic congestion due to deceleration. Therefore, it is desirable that declaration of manual driving refusal by the driver is allowed only under certain restrictions.

For example, in a case where the system receives a request from the driver to abandon takeover, the system first shifts to a deceleration mode according to the grace time to the takeover limit point, and further notifies the following vehicle. Moreover, the system may notify the driver of deceleration, and may perform a process of rechecking whether or not a final return to manual driving can be expected with respect to the deceleration notification. That is, in order to recheck whether it is expected that the takeover can be executed due to the time grace generated by the deceleration mode, it may be set to allow an input of cancellation of takeover abandonment.

In the following, a configuration for performing a response process in a case where takeover to manual driving is difficult for the driver will be described in order of the following items.

5-1. Specific examples in case where takeover to manual driving is difficult
5-2. Configuration example of apparatus that executes response in case where takeover to manual driving is difficult
5-3. Specific examples of detection of manual driving return point based on traveling route information and manual driving return necessary time calculation process based on manual driving return time estimation
5-4. Sequence of processing that allows manual driving takeover abandonment by driver
5-5. Processing in case where driver or passenger expresses intention to abandon takeover to manual driving
5-6. Processing example when approaching manual driving switching point
5-7. Pre-processing and post-processing for input of abandonment (rejection) of manual driving takeover from driver or passenger
5-8. Configuration example of information processing apparatus that executes processing for takeover abandonment input

5-1. Specific Examples in Case where Takeover to Manual Driving is Difficult For example, a driver during automatic driving is in various states such as sleeping, working while looking at a display, and sorting luggage in a luggage compartment.

In such a state, even if it is recognized that a switching point from an automatic driving possible section to a manual driving section is approaching, it is possible that there occurs a situation that it is not possible or not desired to return to manual driving until reaching that switching point.

A response method in such a case will be described below.

In a case where the vehicle is in a fully automatic driving state, events that require the driver to return to manual driving can be broadly divided into the following two types of events.

(1) Scheduled takeover event
(2) Unexpected takeover event
(1) The scheduled takeover event is, for example, a takeover event that occurs at a switching point set in advance on a traveling road set by the driver using a navigation system or the like before the start of driving, that is, a switching point between an automatic driving traveling possible section and a manual driving traveling section where automatic driving is not allowed.

At the start of driving, the driver sets two points, a starting point and a destination, to the system (information processing apparatus) of the automatic driving vehicle. Setting a waypoint and use of toll roads, and setting of use of fully automatic driving, or the like are also possible.

The system presents a plurality of selectable traveling routes to the driver on the basis of the LDM (local dynamic map) that can be acquired from the server according to the setting information.

The driver selects one traveling route from the plurality of presented traveling routes.

This selected route is displayed on a monitor of the driver seat or the like. The display data is display data that makes it possible to distinguish between an automatic driving traveling possible section and a manual driving traveling section.

After the start of driving, it is notified that the approach of the switching point between the automatic driving traveling possible section and the manual driving traveling section in advance via the monitor of the driver seat or a human machine interface (HMI) of a user terminal operated by the driver, or the like.

As described above, "(1) Scheduled takeover event" is an event that occurs in a situation where the driver can recognize the approach of the takeover point in advance.

On the other hand, "(2) unexpected takeover event" is an event such as a change or occurrence of a takeover point caused by an unexpected factor. For example, when a sudden change in traffic conditions or weather or the like occurs, the switching point between the automatic driving traveling possible section and the manual driving traveling section may be changed.

Since these pieces of information are also reflected in the LDM (local dynamic map) that can be acquired from the server, it is possible to notify the driver in advance of these changes as well.

However, it is not ensured that the driver checks the updated LDM immediately, and the driver may not be aware of the change in switching point.

In such a case, there is a possibility that the vehicle approaches a switching point that the driver does not recognize. In such a case, an emergency response process will be performed as an unexpected takeover event.

Thus, the "(2) unexpected takeover event" is an event that could not be predicted when the travel route (itinerary) is set before the start of driving. Note that the switching point between the automatic driving traveling possible section and the manual driving traveling section is changed specifically, for example, in the following cases.

(a) Occurrence of change in road environment detected by infrastructure equipment (b) Accident or the like that occurred during itinerary (c) LDM information update based on information provided by public service vehicles such as LDM maintenance vehicle (probe car), bus, and taxi (d) LDM information update based on provision of information from LDM maintenance non-dedicated probe car such as general vehicle or the like (e) Steady LDM information update by leading vehicle (f) LDM information update based on manual report of road conditions by contingently passing preceding vehicle (g) LDM information update based on automatic report of road conditions by contingently passing preceding vehicle (h) LDM information update based on vehicle-to-vehicle communication (V2V communication) information For example, in above cases (a) to (h), the server that updates the LDM (local dynamic map) updates the LDM, and can change the switching point between the automatic driving traveling possible section and the manual driving traveling section. The updated LDM on the server is provided to each vehicle. However, there may be cases where the switching point between the automatic driving traveling possible section and the manual driving traveling section approaches before the driver checks the updated information.

In such a case, it is preferable to perform display on the user terminal or the like or output an alarm for performing notification of the occurrence of a new switching point or the like.

Note that the response when such an unscheduled, unexpected event occurs is not uniform, and it is preferable to change it according to the situation.

For example, the following measures are taken.

1. In a case of vehicles loaded with hazardous materials, control such as early return to manual driving and early start of slow driving is performed for safety reasons.

2. In a situation where it is known in advance that an automatic driving difficult section such as a road with a narrow passing width, frequent curves, and the like occurs ahead on the travel route on the basis of the LDM information, control is performed to complete switching to manual driving at the earliest possible stage.

3. The response is changed according to a vehicle accommodation allowance state of an emergency evacuation zone such as a parking lot.

5-2. Configuration Example of Apparatus that Executes Response in Case where Takeover to Manual Driving is Difficult Next, a configuration example of an apparatus that executes a response in a case where takeover to manual driving is difficult will be described.

Figure 23:
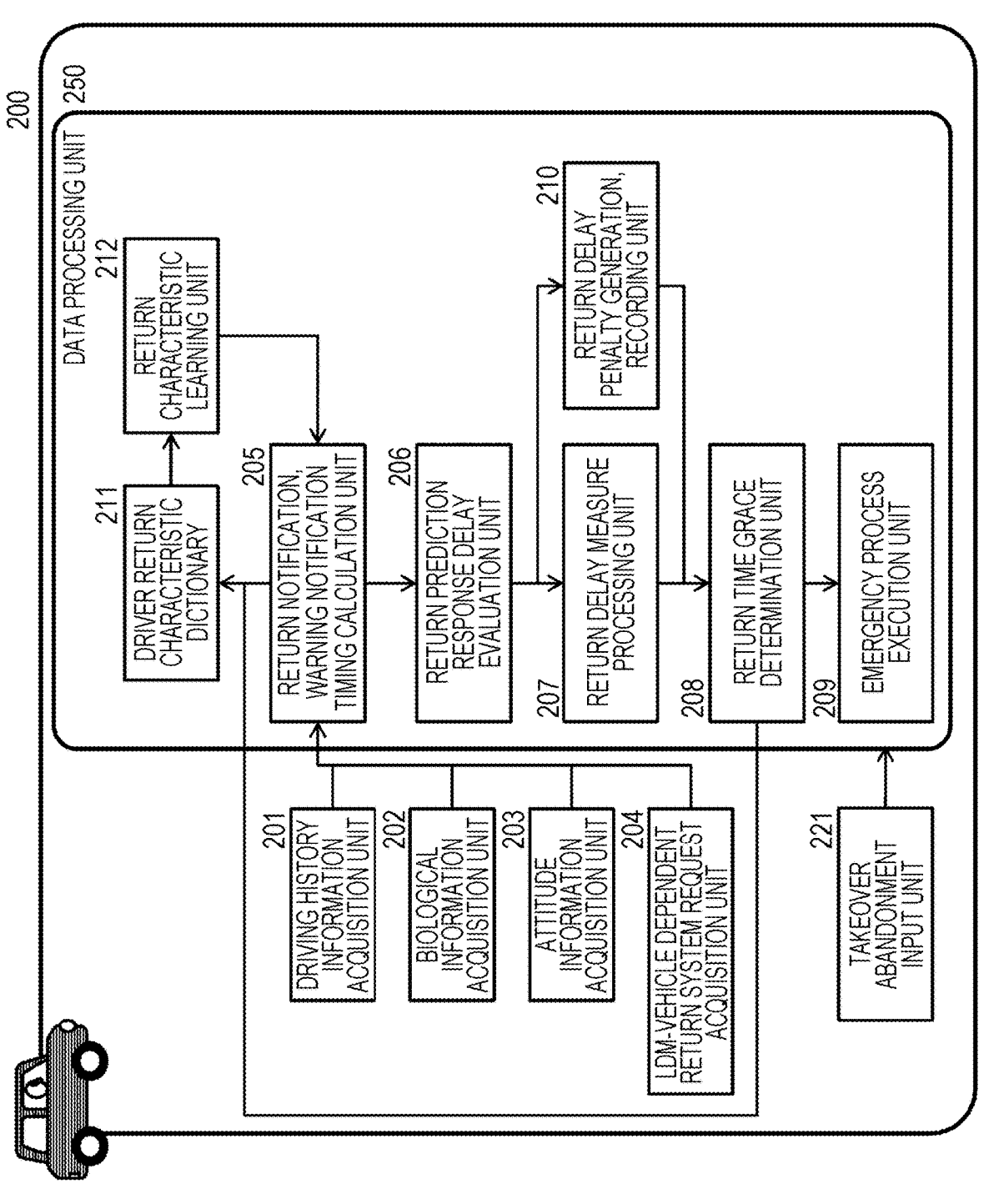
FIG. 23 is a diagram describing a configuration example of an information processing apparatus in the moving apparatus of the present disclosure.

FIG. 23 is a block diagram illustrating a partial configuration of an information processing apparatus 200 mounted on the moving apparatus. It is a block diagram which illustrates the apparatus configuration which executes a response in a case where takeover to manual driving is difficult.

As illustrated in FIG. 23, the information processing apparatus 200 includes a driving history information acquisition unit 201, a biological information acquisition unit 202, a posture information acquisition unit 203, an LDM-vehicle dependent return system request acquisition unit 204, a data processing unit 250, and a takeover abandonment input unit 221. Note that the vehicle-dependent factor is handled separately as a control influential factor because the required control, braking distance, and stoppable area are different due to different braking dynamics and body widths between passenger cars and cargo-loaded vehicles, shared buses, and liquid transport tank trucks, and the like.

The data processing unit 250 includes a return notification, warning timing calculation unit 205, a return prediction response delay evaluation unit 206, a return delay measure processing unit 207, a return time grace determination unit 208, an emergency process execution unit 209, a return delay penalty generation, recording unit 210, a driver return characteristic dictionary 211, and a return characteristic learning unit 212.

The driving history information acquisition unit 201 acquires driving history information of the driver from a storage unit. Note that although the storage unit is not illustrated, it is a storage unit inside the information processing apparatus in the moving apparatus.

The biological information acquisition unit 202 and the posture information acquisition unit 203 acquire biological information and posture information of the driver. They are generated on the basis of acquired information of various sensors including a camera provided in the moving apparatus.

The LDM-vehicle dependent return system request acquisition unit 204 acquires the LDM (local dynamic map) that can be acquired from the server, vehicle-dependent system requests, for example, information of general passenger cars, buses, vehicles loaded with hazardous materials, and the like as vehicle type information, and moreover, detection information of a camera that detects obstacles in front of the vehicle and a distance sensor such as LiDAR, and the like.

Acquired information of each of the driving history information acquisition unit 201, the biological information acquisition unit 202, the posture information acquisition unit 203, the LDM-vehicle dependent return system request acquisition unit 204, and components thereof are input to the return notification, warning timing calculation unit 205.

On the basis of the input information, the return notification, warning timing calculation unit 205 notifies the driver of a request for return to manual driving, and notifies or warns that a manual driving switching point is approaching.

Note that the timing of this notification or warning will differ depending on the conditions of the driver, and the like.

The return notification, warning timing calculation unit 205 of the data processing unit 250 uses a result of learning process in the return characteristic learning unit 212 using the driver return characteristic dictionary 211 to calculate the timing of notification or warning corresponding to each state of the driver. The driver return characteristic dictionary 211 may be a dictionary common to a plurality of drivers, but it is preferable that a dictionary unique to each driver is generated and used.

It is preferable that the learning process in the return characteristic learning unit 212 is executed as a learning process that includes, for example, the type of secondary task for every driver in observation information.

In this case, a process (manual driving return possible time estimation process) is performed using personal identification information of the driver who is currently driving and information of the type of the secondary task currently being executed as observation information.

Figure 24:
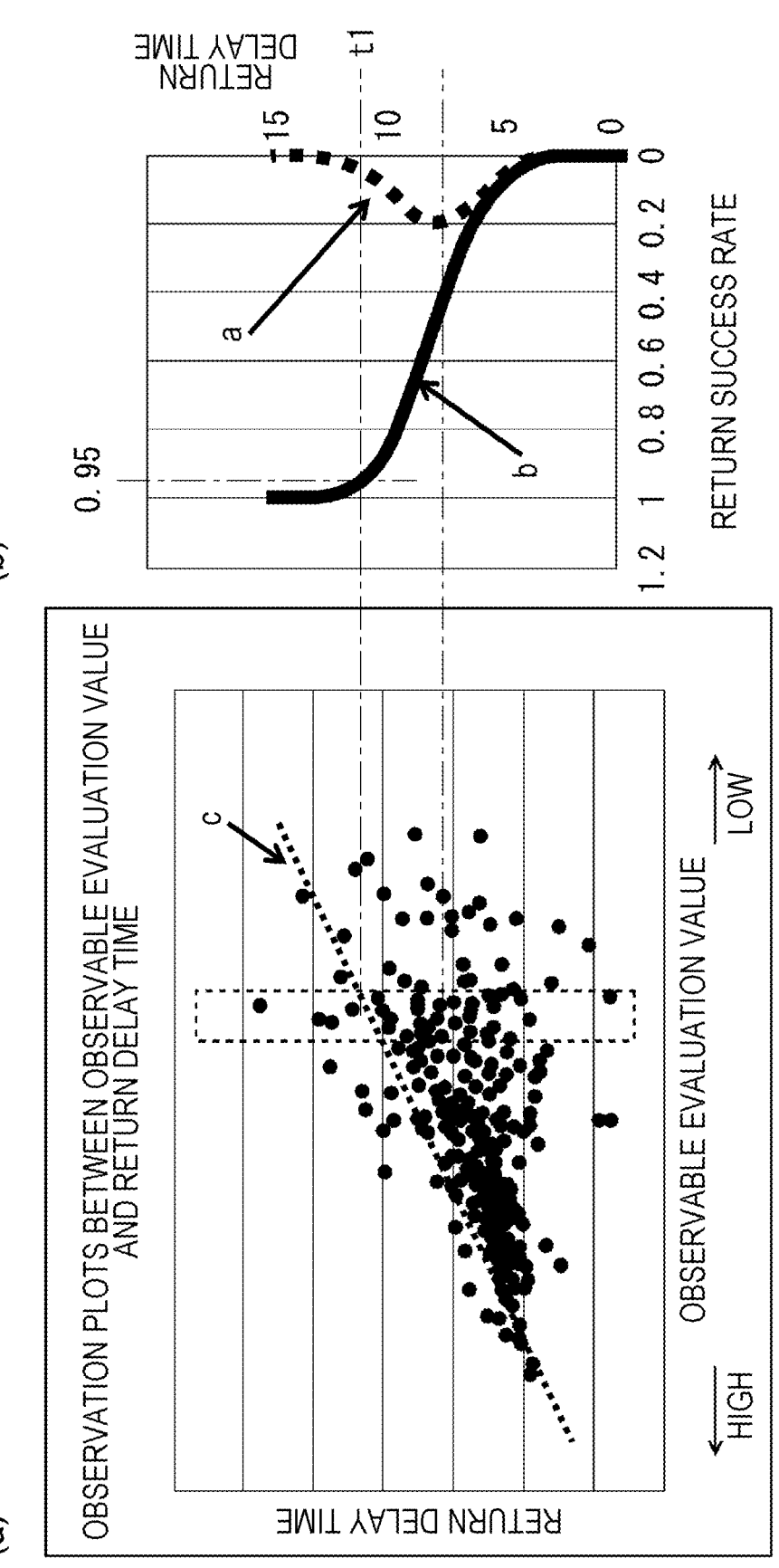
FIG. 24 is a diagram describing a distribution example and a return success rate of a plurality of pieces of relational information (observation plots) of an observable evaluation value corresponding to an observation value and a return delay time (=manual driving return possible time).

FIG. 24(a) illustrates an example of the distribution of a plurality of pieces of relational information (observation plots) between the observable evaluation value corresponding to an observation value and the return delay time (=manual driving return possible time). This example corresponds to a type of secondary task for a certain driver. In order to calculate the return delay time from the plurality of pieces of relational information (observation plots), relational information (observation plots) in a region having a certain width (indicated by a dashed line rectangular frame) in an evaluation value direction corresponding to the acquired observation value is extracted. A dotted line c in the diagram represents a boundary line when the return delay time at which a return success rate in FIG. 24(b) described later is 0.95 is observed with different observation values of the driver.

By issuing an automatic-to-manual return notification or alarm to the driver with a longer, that is, earlier grace time than the dotted line c, it becomes an area where the automatic-to-manual return of the driver is guaranteed to succeed at a rate of 0.95 or more. Note that a target value (request for recovery ratio) for the driver to normally return from automatic driving to manual driving for every corresponding one is determined, for example, from necessity of infrastructure by the road side, and is provided to individual section passing vehicles.

Note that if it is a case where the vehicle does not hinder the surroundings even if the vehicle stops on the traveling road, the vehicle is only required to decelerate to a speed that the vehicle can stop and the system can respond, and then a response may be made. Normally, there are not always many cases where stopping on a traveling road is preferable, and thus a high return rate is desirable as the default setting, and especially on a specific route such as the Metropolitan Expressway, there may be cases where an extremely high return success rate is required by default even if update information is not given from the infrastructure.

FIG. 24(b) illustrates the relationship between the return delay time and the return success rate obtained from the extracted multiple pieces of relationship information (observation plots). Here, the curve a illustrates the single success rate at each return delay time, and the curve b illustrates the cumulative success rate at each return delay time. In this case, the return delay time t1 is calculated on the basis of the curve b so that the success rate is a predetermined ratio, and in the illustrated example, the success rate is 0.95.

This calculation process is executed by the return notification, warning timing calculation unit 205. For example, a calculation process is executed in the return notification, warning timing calculation unit 205 using distribution information of a plurality of pieces of relational information (observation plots) between observable evaluation values and return delay times acquired in the past and stored in the storage unit.

Figure 25:
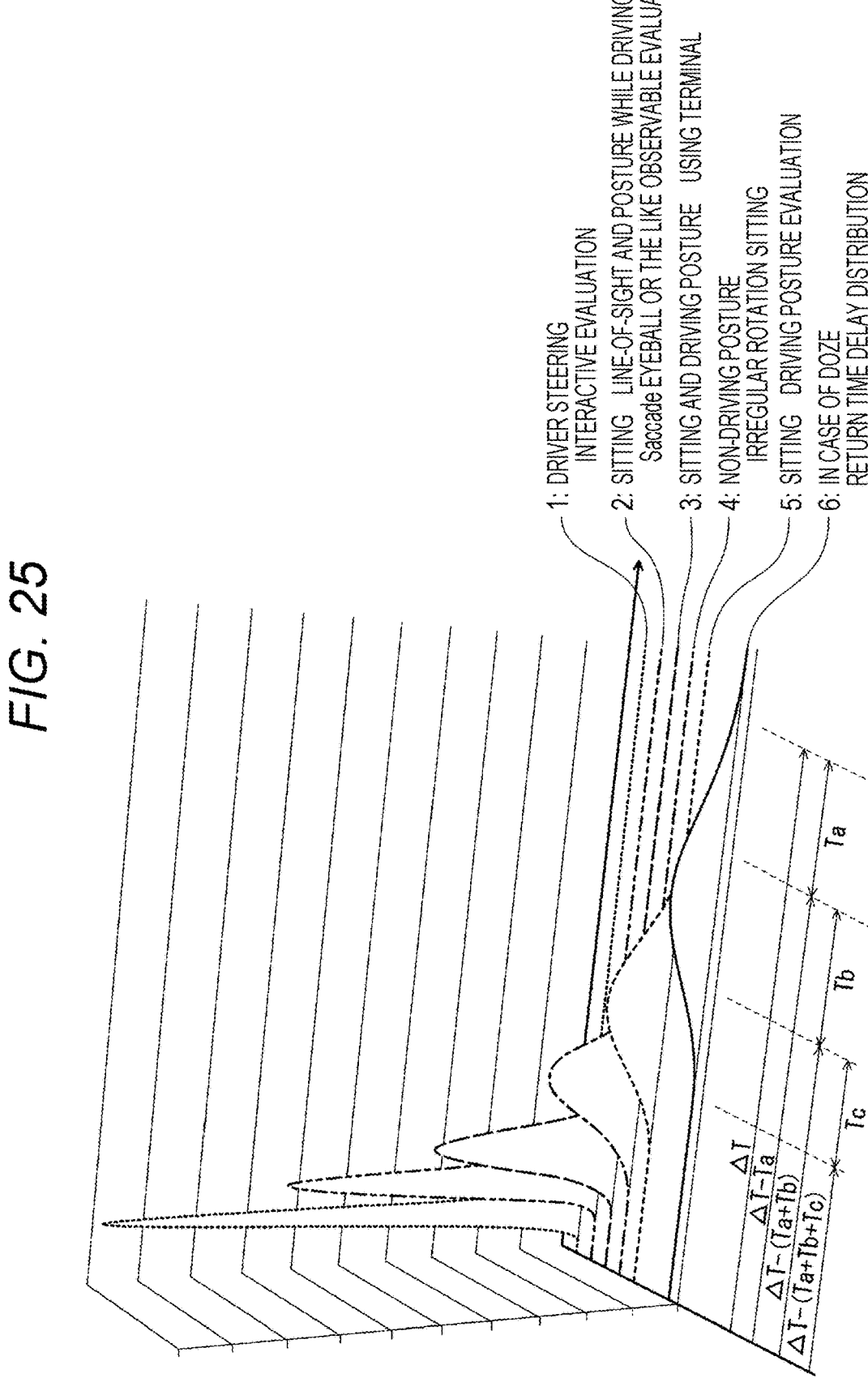
FIG. 25 is a diagram describing a manual driving return possible time according to a type of processing (secondary task) executed by the driver in the automatic driving mode.

FIG. 25 is a diagram describing a manual driving return possible time according to the type of processing (secondary task) executed by the driver when he or she is in a state of being disengaged from the driving steering work in the automatic driving mode.

Individual distribution profiles correspond to the observation values, that is, the curve a predicted on the basis of the conditions of the driver, as illustrated in FIG. 24(b). That is, in order to complete from automatic driving to manual driving at the takeover point with the required return probability, with reference to past characteristics needed by the driver to return from the observation values that can evaluate the awakening level of the driver detected at each stage, on the basis of time t1 at which the profile (return success rate profile in FIG. 24(b)) becomes the desired value, whether the profile has actually reached the state needed for return at each return stage is monitored until the takeover is completed. The notification that is too early causes that, if the driver returns quickly, the section that can be traveled by automatic driving will be left for a long time before the actual takeover limit point. Furthermore, it will lead to continuous dependent use due to excessive automatic driving that neglects the takeover notification. Notification at the right timing is effective as means for avoiding this dependent use.

For example, an initial curve in a case of having a doze becomes a cumulative average distribution obtained by estimating the sleep level from observation information such as respiration and pulse waves that have been passively monitored during the doze period in automatic driving, and viewing return delay characteristics of the corresponding driver after the awakening warning is issued. Each distribution in mid course is determined according to the conditions of the driver observed during the subsequent movement return procedure after waking up. A right timing for the awakening alarm to be in time is determined by observing "6. In a case of having a doze" illustrated in the diagram, and the subsequent halfway process becomes a return time distribution in a return budget predicted from an observable driver condition evaluation value at a predicted midpoint.

In each point of mid course, the time limit for the remaining takeover limit, which gradually decreases until the takeover, is kept observed so that it is not violated, and in a case where there is a violation risk, the vehicle is decelerated and measures such as generating a time grace are taken. Note that, for example, regarding a distribution at the time of returning starting from "4. Non-driving posture irregular rotation sitting" in the absence of the steps of "6.

In a case of having a doze", and "5. Sitting", because the process of returning is started from the initial situation recognition grasping, even though it is the same item the state "4. Non-driving posture irregular rotation sitting" posture as a mid-course process starting from "6. In a case of having a doze" becomes the same, but the thinking process is in the return consciousness process. Thus, in a case of starting from the situation recognition in the "4. Non-driving posture irregular rotation sitting" posture from the beginning, the distribution becomes long because it takes time for the situation recognition.

Note that in some cases, the relationship information between the observable evaluation value of the driver currently driving and the return delay time is not sufficiently stored in the storage unit. In that case, the storage unit is used, for example, as return characteristic information generated on the basis of the information collected from the driver population of the same age, it is used as assumed distribution information of the return prepared in advance, and calculation of the return delay time t1 can be performed. Because the driver-specific characteristics of this return information have not yet been sufficiently learned, the return information may be used with the same return probability based on the information, or a higher return success rate may be set. Note that users who are ergonomically unfamiliar are expected to return early in the early stage of use because they are more cautious, and as a driver becomes accustomed to use, the driver himself or herself adapts to behaviors according to the notification of the system. Note that in a case where using different vehicles in the logistics industry that operates a large number of vehicles, the operating industry such as buses and taxis, and shared cars and rental cars, the driver may be personally authenticated and driving observable information and return characteristics may be centrally or distributedly managed and learned on a remote server or the like, and return characteristic data may not necessarily be retained in individual vehicles but remote learning processing or retention may be performed.

Furthermore, since the notification timing is important, the return success rate is described as the time until a uniform success or failure, but without limiting the success or failure from automatic driving to manual driving to binary success or failure, the discrimination extended to return takeover quality may be further performed. That is, it leads to actual return check A return within a permitted time, such as a delay time of the return procedure transition, a return start delay with respect to a notification, or stagnation in a halfway return operation, may be further input to a learner as a return quality evaluation value.

Returning to FIG. 23, the configuration of the information processing apparatus 200 will be described.

As described above, the return notification, warning timing calculation unit 205 uses a result of learning process in the return characteristic learning unit 212 using the driver return characteristic dictionary 211 to calculate the timing of notification or warning corresponding to each state of the driver.

Next, processes executed by the return prediction response delay evaluation unit 206, the return delay measure processing unit 207, and the return time grace determination unit 208 will be described.

The return prediction response delay evaluation unit 206 executes an evaluation process of return quality of the driver at the time of transition from automatic driving to manual driving. The return delay measure processing unit 207 performs notification of a warning or the like in a case where a delay is detected in the return of the driver at the time of transition from automatic driving to manual driving. The return time grace determination unit 208 calculates the transition grace time from automatic driving to manual driving.

The time (delay time) required for transition of the driver from automatic driving to manual driving differs depending on the conditions of the driver.

Figure 26:
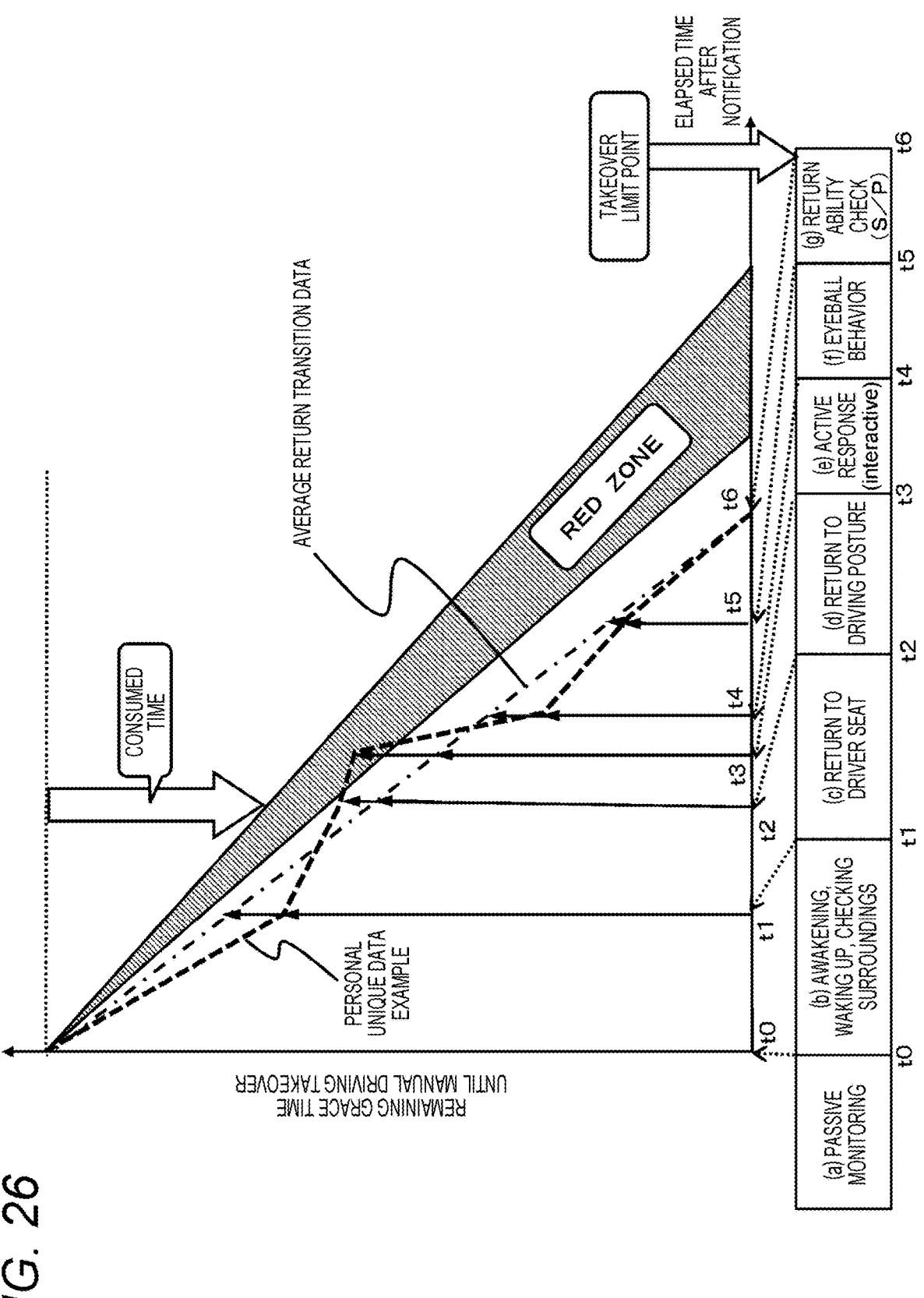
FIG. 26 is a graph illustrating a graph describing a remaining grace time to completion of transition from automatic driving to manual driving.

FIG. 26 is a diagram illustrating a graph describing a remaining grace time to completion of transition from automatic driving to manual driving. A remaining grace time after the system notifies the driver (manual driving return request notification) at time t0 until reaching the rightmost "takeover limit point" is illustrated along the vertically axis according to the passage of time along a time axis on the horizontal axis.

The example illustrated in FIG. 26 illustrates the remaining grace time in a case where the vehicle travels at a constant speed, assuming smooth transition from the automatic driving possible section to the manual driving section. Note that since the vertical axis in FIG. 26 is the remaining grace time during constant speed traveling, the vertical axis can also be regarded as the distance to an actual takeover limit point.

The graph illustrates two lines, "individual unique data example" and "average return transition data".

The individual unique data example is an example of data based on individual unique learning data of one person.

The average return transition data is an average value based on a large number of observation data.

All of these are lines that achieve takeover at a predetermined requested recovery rate (RRR) in a case where the takeover is performed to manual driving at the takeover limit point.

On the basis of driver monitoring information, the system calculates a notification point for the driver to execute takeover to manual driving at the takeover limit point at a predetermined requested recovery rate (RRR) using a learning dictionary of driver unique return characteristics.

The requested recovery rate (RRR) will be described. The requested recovery rate (RRR) is, for example, data defined in a local dynamic map (LDM) provided by a road information provider. That is, it is the expected manual driving switching success rate at each point of the switching points from the automatic driving possible section to the manual driving section.

The arrival time of the takeover point from automatic driving to manual driving is t(ToR_point) (takeover request point), and the calculation takeover budget (time) for taking over at the default success rate RRR (requested recovery rate) at this arrival time is assumed as ΔtMTBT (minimum transition budget time).

Under this premise, it is necessary to issue a takeover notification or warning before {t(ToR_point)−ΔtMTBT (Minimum Transition Budget Time)} prior to the predicted arrival time t at the ToR_point (ToR_point).

That is, in order to achieve the requested recovery rate (RRR) at the approaching takeover point, it is necessary to notify the driver (manual driving switching request notification) at t(n) such that $$\{t(n+1) -$$

$$\{t(\text{ToR\_point}) - \Delta t MTBT(\text{Minimum Transition Budget Time})\}\} < 0$$

from the monitoring time t(n) to t(n+1) after the next monitoring time Δt. Because it is too late and becomes belated to perform notification at t(n+1).

To put it simply, in order to achieve the RRR specified in the local dynamic map (LDM) provided by the road information provider, the notification (manual driving switching request notification) timing is required to be set to a timing before the minimum takeover delay tolerance budget (time) becomes longer than a monitoring cycle period of the driver.

The transition of a monitoring state (observation state) illustrated in FIG. 26, that is, change points t0 to t6 of the monitoring state (observation state) of the following (a) to (g) are notification points for causing the driver to execute takeover to manual driving at the takeover limit point at the predetermined requested recovery rate (RRR).

For example, in a state that the driver is away from the driver seat and having a doze (before time t0), the system checks that the driver is having a doze by passive monitoring.

After the system notifies the driver at time t0 (manual driving return request notification), the driver condition and the observation state of the driver by the system change as illustrated in (a) to (g) below.

(a) Passive monitoring (system observes that driver is having doze by passive monitoring)

(b) Awaking, getting up, checking surroundings (c) Returning to driver seat (d) Returning to driving posture (e) Active response (f) Eyeball behavior (g) Checking of physical return ability (S/P)

The two lines of the "individual unique data example" and "average return transition data" illustrated in the diagram are lines generated by connecting the transition points of (a) to (g) above after the system notifies the driver (manual driving return request notification) at time to.

The diagram further illustrates a "RED ZONE" by a shaded area. This "RED ZONE" is a zone in which, for example, in a case where the actual "observation data" of the driver enters this zone, it is necessary to issue a notification (manual driving return request notification) to the driver again to encourage early return. This zone is defined in advance.

Note that as described above, the example illustrated in FIG. 26 is a graph illustrating a remaining grace time to completion of transition from automatic driving to manual driving in a case where the vehicle travels at a constant speed.

Depending on the design of the infrastructure, it is possible to have road settings such that decrease in the flow rate of the entire road is prevented even when the vehicle speed is reduced by increasing the number of lanes in the manual driving switching preparation section, for example, and it can be said that tollhouses of expressways and the like are designed based on this concept.

The graph illustrated in FIG. 26 is changed depending on the infrastructure situation. For example, in a case where the speed is reduced to perform deceleration control until reaching the takeover point, and control to extend the time to reach the takeover point is performed, it is necessary to generate and use a graph reflecting the control.

The section indicated by "physical return ability check (S/P (Somadic/Physical))" just before the "takeover limit point" on the right end is a period during which the driver partially starts steering the actual vehicle and carries out a muscular and physical real steering evaluation in this section. The system will eventually finish complete delegation of takeover to the driver at a time point when numbness of the limbs of the driver is checked and it is checked that control of actual steering equipment to be corrected is performed within the expected range As described above, the example illustrated in FIG. 26 is an example in a case of assuming that the driver is away from the driver seat and having a doze. The remaining time is illustrated in a case where the vehicle travels at a constant speed until reaching the manual driving takeover point. Since it is illustrated at a constant speed as described above, it may be regarded as a distance position to the actual takeover limit point.

Hereinafter, specific state changes of (a) to (g) will be described.

(a: Less than t0)

First, the vehicle system (information processing apparatus) performs monitoring for determining what timing in the passive monitoring period before time t0 the notification or awakening should be performed, or which of the notification and alarming-awakening it should be.

In this example, it is assumed a case where the driver is completely disengaged from the driving in the automatic driving possible section. Specifically, it is assumed that the driver is having a doze.

In a case where the system detects that the driver is asleep during the passive monitoring period before time t0, it is necessary to calculate an optimum timing to sound a wake-up alarm in the stage before the takeover process.

It is desirable to have the driver take over in a safe section for good awakening and takeover. To this end, the system selects the optimum takeover execution section on the basis of the LDM information of the road environment, that is, what is called local dynamic map (LDM) information that constantly updates, with high density, traveling map information of the road on which the vehicle travels.

For example, there is acquired, from the LDM, section information in which the takeover is completed in a straight road section where takeover can be safely performed from automatic driving to manual driving, or a section where influences on other surrounding traveling vehicles can be reduced even if decelerating, evacuating, or stopping in a case where the takeover is not performed smoothly is performed.

The system makes, for example, a combined determination of:

Low risk*Low influence*Light sleep section, so as to determine a notification timing and performs the return notification.

In other words, the actual notification and warning points are determined in the last road safety section segment where light REM sleep is reached in the course of the traveling route and the last section or the like where there is a low risk of traffic congestion even if an emergency stop is made. For example, this is to avoid dangerous situations such that the takeover point is set not in a straight section of the road but after entering a narrow road section where it is impossible to pass each other in the mountains, or that the awakening notification and warning are given in a section where transition to deep sleep after REM sleep occurs and thus awakening is poor, and further that a complicated road handling judgment is required as soon as the awakening occurs.

(b: t0 to t1)

On the basis of driver monitoring information, the system calculates a notification point for the driver to execute takeover to manual driving at the takeover limit point at a predetermined requested recovery rate (RRR) using a learning dictionary of driver unique return characteristics.

When the system notifies the driver at time t0, the driver awakens and starts getting up after time t0.

The system detects getting up of the driver by a ToF sensor or a camera, and this detection information enables behavior evaluation of the driver.

The length of time t0 to t1 is a budget allocated from data calculated by the learning process for the time required for awaking and getting up to obtain the predetermined requested recovery rate (RRR), and is the maximum allowable time. Average return transition data is illustrated by an alternate long and short dash line. A thick dashed line (example of observation data) illustrated in the diagram is an example of observation data.

If this observation data example is along the average return time indicated by the alternate long and short dash line, there is no delay.

Since the remaining grace time illustrated on the vertical axis decreases with progress, it becomes difficult to achieve the predetermined requested recovery rate (RRR) if a return delay of a certain level or more occurs. In a case where the driver is delayed to "RED ZONE" indicated by the shaded area, it is necessary to issue a return warning to the driver again to prompt early return. In addition to the observable driver return status information, information that prompts early return is also effective return quality evaluation information.

(c: t1 to t2)

The section illustrated in time t1 to t2 is the section where the driver is expected to move to the driver seat. If there occurs a delay entering the "RED ZONE" indicated by the shaded area, a warning alarm or the like prompting an early return is issued. The system observes the return of the driver to the driver seat on the basis of information acquired by, for example, a ToF sensor, a camera, a vehicle interior position tracking device, or the like.

(d: t2 to t3)

After moving to the driver seat and sitting down, the driver needs to adjust a driving posture. In a case where it evolves in the future so that the driver can leave from the driver seat and return on a daily basis, the use of a rotatable and movable driver seat is expected for a case of making a quick return, or as a use mode with a more free posture that is not restricted by the steering posture of the driver seat.

The system monitors that a necessary return procedure is performed normally, such as returning of the driver to the seat in a state of being rotated from the driving posture, returning the seat to the direction in which the driver can drive, and wearing the seat belt. In addition to posture tracking using a ToF sensor and a camera, this return procedure evaluation is performed using seat rotation driving posture return detection and seating sensor, body temperature distribution and biological signal detection, seatbelt wearing sensor, and the like. It is possible to evaluate the return quality on the basis of the detection information over time.

(e: t3 to t4)

The driver returns to the seating posture necessary for manual driving, and an interactive acknowledgment operation between the driver and the system is performed by visually checking caution information of the manual driving entering section expected after the takeover point where the return request is received or the forward traveling direction, or the like. By this process, the system determines whether or not the driver is responding by following a correct thought procedure.

In a case where the driver is semiconscious or unconscious, it is difficult to respond correctly to the system, and even if the driver who is not fully awakened responds, it becomes a response result far from an expected response.

As the interactive response checking process executed by the system, for example, various processes are possible such as checking whether or not the driver is holding the steering wheel with an appropriate grip strength, checking whether or not the driver is performing with an appropriate pedal depression or procedure, and meaningful questions and answers based on voice recognition by AI, and the like.

Note that since the response method that is troublesome for the user is disliked, means for obtaining a simplified and early response result is desirable.

As one method of the interactive response checking method, for example, it is also effective to evaluate the gesture motion such that the driver visually checks the direction of the road ahead through his or her line of sight while pointing his or her finger, like pointing and calling, for visual checking of forward.

The delay in action of the driver, the accuracy of pointing to evaluate the positional relationship between the eyes and finger of the pointing and calling and the forward of the road, and the like can be acquired and recorded as the return quality. That is, it can be recorded and saved in a storage unit in the system (information processing apparatus).

(f: t4 to t5)

The eye movements at times t4 to t5 are what is called "saccadic", which is a section for evaluating the overall high-speed movement behavior of the eyeball, which is particularly related to vision, among the response characteristics of the driver.

The eyeball performs a behavior due to a reflexive behavior that cancels the rotational movement or the like of itself accompanying movement by the semicircular canal, and a saccade movement that moves the central visual field at high speed in response to risk information of a moving object captured in the peripheral visual field.

Moreover, since the judgment is made based on memory in the process of perceiving, recognizing, and judging an object captured in the almost central visual field, behaviors such as microsaccade, tremor, and drift proceed in the fixation and its vicinity. If the stimulus priority of other events that attract attention is below a certain level, the driver completes judgment of visual information and recognizes it, and as a result, it is in a state of directing the line of sight to the target until reaching a necessary conclusion.

In particular, since the latter behavior is often involved in comprehension judgment in the brain, it is possible to estimate the awakening state on the basis of this observation result. Factors that cause the saccade movement to move the line of sight to a new target include various expression factors such as other risk factors that enter the peripheral visual field, stimuli associated with sounds such as sirens, impacts, and stimuli associated with memory. Consequently, the detection and occurrence frequency and duration of this eyeball behavior vary greatly among individuals even though there are trends in situation, driving experience, degree of fatigue, and the like. On the other hand, the awakening level of the driver can be evaluated by evaluating return quality of the awakening level of the driver on the basis of a stable behavior under steady awakening.

When the driver turns his or her line-of-sight to check the surrounding environment information while the vehicle is traveling by automatic driving, it is necessary to pay attention to various kinds of risk factors. When analyzing the line of sight of the driver, for example, it is possible to use a method of generating a semantic saliency map (attention prediction distribution map in units of objects included in the scene) from the front scene in the driving direction of the vehicle, and analyzing the line-of-sight behavior of the driver with respect to the map. However, the road on which the vehicle is traveling is diverse, and the behavior of the line of sight of the driver is often different from what is expected, making it difficult to perform stable observation of behavior.

There is a limited grace time allowed to determine the awakening level during takeover from automatic driving to manual driving. Accordingly, it is effective to artificially present a certain task in a short period of time, cause eyeball behaviors at the time of checking the task, and perform a stable eyeball behavior evaluation. In other words, instead of observing contingent eyeball behaviors with respect to the scenery ahead while driving, a behavior analysis for the task mechanically presented by the system is performed. The evaluation method can present takeover caution information to a matrix information presenting device, analyze the eyeball behaviors of the driver with respect to the presented information, and evaluate the awakening level of the driver. (g: t5 to t6)

The section indicated by "return ability check (S/P)" at times t5 to t6 is a period during which the driver partially starts steering the actual vehicle and carries out a muscular and physical real steering evaluation in the section.

When the system determines that the driver can substantially initiate a return to manual driving, the vehicle begins to travel in accordance with the steering of the driver on the steering equipment. Alternatively, while evaluating the steering quality of the driver on the steering equipment and the actual steering validity, the intervention of automatic driving control is gradually suppressed, and the control is performed to increase dependence of the driver on manual driving.

As described above, the example illustrated in FIG. 26 is a graph connecting change points of the driver condition and the observation states ((a) to (g)) of the driver by the system after the system notifies the driver (manual driving return request notification) at time t0 in a state that the driver is away from the driver seat and having a doze.

In a case where the system notifies the driver (manual driving return request notification) at time t0 while the driver is having a doze, the driver conditions and the observation state of the driver by the system change as the following (a) to (g).

(a) Passive monitoring (system observes that driver is having doze by passive monitoring)
    (b) Awaking, getting up, checking surroundings
    (c) Returning to driver seat
    (d) Returning to driving posture
    (e) Active response
    (f) Eyeball behavior
    (g) Return ability check (S/P)

These state changes (a) to (g) are state changes unique to the driver in a case where the initial state of the drive is a dozing state.

The transition of the driver condition and the observation state of the driver by the system will be different depending on the initial state of the driver.

FIG. 27 is a diagram illustrating an example of transition and transition timings of state changes according to different initial states of the driver.

FIG. 27 illustrates an example of transition of state changes according to the following four different initial states of the driver.

(1) Case where driver is having doze in doze space
    (2) Case where driver is away from driver seat and is awake (awakening state)
    (3) Case where driver is seated on driver seat but not in driving posture
    (4) Case where driver is executing secondary task in driving posture In (1) case where the driver is having a doze in a doze space corresponds to the example described with reference to FIG. 26. That is, the driver condition and the observation state of the driver by the system change as in (a) to (g) below.

(a) Passive monitoring (system observes that driver is having doze by passive monitoring)
    (b) Awaking, getting up, checking surroundings
    (c) Returning to driver seat
    (d) Returning to driving posture
    (e) Active response
    (f) Eyeball behavior
    (g) Return ability check (S/P)

In (2) case where the driver leaves the driver seat and is awake (awakening state), the driver condition and the observation state of the driver by the system changes as in the following (h) to (g) as illustrated in FIG. 27.

(h) The driver is away from the driver seat (the system observes that the driver is away from the driver seat by passive monitoring and active monitoring)
    (c) Returning to driver seat
    (d) Returning to driving posture
    (e) Active response
    (f) Eyeball behavior
    (g) Return ability check (S/P)

That is, (a) passive monitoring and (b) awaking, getting up, and checking surroundings of (1) case where the initial state is a doze are changed to (h) the driver is away from the driver seat (the system observes that the driver is away from the driver seat by passive monitoring and active monitoring)

Furthermore, the transition time (t11) from the state (h) to the "state (c) driver seat return" is a time preceding the transition time (t1) from the "state (b) awaking, getting up, and checking the surroundings" to the "state (c) returning to driver seat" in (1) case where the initial state is a doze.

This is because the state (h) is an awake state in which the consciousness of the driver is clearer than the "state (b) awaking, getting up, and checking the surroundings".

In (3) case where the driver is seated in the driver seat but not in the driving posture, the driver condition and the observation state of the driver by the system change as in the following (i) to (g) as illustrated in FIG. 27.

(i) The driver is in a non-regular posture in the driver seat (the system observes that the driver is in a non-regular posture in the driver seat by passive monitoring and active monitoring)
    (d) Returning to driving posture
    (e) Active response
    (f) Eyeball behavior
    (g) Return ability check (S/P)

That is, from (a) passive monitoring to (c) returning to driver seat in (1) case where the initial state is a doze is changed to (i) the driver is in a non-regular posture in the driver seat (the system observes that the driver is in a non-regular posture in the driver seat by passive monitoring and active monitoring).

Furthermore, the transition time (t22) from the state (i) to the "state (d) returning to driving posture" is a time preceding the transition time (t12) from the "state (c) returning to driver seat" to the "state (d) returning to driving posture" in (2) case where the initial state is away from the driver seat.

This is because the state (i) is a state in which the driver is already in the driver seat, and the operation of returning to the driver seat becomes unnecessary.

In (4) case where the driver is executing the secondary task in the driving posture, the driver condition and the observation state of the driver by the system change as in the following (j) to (g) as illustrated in FIG. 27.

(j) The driver is executing a secondary task in the driver seat (the system observes that the driver is performing a secondary task in the driver seat by passive monitoring and active monitoring).

(e) Active response (f) Eyeball behavior (g) Return ability check (S/P)

That is, from (a) passive monitoring to (d) returning to driving posture in (1) case where the initial state is a doze is changed to (j) the driver is executing a secondary task in the driver seat (the system observes that the driver is performing a secondary task in the driver seat by passive monitoring and active monitoring).

Thus, the transition of the driver condition and the observation state of the driver by the system will be different depending on the initial state of the driver.

Thus, the return prediction response delay evaluation unit 206 observes the state transition of the driver until returning to manual driving described with reference to FIGS. 26 and 27, and executes the evaluation process of the return quality of the driver at the time of transition from automatic driving to manual driving. The return delay measure processing unit 207 executes responses such as warning in a case where a delay is detected in returning of the driver at the time of transition from automatic driving to manual driving, notification of an alert, vibration output of the seat or steering wheel, and the like. The return time grace determination unit 208 calculates the transition grace time described with reference to FIGS. 26 and 27.

The emergency process execution unit 209 executes processing in a case where it is determined that a delay is detected in the return of the driver at the time of transition from automatic driving to manual driving and the manual driving cannot be started at the switching point to manual driving. Specifically, it includes deceleration processing, stop processing, movement to a traveling road other than the current traveling road or a parking lot or a roadside zone, movement processing to an evacuation road or the like, and the like.

Even in a case where the intention of the driver himself or herself to refuse start of manual driving from the takeover abandonment input unit 221 is input, the emergency process execution unit 209 performs deceleration processing, stop processing, movement to a traveling road other than the current traveling road or a parking lot or a roadside zone, movement processing to an evacuation route or the like, and the like.

Note that the takeover abandonment input unit 221 is an input unit for inputting the intention of the driver himself or herself to refuse start of manual driving and allowing, for example, an input via a switch configured as a takeover abandonment input unit or a user terminal. In addition, a configuration may be employed in which a camera-captured image of a head-waving motion or hand-waving motion of the driver is determined as an input of the intention of the driver to refuse.

The return delay penalty generation, recording unit 210 executes generation of a penalty in a case where the driver is delayed in returning to manual driving or refuses to return to manual driving, and a recording process in the storage unit.

The data recorded in the storage unit by the return delay penalty generation, recording unit 210 includes, for example, the following data.

(1) Elapsed time from driver leaving driver seat to returning to driver seat (2) Delay time from notification to driver to start of returning (3) Delay time from alarm output while driver is having doze to awakening (4) Time from notification to cognitive reaction of notification (time until interruption of secondary task)

(5) Delay in actual return start behavior after recognition of notification (6) Whether or not to start advance return with respect to remote grace notice when leaving seat and advance start time (7) Return start delay after recognition of notification, advance notification of penalty, and recording of warning (8) System emergency preventive response action start record (9) Detailed sequence recording of system emergency preventive response action and actual vehicle deceleration, slowing, evacuation to road shoulder, pool area evacuation

(10) Repeated violation of return delay after notification, cumulative violation for certain period

(11) Observation and recording of frequency of looking aside in section where driving under caution is requested

(12) Primary record of progress with respect to return expected value and driver live feedback (visual, auditory, tactile, haptic)

(13) Status register writing to external notification device of return delay occurrence

(14) Transition in frequency of prior checking of return grace time indicator

(15) Cognitive quality evaluation for notification (gesture agility, observation of self-awakening behavior=tapping face or the like)

The return delay penalty generation, recording unit 210 records these data in the storage unit.

(5-3. Specific Examples of Detection of Manual Driving Return Point Based on Traveling Route Information and Manual Driving Return Necessary Time Calculation Process Based on Manual Driving Return Time Estimation)

Next, a specific example of detection of a manual driving return point based on traveling route information and a manual driving return necessary time calculation process based on manual driving return time estimation will be described.

In the return notification, warning timing calculation unit 205 of the information processing apparatus 200 illustrated in FIG. 23, in order to calculate a timing of a return notification to manual driving to the driver, it is necessary to acquire section information on the traveling road, that is, switching point information from automatic driving to manual driving, and the like.

Furthermore, it is necessary to accurately grasp the state of the driver.

An example of these information acquisition processes will be described with reference to FIG. 28 and below.

FIG. 28 is a flowchart describing a processing sequence for acquiring section information on a traveling road, that is, switching point information from automatic driving to manual driving, or the like.

The return notification, warning timing calculation unit 205 of the information processing apparatus 200 illustrated in FIG. 23 executes a process of acquiring switching point information from automatic driving to manual driving, or the like according to the flow of FIG. 28.

In step S51, a process of acquiring LDM (local dynamic map) is executed.

In step S52, a process of acquiring traffic condition information is executed.

In step S53, vehicle body dependence information is acquired.

Next, the processes of steps S54 to S56 are executed on the basis of the acquired information.

In step S54, a predicted arrival time at each point is calculated according to a road traffic volume.

In step S55, expanding information of latest travelable level of section on the route and update processing of driver notification information are executed.

In step S56, the degrees of influence of deceleration in an approaching section of the road, deceleration, slow traveling, and stop of the own vehicle on an evacuation possible route are calculated.

The return notification, warning timing calculation unit 205 uses these pieces of information to analyze the accurate status of a traveling road such as section information in the traveling road such as switching point information from automatic driving to manual driving, and calculates a return notification, warning timing using an analysis result.

Figure 29:
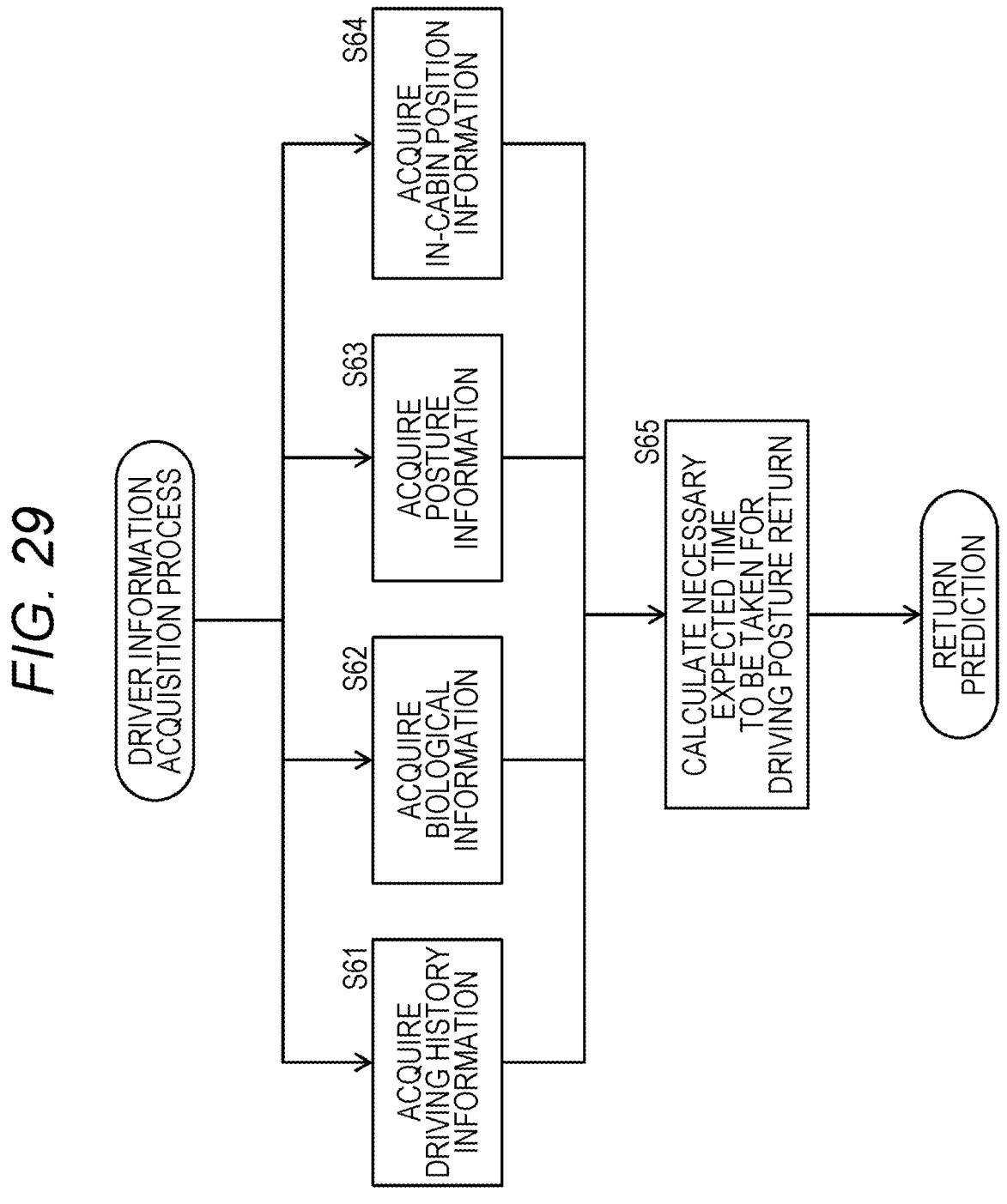
FIG. 29 is a diagram illustrating a flowchart describing a sequence example of a driver information acquisition process.

The return notification, warning timing calculation unit 205 further acquires driver information according to a flow illustrated in FIG. 29.

In step S61, a process of acquiring driving history information of the driver is executed.

In step S62, a process of acquiring biological information of the driver is executed.

In step S63, posture information of the driver is acquired.

In step S64, position information of the driver in the cabin (vehicle) is acquired.

Next, using these pieces of acquired information, the time until the driver returns to the driving posture is estimated. This specific treatment is the treatment described above with reference to FIGS. 24 to 27.

The return notification, warning timing calculation unit 205 calculates a return notification, warning timing on the basis of the information acquired in the process of acquiring the traveling road information according to the flow of FIG. 28 and the process of acquiring the driver information according to the flow of FIG. 29.

Figure 30:
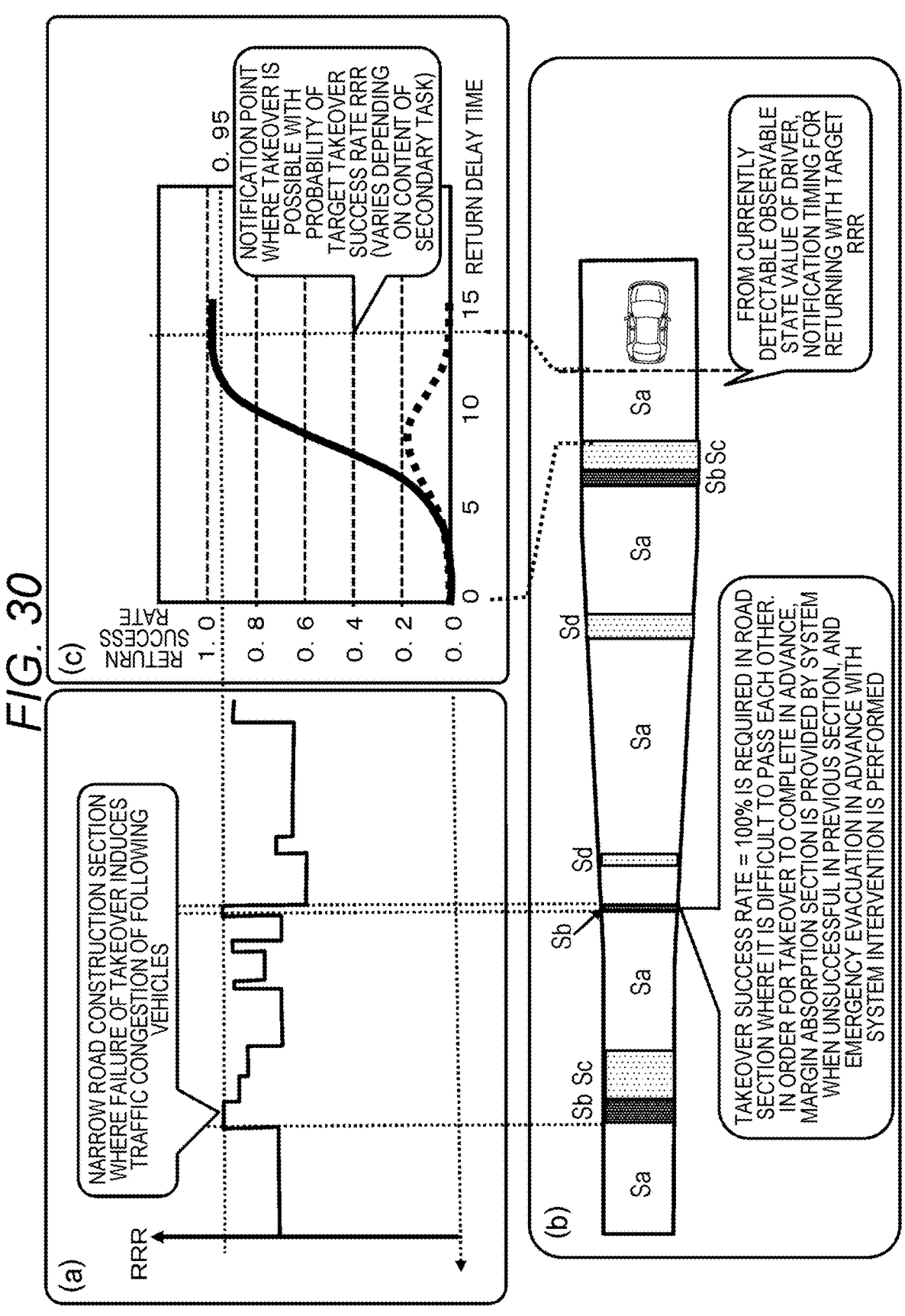
FIG. 30 is a diagram describing data generated on the basis of acquired data of route information and driver information.

Examples of the information acquired in the process of acquiring the traveling road information according to the flow of FIG. 28 and the process of acquiring the driver information according to the flow of FIG. 29 are illustrated in FIG. 30.

Information illustrated in FIGS. 30(a) and 30(b) is the information acquired by the process of acquiring the traveling road information according to the flow of FIG. 28, and the information illustrated in FIG. 30(c) is the information acquired by the process of acquiring the driver information according to the flow of FIG. 29.

Data illustrated in FIG. 30(b) is the road section information on the traveling road described above with reference to FIGS. 14 to 16, and so on.

The information illustrated in FIG. 30(a) is data indicating a predetermined takeover requested recovery rate (RRR) set in units of traveling sections of the road, or the like.

The data illustrated in FIG. 30(c) is the data described above with reference to FIG. 24(b) and is data indicating the relationship between a return delay time and a return success rate based on an observed specific driver awakening level evaluation value. This data is generated on the basis of observation information of the driver.

Note that the driver awakening level evaluation value is, for example, an evaluation value based on biological information observation (pulse, respiration, body odor, exhalation, blood flow, . . . ) and sleep depth observation information. Specifically, REM sleep observation, biological observation, sweating observation, respiration, pulse wave, eyelid, turning over, and alpha wave observation information can be used.

In addition, in a case where the driver is awake and partially grasps the driving situation, the awakening level evaluation value of the driver can be calculated by using comprehensive or limited partial observation information of the observed driver, such as observation information by a driver monitoring system, for example, fatigue evaluation, blink evaluation by PERCLOS (eye opening ratio) or the like, and facial expression evaluation information or the like.

The return notification, warning timing calculation unit 205 generates each data illustrated in FIG. 30 and calculates a return notification to manual driving and warning timing for the driver using this data on the basis of the information acquired in the process of acquiring traveling road information according to the flow of FIG. 28 and the process of acquiring driver information according to the flow of FIG. 29.

5-4. Sequence of Processing that Allows Manual Driving Takeover Abandonment by Driver Next, a sequence of processing that allows manual driving takeover abandonment by the driver will be described.

As described above with reference to FIG. 23, the information processing apparatus 200 in the moving apparatus is provided with a takeover abandonment input unit 221.

The takeover abandonment input unit 221 is an input unit for inputting the intention of the driver himself or herself to refuse start of manual driving, and allowing, for example, an input via a switch as a takeover abandonment input unit or a user terminal. In addition, a configuration may be employed in which a camera-captured image of a head-waving motion or hand-waving motion of the driver is determined as an input of the intention of the driver to refuse.

If the driver performs an input of refusing start of manual driving via the takeover abandonment input unit 221, the emergency process execution unit 209 performs deceleration processing, stop processing, movement to a traveling road other than the current traveling road or a parking lot or a roadside zone, movement processing to an evacuation route or the like, and the like Note that even in a case where there is no input of refusal to start manual driving from the driver via the takeover abandonment input unit 221, by presetting by the driver, upon detecting a specified return delay, the emergency process execution unit 209 may determine that takeover is not possible and perform an emergency evacuation process early in a following vehicle low influence area.

For example, in a case where there are circumstances that require safer control for the driver or vehicle, such as a case where the driver is a person with a chronic disease or the vehicle is a vehicle loaded with hazardous materials, or the like, it is preferable to perform processing based on this preset by the driver or a vehicle operation management center.

In a case where there is no special circumstances of the driver or vehicle as described above, even in a case where the specified return delay is detected, it is determined as a variation in operation by the driver, and a regular warning notification process or the like is performed.

By optimizing the processing according to such driver conditions, road conditions, vehicle characteristics, and the like and performing an appropriate early response process, a response is started in a low influence section early in the process, for example, in order to avoid blocking the road due to an emergency stop accompanying a failure in returning to manual driving on a narrow road of a vehicle capable of automatic driving that is driven by a sick person. Furthermore, for a large connected vehicle or a vehicle loaded with heavy loads, in order to avoid manual driving takeover or stopping in a section with many curves and the like and poor visibility, the response process is performed in a road section with good straight line visibility by advance declaration setting or performed early. Thus, the system searches for and processes a preliminary section that does not require traffic obstruction of following vehicles or emergency deceleration even if the takeover is not performed normally, and thus it is possible to reduce occurrence of road congestion, road closure, and the like.

However, it is effective to habitually accelerate the return behavior of the driver and operate the road as a social infrastructure by imposing a penalty on the driver appropriately and hierarchically together when a takeover delay occurs. On the other hand, processing such as giving incentives is performed for a driver who has returned early as planned.

In normal times, it is preferable that takeover from automatic driving to manual driving is smoothly performed without deceleration of the vehicle, or the like. However, in a case where there are circumstances in which the takeover cannot be performed, the driver offers to abandon the takeover of manual driving. In this case, the vehicle system performs vehicle control such as deceleration of the vehicle, evacuation to an evacuation road, movement from a main road to a general road, movement to a traveling road other than the current traveling road or a parking lot or a roadside zone, or the like.

It is difficult for the system to grasp true physical conditions of the driver even by observing observable biological signals for observing return transition, awakening level, and return level of the driver.

When the driver himself or herself offers to abandon returning to manual driving, the system can reliably and early grasp that the driver cannot return to manual driving, and can perform more reliable and earlier evacuation control.

A processing sequence of processing that allows the driver to refuse to return to manual driving will be described with reference to FIGS. 31 and 32.

Figure 31:
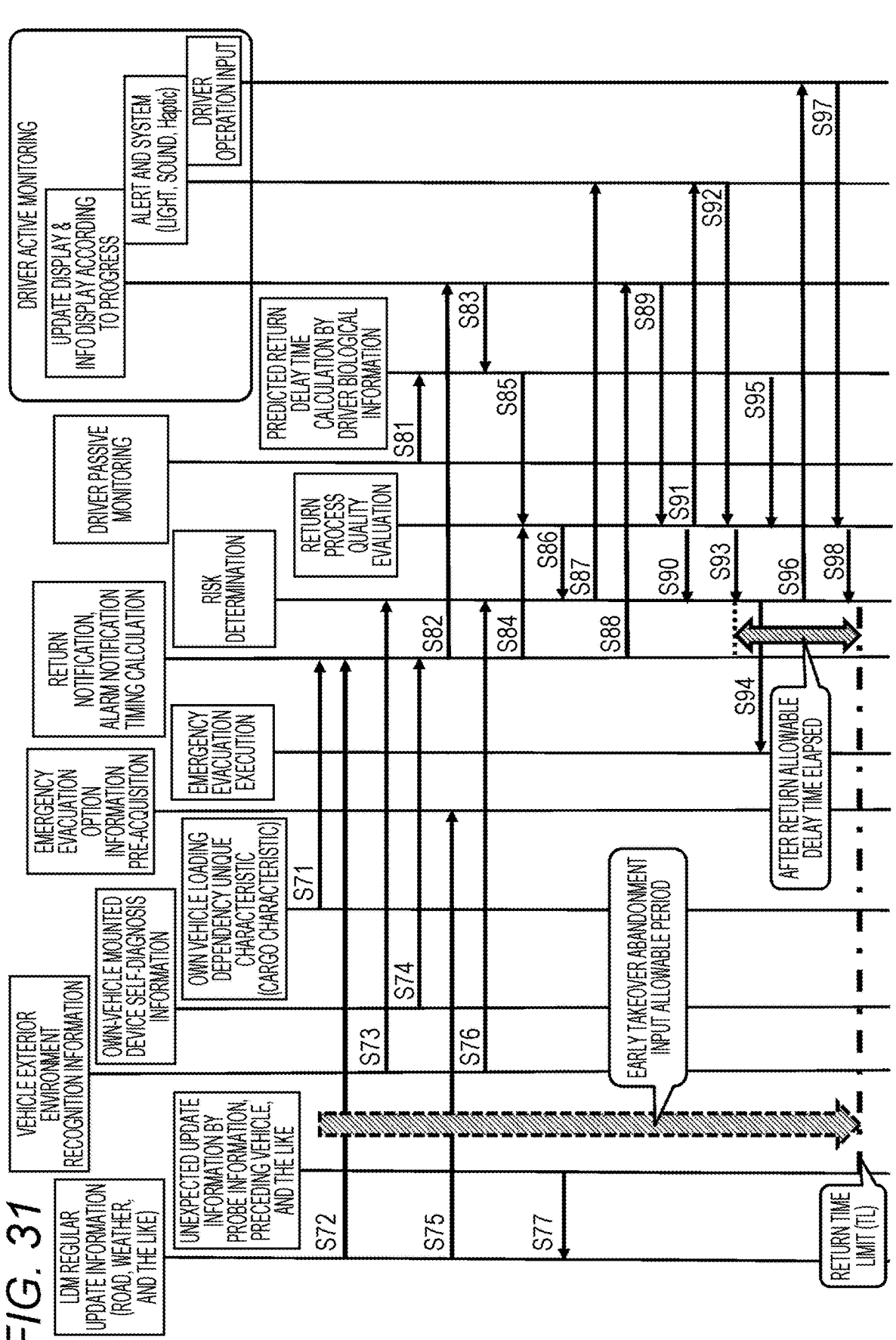
FIG. 31 is a sequence diagram describing an example of a processing sequence executed by the information processing apparatus in the moving apparatus of the present disclosure.
Figure 32:
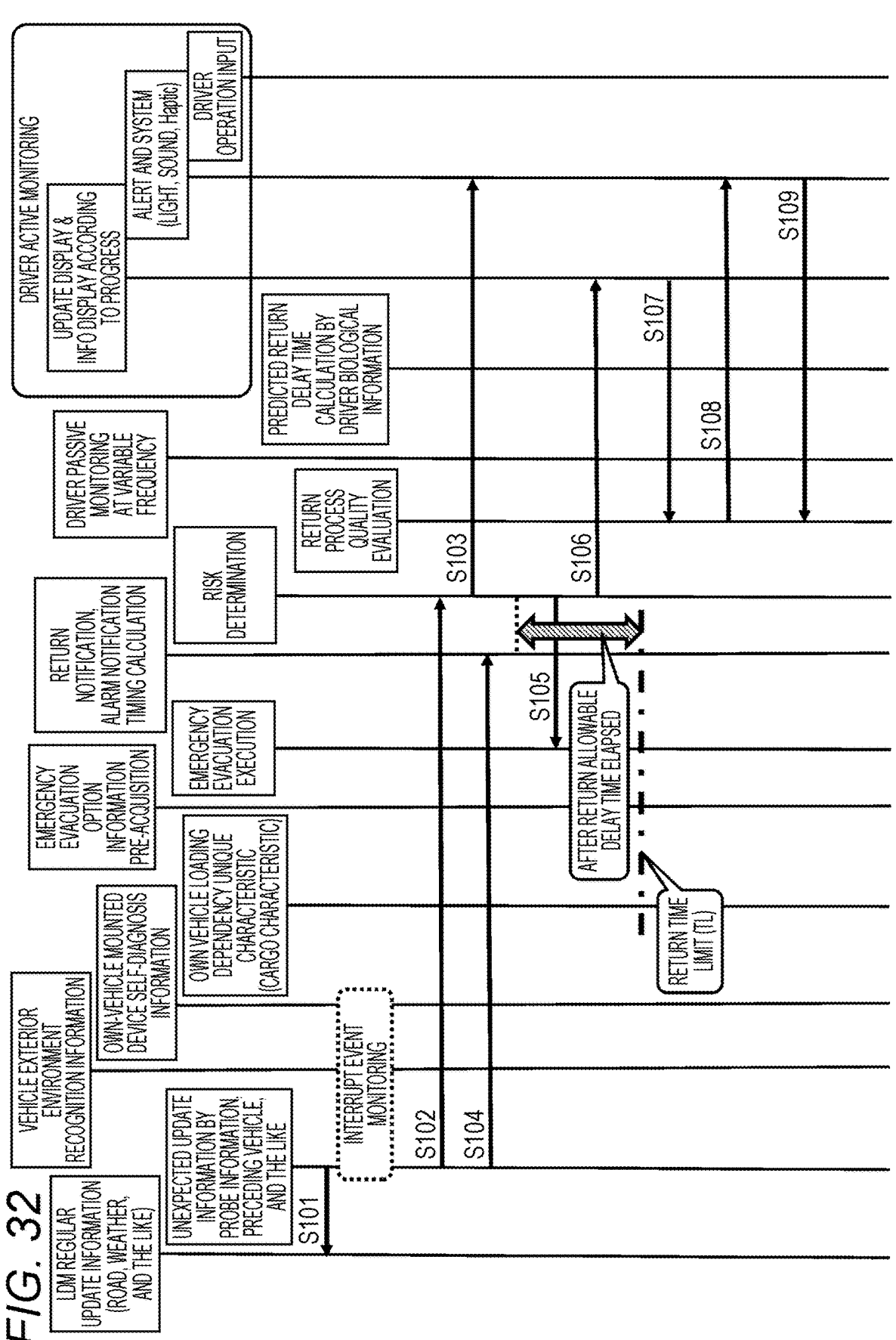
FIG. 32 is a sequence diagram describing an example of a processing sequence executed by the information processing apparatus in the moving apparatus of the present disclosure.

Processes illustrated in FIGS. 31 and 32 are executed in the data processing unit of the information processing apparatus 200 mounted on the moving apparatus, for example, the data processing unit including the processing unit described above with reference to FIG. 23.

Each process illustrated in sequence diagrams illustrated in FIGS. 31 and 32 will be described.

Step S71 is a calculation process of manual driving return notification and warning notification timing for the driver, which are executed on the basis of an own vehicle loading dependency characteristic (cargo characteristic) of the vehicle.

Step S72 is a calculation process of manual driving return notification and warning notification timing for the driver, which are executed on the basis of regular update information of the LDM (local dynamic map).

Step S73 is a risk determination process based on vehicle exterior environment recognition information. For example, it is a risk determination process based on information such as detection of hazardous materials that are possible to collide by a sensor such as a camera or LiDAR as a distance sensor.

Step S74 is a calculation process of manual driving return notification and warning notification timing based on self-diagnosis information of an own-vehicle mounted device.

Step S75 is a pre-acquisition process of emergency evacuation option information executed on the basis of regular update information of the LDM (local dynamic map). For example, the LDM includes parking area information, information such as whether or not there is a parkable area on a roadside zone, whether or not there is a side road for evacuation, and road information such as whether or not it is a road that allows deceleration, and options that can be taken in an emergency are selected in advance on the basis of these pieces of LDM information. The option information is stored in the storage unit.

Step S76 is a similar process to step S73, and is a risk determination process based on the vehicle exterior environment recognition information. For example, it is a risk determination process based on information such as detection of hazardous materials that are possible to collide by a sensor such as a camera or LiDAR as a distance sensor.

The processes of steps S71 to S76 are continuously and repeatedly executed.

Step S77 is an update process of LDM in which information used to update the LDM information is based on acquired information of probe cars exclusively acquiring road environment detection information autonomously recognized by many general vehicles traveling in the sections and insufficient LDM information, and is further based on sensor groups of infrastructure-mounted type. Note that all probe cars that acquire the information of LDM do not necessarily have to be dedicated information acquisition vehicles, and traveling of vehicles that travel frequently in close contact with the community, such as taxis, fixed-route buses, delivery and postal vehicles, police vehicles, and the like, may be used.

This process is also executed sequentially.

Step S81 is a prediction process of a return delay time to manual driving based on passive monitoring of the driver, for example, passive monitoring information of acquiring living body, posture, and other state information of the driver by a camera or a sensor.

This process is also continuously executed.

Step S82 is a process of notifying the driver of a prediction processing result of the return delay time to manual driving. The prediction processing result of the return delay time is displayed and its notification is given on the user terminal held by the driver, the display of the driver seat, or the like. Alternatively, an alarm is output.

In step S83, the response of the driver to this notification is input to check that the driver acknowledges the notification.

Steps S84 and S85 are the evaluation process of the return quality of the driver to manual driving. This evaluation process is executed on the basis of the prediction processing result of the return delay time to manual driving and the return delay time predicted according to the response result of the driver to the notification of the prediction processing result to the driver.

Step S86 is a risk determination process based on an evaluation result of the return quality of the driver to manual driving. This risk determination is a process of determining a risk that the driver is not able to return to manual driving until reaching the switching point that is the start position of a manual driving section.

In a case where it is determined that there is a high risk of not being able to return to manual driving until reaching the switching point, a warning notification is given to the driver in step S87.

Step S88 is a similar process to step S82, and is a process of notifying the driver of the prediction processing result of the return delay time to manual driving. The prediction processing result of the return delay time is displayed and its notification is given on the user terminal held by the driver, the display of the driver seat, or the like. Alternatively, an alarm is output.

In step S89, the response of the driver to this notification is input (detected), and the evaluation process of the return quality of the driver to manual driving is performed. Since the active monitoring of the driver is carried out, in a case where the driver has understood information notification, a response reaction and a response procedure are started unless the notification is ignored. The response result will appear as a button operation input, an actual operation of the steering device, or a return behavior, and thus a return process quality evaluation is performed based on the response. Here, in the case of a response behavior in which there is no input to the device accompanying direct physical changes, behavior analysis such as attitude or posture analysis of the driver is performed using, for example, a ToF camera, a Kinect camera, a structure light camera, or the like, and the evaluation of the return quality to manual driving is performed based on an activity evaluation result.

Step S90 is a risk determination process based on the evaluation result of the return quality of the driver to manual driving. This risk determination is a process of determining a risk that the driver is not able to return to manual driving until reaching the switching point that is the start position of a manual driving section.

In a case where it is determined that there is a high risk of not being able to return to manual driving until reaching the switching point, a warning notification is given to the driver in step S91.

In step S92, the response of the driver to the warning notification to the driver is input (detected), and the evaluation process of the return quality of the driver is performed.

Moreover, in step S93, on the basis of the evaluation result of the return quality, the risk that the driver is not able to return to manual driving until reaching the switching point which is the start position of the manual driving section is determined.

Step S94 is a process to be executed in a case where it is determined that there is a high risk that the driver is not able to return to manual driving until reaching the switching point that is the start position of the manual driving section on the basis of the risk determination in step S93, and in this case, an emergency evacuation process is executed.

Specifically, an emergency evacuation process such as deceleration, stop, movement to an evacuation road, movement to a traveling road other than the current traveling road or a parking lot or a roadside zone, or the like is executed.

Step S95 is a similar process to step S85, and is an evaluation process of the return quality to manual driving of the driver executed on the basis of the return delay time predicted according to the response result of the driver to the notification for the driver of the prediction processing result of the return delay time to manual driving.

This process is continuously and repeatedly executed.

Steps S96 to S98 are processes when it is determined in the risk determination that manual driving return is possible. In this case, driving operation information of the driver is input, the quality of manual driving of the driver is evaluated, and safety and risk are determined.

In FIG. 31, the period during which refusal of manual driving return by the driver is allowed is the period before a "return time limit (TL)" illustrated in the diagram.

The "return time limit (TL)" corresponds to the time when the vehicle approaches the switching point to manual driving, and the time such that the emergency evacuation within the automatic driving section cannot be executed after this time is exceeded.

Further, even in a case where there is no refusal of manual driving return by the driver, in a case where it is determined that there is a high risk that the driver is not able to return to manual driving until reaching the switching point that is the start position of the manual driving section on the basis of the evaluation result of the return quality in step S93, it is determined that a return allowable delay time has elapsed, and a forced emergency evacuation process is executed as described in step S94.

FIG. 32 illustrates, as an example of an unexpected event, a processing example in a case where emergency information such as accident information or the like is received by communication from a leading vehicle that leads the own vehicle, for example a probe car, a preceding traveling vehicle in the section, or the like, that is, V2V communication (vehicle-to-vehicle communication).

Step S101 is a similar process to step S77 described above, and is an update process of LDM based on acquired information of a probe car that provides information used for updating the LDM information. This process is executed sequentially.

Step S102 is a process of receiving V2V communication (vehicle-to-vehicle communication) from the probe car, which is a leading vehicle of the own vehicle, and performing risk determination based on the received information. For example, it is a case where there is a possibility that a section in which manual driving should be performed may occur right ahead due to occurrence of an unexpected accident or the like.

In such a case, in step S103, a notification or warning is given to the driver. That is, it is a notification that a section in which manual driving should be performed may occur right ahead.

In step S104, it is notified of actual occurrence information of the manual driving section from the probe car, and on the basis of this notification information, a calculation process of manual driving return notification and warning notification timing is performed. In this example, the probe car is mainly described as an example, but it is not realistic to keep many dedicated probe cars running on the infrastructure at all times as an actual operation. Therefore, in terms of operation, it is preferable to employ a configuration in which a vehicle equipped with an environment recognition function that has passed through the infrastructure section plays a role of supplementing information. Specifically, it is a configuration such that risk information checked by the own vehicle while traveling in the section is transmitted to the following vehicle group approaching the same section, and the following vehicle entering the section utilizes the information to execute preventive control when the own vehicle enters the section.

Step S105 is a process to be executed in a case where it is already determined that there is a high risk that the driver is not able to return to manual driving until reaching the switching point that is the start position of the manual driving section when calculating the notification timing in step S104, and in this case, an emergency evacuation process is executed.

Specifically, an emergency evacuation process such as deceleration, stop, movement to an evacuation road, movement to a traveling road other than the current traveling road or a parking lot or a roadside zone, or the like is executed.

Step S106 is a process of notifying the driver that the emergency evacuation process is being executed in step S105.

Step S107 is a process of determining whether or not the driver has recognized the notification. In a case where the recognition cannot be checked, an alarm is output in step S108, and a recognition of the driver with respect to the alarm is checked in step S109.

For example, the process is executed in such a sequence.

5-5. Processing in Case where Driver or Passenger Expresses Intention to Abandon Takeover to Manual Driving Next, processing in a case where the driver or passenger expresses an intention to abandon takeover to manual driving will be described.

The driver or passenger can express an intention to refuse takeover to manual driving.

Figure 33:
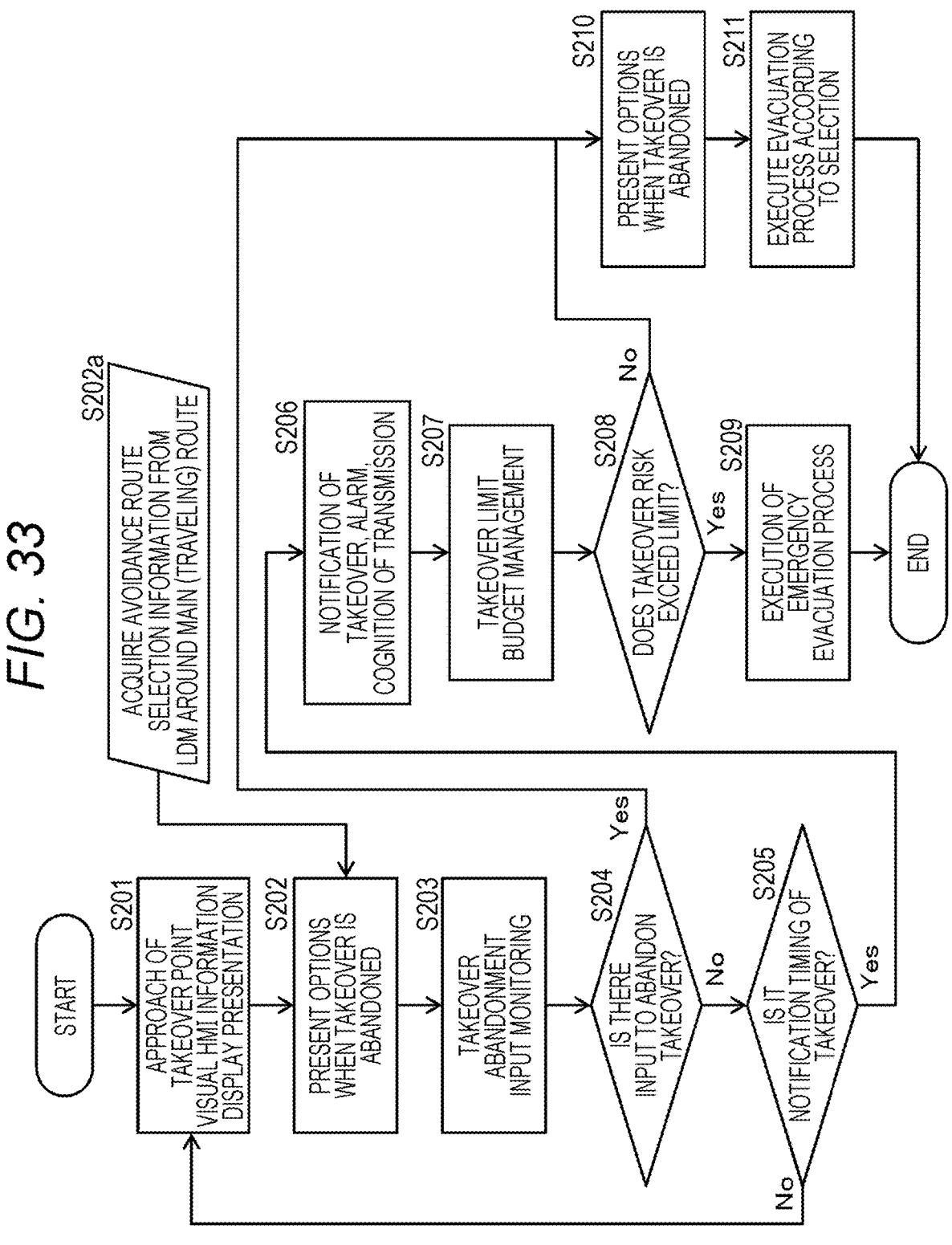
FIG. 33 is a diagram illustrating a flowchart describing an example of a processing sequence executed by the information processing apparatus in the moving apparatus of the present disclosure.

Next, a sequence of processes executed by the information processing apparatus mounted in the moving apparatus will be described with reference to a flowchart illustrated in FIG. 33. Note that the processes according to the flowchart illustrated in FIG. 33 can be executed, for example, according to a program stored in a storage unit in the data processing unit of the information processing apparatus.

Hereinafter, processes of respective steps of the flowchart will be described in order.

(Step S201)

First, in step S201, the driver is notified of the approach of a takeover point from an automatic driving possible section to a manual driving section. For example, it is notified via the HMI (Human Machine Interface) of a user terminal having a display, or the like.

(Step S202)

First, in step S202, the data processing unit of the information processing apparatus acquires options when takeover is abandoned.

Note that in this process, avoidance route selection information or the like is acquired from the LDM (local dynamic map) around the main (traveling) road.

Figure 34:
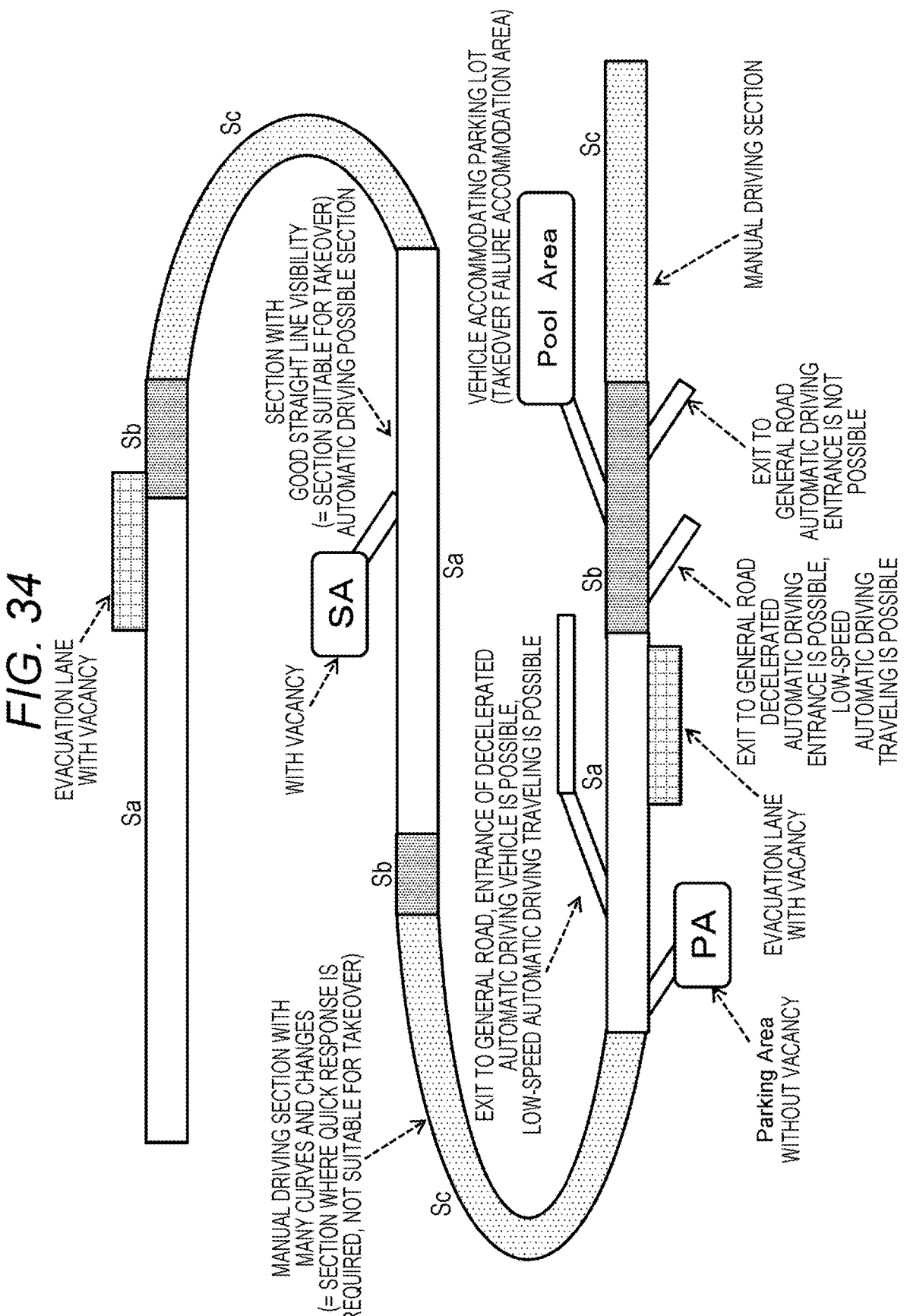
FIG. 34 is a diagram describing an example of a local dynamic map (LDM) acquired by the information processing apparatus in the moving apparatus of the present disclosure.

The LDM (local dynamic map) provides avoidance route information for the road on which the vehicle is currently traveling, as illustrated in FIG. 34, for example. For example, various avoidance route information such as service areas (SA), parking areas (PA), side roads including general roads where evacuation is possible and the like, parking spaces (pool areas) corresponding to vehicles with takeover failure, evacuation lanes, and the like can be obtained.

On main roads and expressways, automatic driving at high speed, which is the cruising speed of surrounding vehicles, is a prerequisite, but if a general road connected to an expressway is a low-speed automatic driving possible road, exiting to the general road while keeping the automatic driving is also an option. On general roads and back roads, there is a low risk of obstructing the passage of social infrastructure even when the vehicle stops, and it is a realistic detour method.

Furthermore, if there is an evacuation lane or a parking area where emergency stop is possible, this area is also an option when takeover is abandoned.

The data processing unit of the information processing apparatus acquires these various options when takeover is abandoned.

Note that while merits and demerits differ depending on each option, the needs also differ depending on the user, and thus the acquired options may be presented to the driver to select an option to be used.

(Steps S203 to S204)

In steps S203 to S204, it is determined whether or not there is an input from the driver or passenger to abandon (refuse) takeover to manual driving.

Note that this input can be input via, for example, a switch configured as a takeover abandonment input unit or a user terminal. In addition, a configuration may be employed in which a camera-captured image of a head-waving motion or hand-waving motion of the driver is determined as an input of the intention of the driver to refuse.

In a case where there is no input from the driver or passenger to abandon (refuse) takeover to manual driving, the process proceeds to step S205.

In a case where there is an input from the driver or passenger to abandon (refuse) takeover to manual driving, the process proceeds to step S210.

(Step S205)

Step S205 is a process to be executed in a case where there is no input from the driver or passenger to abandon (refuse) takeover to manual driving in steps S203 to S204.

In this case, in step S205, it is determined whether or not it is a notification timing of takeover to manual driving.

In a case where it is, the process proceeds to step S206. In a case where it is not, the process returns to step S201 and the processes of step S201 and subsequent steps are repeated.

(Step S206)

In a case where it is a notification timing of takeover to manual driving, the notification to the driver is executed in step S206.

(Step S207)

Next, in step S207, a takeover limit budget management process is executed.

This process is the process described above with reference to FIG. 26.

That is, the arrival time of the takeover point from automatic driving to manual driving is t(ToR_point) (takeover request point), and the calculation takeover budget (time) for taking over at a default success rate RRR (requested recovery rate) at this arrival time is assumed as ΔtMTBT (minimum transition budget time), and on this premise, a process to issue a takeover notification or warning before {t(ToR_point)−ΔtMTBT (Minimum Transition Budget Time)} is performed prior to the predicted arrival time t(ToR_point) of the ToR point.

(Step S208)

Next, in step S208, it is determined whether or not the takeover to manual driving of the driver is not in time and a takeover risk exceeds a limit.

This is, for example, the process at the time point of step S93 in the sequence diagram of FIG. 31 in advance.

In step S208, in a case where it is determined that the takeover to manual driving of the driver is not in time and the takeover risk exceeds the limit, that is, in a case where it is determined that the driver cannot return to the manual driving until reaching the takeover point, the process proceeds to step S209.

On the other hand, in a case where it is determined that the driver can return to the manual driving until reaching the takeover point, the process proceeds to step S210.

(Step S209)

The process of step S209 is executed in a case where it is determined in step S208 that the takeover to manual driving of the driver is not in time and the takeover risk exceeds the limit, that is, in a case where it is determined that the driver cannot return to the manual driving until reaching the takeover point.

In this case, in step S209, an emergency evacuation process is executed.

Specifically, an emergency evacuation process such as deceleration, stop, movement to an evacuation road, movement to a traveling road other than the current traveling road or a parking lot or a roadside zone, or the like is executed.

(Step S210)

The process of step S210 is executed in a case where it is determined in step S208 that the takeover to manual driving of the driver is not in time and the takeover risk does not exceed the limit, that is, in a case where it is determined that the driver can return to manual driving until reaching the takeover point, or in a case where it is determined in step S204 that the driver or passenger inputs the takeover abandonment.

In step S210, the driver is presented with an option when the takeover is abandoned. For example, information of an evacuation route, a parking lot, and the like acquired from the LDM described with reference to FIG. 34 is presented to the driver. For example, the following options are presented.

(1) Travel and move to automatic driving and traveling possible route where it is possible to travel at low-speed or stop (2) Whether or not there is a temporary stop point such as a service area or a parking area (3) Traveling to follow a leading vehicle (4) Request for help (Step S211)

In step S211, an evacuation process according to selection information by the driver or passenger with respect to the options presented in step S210 is executed.

Note that it is preferable to employ a configuration to impose a penalty to the driver in a case where the evacuation process is performed. Note that a record of this penalty is left in the storage unit. The penalty has various aspects and are not limited to a specific method. Its main purpose is to build an incentive mechanism to encourage the driver in high-quality early answer and response to the system notification without delay and negligence.

For example, the following penalties are imposed.

Limiting the upper limit of traveling speed of the vehicle,

Forced guidance to an evacuation site,

Temporary evacuation to a service area and forced acquisition of break time,

Generation of rumble strips pseudo-vibration on the steering wheel and seat,

Warning sound output,

Increased insurance premium burden,

Unpleasant feedback such as foul odors,

Penalty charge.

For example, the above penalties are imposed.

When short-, medium-, and long-term penalty feedback is constantly executed in this way, it acts on human behavioral psychology from an ergonomic point of view, and avoidance behaviors become habits, that is, it becomes an important mechanism for improving safety.

Note that the function cannot be utilized if the records that improve the behavioral characteristics of the driver are tampered with and invalidated, and thus it is desirable to provide the recorded data with a tamper-proof configuration.

5-6. Processing Example when Approaching Manual Driving Switching Point

Next, an example of processing executed by the information processing apparatus of the moving apparatus when entering a switching point where an automatic driving possible section is switched to a manual driving section will be described.

Figure 35:
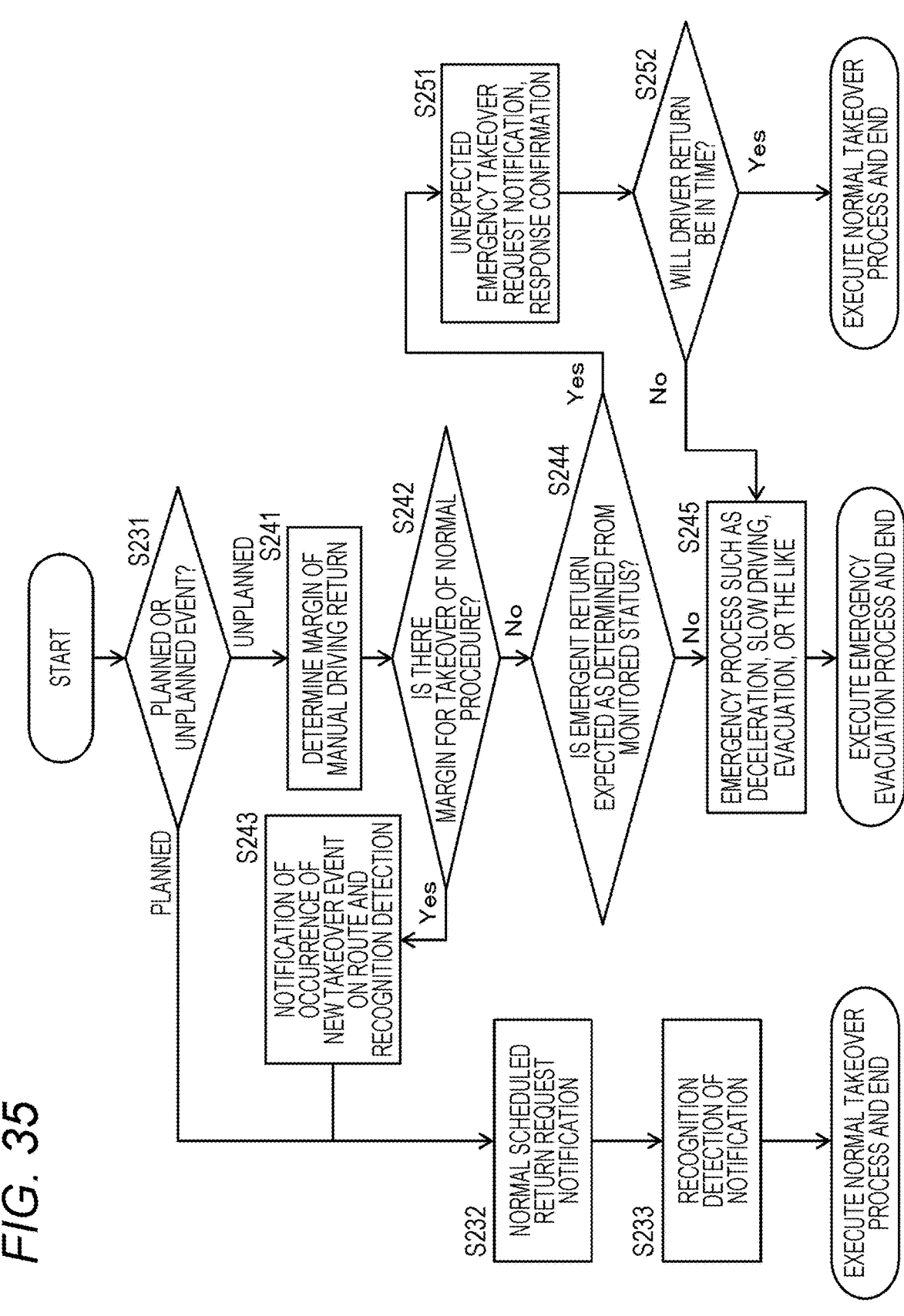
FIG. 35 is a diagram illustrating a flowchart describing an example of a processing sequence executed by the information processing apparatus in the moving apparatus of the present disclosure.

A flowchart illustrated in FIG. 35 is a flowchart describing a sequence of processes executed by the information processing apparatus of the moving apparatus when approaching a switching point where the automatic driving possible section is switched to the manual driving section.

Note that the processes according to the flowchart illustrated in FIG. 35 can be executed, for example, according to a program stored in the storage unit of the data processing unit of the information processing apparatus.

Hereinafter, processes of respective steps of the flowchart will be described in order.

(Step S231)

First, in step S231, it is determined whether an approaching switching point, that is, a switching point to a manual driving section is a planned switching point or an unplanned switching point caused by an unexpected event such as an accident.

Specifically, the planned switching point is, for example, a switching point that already exists between the two points of the starting point and the destination set by the driver before the start of traveling and has been checked by the driver.

In a case where the switching point is a planned switching point, the process proceeds to step S232. On the other hand, in a case where the switching point is an unplanned switching point, the process proceeds to step S241.

(Steps S232 to S233)

The processes of steps S232 to S233 are processes to be executed in a case where it is determined in step S231 that the switching point is a scheduled switching point. In this case, the driver is notified of a normal scheduled return notification in step S232, a cognitive response from the driver is detected in step S233, and a normal takeover process is performed.

(Steps S241 to S242)

The processes of step S241 and subsequent steps are processes to be executed in a case where it is determined in step S231 that the switching point is an unscheduled switching point.

In this case, first, in steps S241 to S242, it is determined whether or not the margin until manual driving return, specifically, the grace time is sufficient.

Note that a time applied to determination of whether or not this grace time is sufficient depends on the state of the driver. This process is the process described above with reference to FIGS. 26 and 27.

In a case where it is determined that the grace time is sufficient and manual driving return is possible, the process proceeds to step S243.

On the other hand, in a case where it is determined that the grace time is not sufficient and manual driving return is difficult, the process proceeds to step S244.
(Step S243)

In a case where it is determined in step S242 that the grace time is sufficient and manual driving return is possible, the driver is notified in step S243 that a new manual driving takeover point (switching point) has occurred.

After this notification, the processes of step S231 and subsequent steps are executed to perform the normal takeover process.
(Step S244)

On the other hand, in a case where it is determined in step S242 that the grace time is not sufficient and manual driving return is difficult, it is determined in step S244 whether or not the driver can return to manual driving on the basis of the monitoring data (observation data) of the driver.

In a case where it is determined that the driver cannot return to manual driving, the process proceeds to step S245.

On the other hand, in a case where it is determined that the driver can return to the manual driving, the process proceeds to step S251.
(Step S245)

In a case where it is determined in step S244 that the driver cannot return to manual driving, the process proceeds to step S245. In step S245, an evacuation process such as deceleration, slow driving, movement to a traveling road other than the current traveling road or a parking lot or a roadside zone, or the like is performed.

Note that in a case where this evacuation process is performed, an optimum process is selected and executed from selectable evacuation processes so as to minimize the influence on the surroundings.
(Step S251)

On the other hand, in a case where it is determined in step S244 that the driver can return to manual driving, the process proceeds to step S251. In step S251, the driver is notified that an unexpected emergency manual driving takeover is required.
(Step S252)

Next, in step S252, it is determined whether or not the driver can return to manual driving before the switching point on the basis of a cognitive response of the driver to the notification and the observation information of the driver.

In a case where it is determined that the driver will be in time, the normal takeover process is started.

On the other hand, in a case where it is determined that the driver will not be in time, the process proceeds to step S245. In step S245, an evacuation process such as deceleration, slow driving, movement to a traveling road other than the current traveling road or a parking lot or a roadside zone, or the like is performed.

(5-7. Pre-Processing and Post-Processing for Input of Abandonment (Rejection) of Manual Driving Takeover from Driver or Passenger)

Next, pre-processing and post-processing for an input of abandonment (rejection) of manual driving takeover from the driver or passenger will be described.

Figure 36:
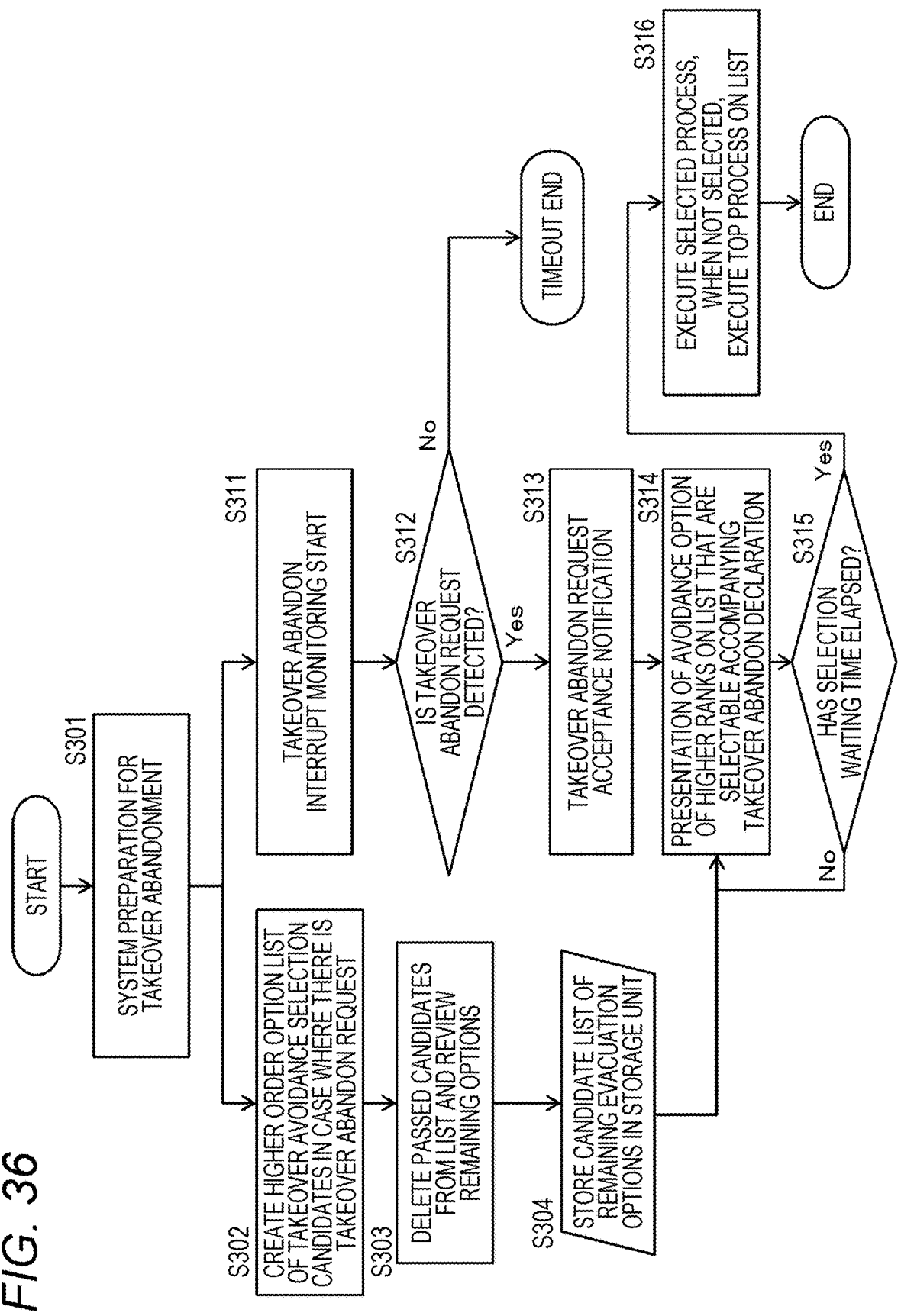
FIG. 36 is a diagram illustrating a flowchart describing an example of a processing sequence executed by the information processing apparatus in the moving apparatus of the present disclosure.

A flowchart illustrated in FIG. 36 is a flowchart describing a processing sequence of the information processing apparatus of the moving apparatus regarding pre-processing and post-processing for an input of abandonment (rejection) of manual driving takeover from the driver or passenger.

Note that processes according to the flowchart illustrated in FIG. 36 can be executed, for example, according to a program stored in the storage unit of the data processing unit of the information processing apparatus.

Hereinafter, processes of respective steps of the flowchart will be described in order.
(Step S251)

First, in step S251, a system preparation process for a takeover abandonment event is executed.

For example, the following processes are executed.
- (a) Process of acquiring peripheral bypass, evacuation site, SA/PA information
- (b) Process of acquiring own vehicle loaded object-vehicle dynamics information
- (c) Process of acquiring own vehicle self-diagnosis information
- (d) Process of acquiring passive monitoring information of driver
- (e) Process of acquiring return characteristic dictionary of driver For example, these processes are performed.
(Step S302)

Processes of steps S302 to S304 are executed in parallel with processes of steps S311 to S316.

In step S302, in a case where the driver or passenger indicates the intention to abandon (refuse) manual driving takeover, a list of options that can be taken as possible measures (slow, stop, side road evacuation, and the like) is created.

Note that the order of the list is set so that options with less influence on the surroundings are ranked higher.

For example, in a high-speed automatic driving section, there are various situations as road section conditions before the takeover point to the manual driving section. Specifically, for example, the following situations are assumed.
- (a) Section where it is possible to enter an evacuation lane or a parking lot if slowed down before the takeover point
- (b) Section where there is a grace time until the takeover point, and it is possible to enter an evacuation lane while keeping traveling at high speed to decelerate and stop
- (c) Section where there is a grace time until the takeover point, and it is possible to enter an evacuation lane while keeping traveling at high speed, decelerate, and then travel by low-speed automatic driving
- (d) Section where there is a grace time until the takeover point, and it is possible to enter an evacuation lane while keeping traveling at high speed, decelerate, and then travel to a waiting point by low-speed automatic driving
- (e) Section where there is a grace time until the takeover point, and it is possible to enter an evacuation lane while keeping traveling at high speed, decelerate, stop, and wait
- (f) Difficult-to-takeover road section applied to special vehicle, unique return characteristics of the driver, road, loaded object, vehicle characteristics, and the like
- (g) Section where leading vehicle follow-up waiting spot or SOS rescue request waiting spot is provided On main roads and road sections where the number of lanes is limited, an emergency stop and road shoulder stop can cause a rear-end collision and traffic jam even if it is a general road.

Even in such a case, by allowing applying for early takeover abandonment based on the intention of the driver, it is possible to respond with sufficient time without performing an emergency process in the middle of an expressway without an exit or evacuation site, and thus it is possible to reduce occurrence of rear-end collisions and traffic congestion of following vehicles.

Among urban roads where low-speed driving is performed, there are roads where it is possible to evacuate to a road shoulder or a side road where it is possible to temporarily stop. However, even among the same urban roads, there are roads without shoulders where it is possible to temporarily stop and roads where it is possible to evacuate to side roads.

Thus, even on the same urban roads, the situations are diverse and hence different. For example, in order to effectively utilize an effective early return abandonment process for evacuating from a main road, it is useful to acquire an urban LDM in advance when taking an option of urban road or the like.

In step S302, an optimum list is generated according to such a specific road condition. Note that there may be cases where a notification of a takeover event as an unexpected abnormal event is given while use of traveling in the automatic driving mode is scheduled for temporarily having a doze or the like due to being tired or becoming sleepy, and in these cases, the priority of the driver is to evacuate to a rest area. The generation of the list accompanying abandonment of takeover differs in response priority depending on the situation such as prior conditions of the driver, deterioration of the physical conditions during an automatic driving mode for outpatient use, simple use of automatic driving as a convenient function of the vehicle, and the like.

(Step S303)

Next, in step S303, an option that has become non-selectable is deleted from the list according to the progress of the vehicle, and the list is updated by adding a new option that has newly become selectable according to the progress of the vehicle, or the like.

(Step S304) In step S304, the updated option list is saved in the storage unit.

(Steps S311 to S312)

In steps S311 to S312, it is determined whether or not there is an input from the driver or passenger to abandon (refuse) the takeover to manual driving.

Note that this input can be input via, for example, a switch configured as a takeover abandonment input unit or a user terminal. In addition, a configuration may be employed in which a camera-captured image of a head-waving motion or hand-waving motion of the driver is determined as an input of the intention of the driver to refuse.

In a case where there is no input to abandon (refuse) the takeover to manual driving from the driver or passenger by the predetermined time limit, that is, the return time limit (TL) explained with reference to FIG. 31 and the like, a process determined to be timed out is terminated.

On the other hand, in a case where there is an input to abandon (refuse) the takeover to manual driving from the driver or passenger within the predetermined time limit, the process proceeds to step S313.

(Step S313)

In a case where it is determined in step S312 that there is an input from the driver or passenger to abandon (refuse) the takeover to manual driving within the predetermined time limit, in step S313, the driver or the like is notified that the abandonment (rejection) requested by the driver has been accepted.

(Step S314)

Next, in step S314, the driver and the like are presented with selectable evacuation process options that can be executed when the takeover is abandoned.

The options to be presented are the list stored in the storage unit in step S304.

For example, the following early abandonment response menu is displayed.

(1) Execute low-speed automatic driving on general road (2) Evacuate to evacuation lane empty area (3) Stop on general road (4) Parking in pool zone (parking zone)

(5) Execute emergency case SOS request (6) Wait at leading vehicle follow-up waiting spot Among these, for example, in a case where the early abandonment request is due to poor physical condition, there may be a situation that the driver is so worse that he or she needs to request for a rescue. For example, it is preferable that the execution option of the SOS request described in above (5) can be performed by a large button operation that is easy to operate even under reduced consciousness. The user interface has a configuration and shape that are easy to operate. Further, this operating unit may be shared with an operation unit for stopping the automatic driving vehicle in an emergency.

(Steps S315 to S316)

Next, in step S315, the process waits for a selection input by the driver, and when a specified waiting time elapses, the process proceeds to step S316, and the evacuation process according to the option selected in step S316 is executed. In a case where the selection process is not performed, the evacuation process of the option at the top of the list is executed. Note that the option at the top of the list is an option that minimizes the influence on the surroundings, and this option is executed in a case where there is no selection from the driver.

5-8. Configuration Example of Information Processing Apparatus that Executes Processing for Takeover Abandonment Input Next, a configuration example of an information processing apparatus that executes processing for a takeover abandonment input will be described.

Figure 37:
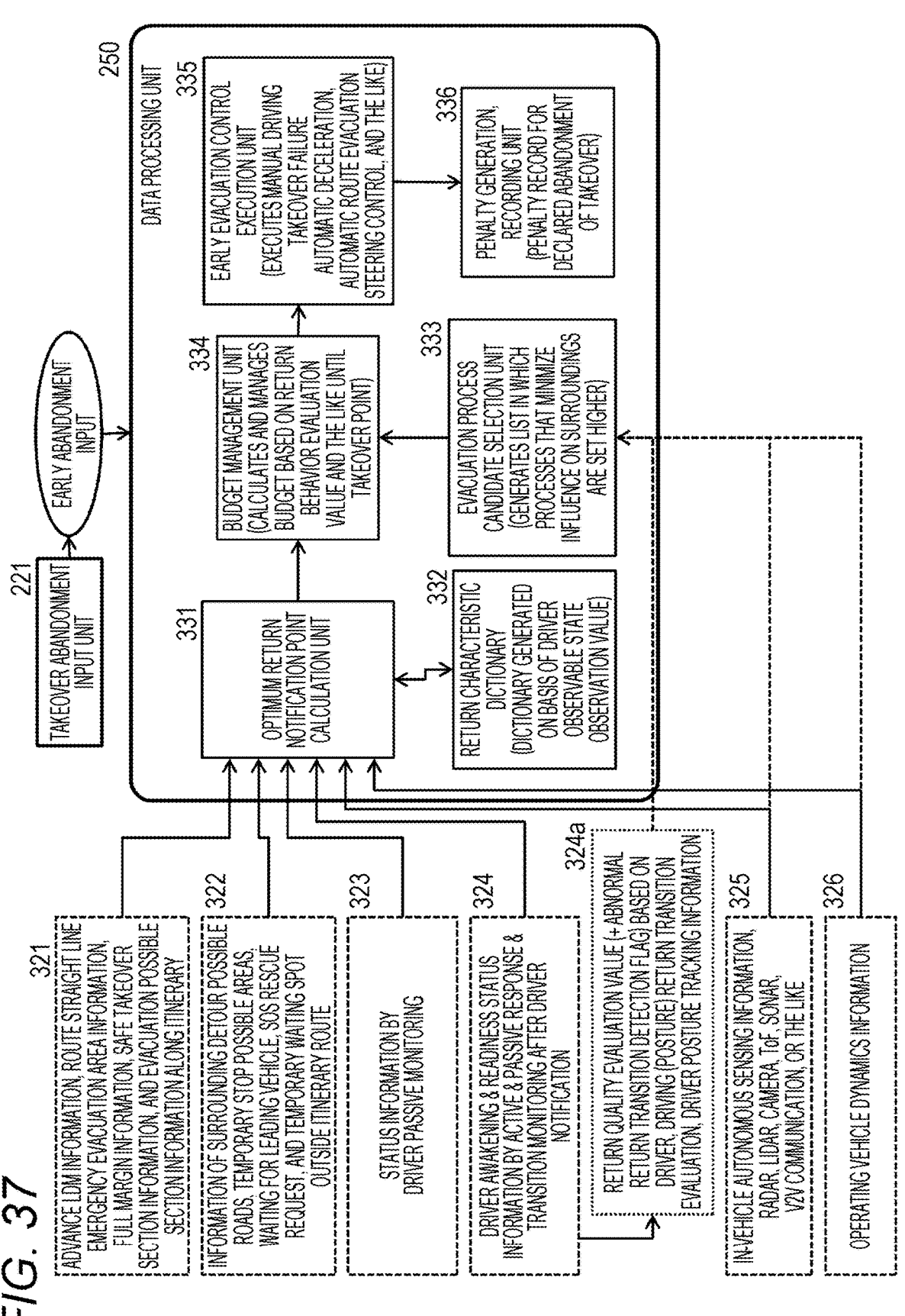
FIG. 37 is a diagram describing a configuration example of the information processing apparatus in the moving apparatus of the present disclosure.

FIG. 37 is a block diagram illustrating a configuration example of an information processing apparatus that executes processing for a takeover abandonment input that is input from the driver or the like in the information processing apparatus mounted in the moving apparatus.

As illustrated in the diagram, the data processing unit 250 of the information processing apparatus includes an optimum return notification point calculation unit 331, a return characteristic dictionary 332, an evacuation process candidate selection unit 333, a budget management unit 334, an early evacuation control execution unit 335, and a penalty generation, recording unit 336.

In a case where a switching point to a manual driving section is approaching, the optimum return notification point calculation unit 331 calculates an optimum timing for notifying the driver of takeover.

As illustrated in the diagram, various pieces of information 321 to 326 are used for this timing calculation process. That is, each of the following pieces of information is used.

Information 321=advance LDM information, route straight line emergency evacuation area information, full margin information, safe takeover section information, and evacuation possible section information along the itinerary Information 322=information of surrounding detour possible roads, temporary stop possible areas, waiting for leading vehicle, SOS rescue request, and temporary waiting spot outside the itinerary route Information 323=status information by driver passive monitoring Information 324=driver awakening & readiness status information by active & passive response & transition monitoring after driver notification Note that from this information 324, information 324*a*=return quality evaluation value (+abnormal return transition detection flag) based on driver, driving (posture) return transition evaluation, driver posture tracking information is further generated.

Information 325=in-vehicle autonomous sensing information, information acquired by a radar, a LIDAR, a camera, ToF, a sonar, V2V communication (vehicle-to-vehicle communication), and the like.

Information 326=operating vehicle dynamics information (vehicle braking ability, tire wear/resistance information, load collapse limit deceleration information, loading imbalance information, and the like)

The optimum return notification point calculation unit 331 uses these pieces of information to calculate the optimum timing for notifying the driver of takeover. Note that upon this calculation process, a calculation process using the return characteristic dictionary 332 is performed. The return characteristic dictionary 332 is a dictionary that records the return characteristics of the driver generated on the basis of the observation information of the driver.

A notification process to the driver, that is, a notification that the manual driving section takeover point, that is, a section switching point is approaching, is executed at a timing determined on the basis of notification timing information calculated by the optimum return notification point calculation unit 331.

The evacuation process candidate selection unit 333 generates a list of evacuation processes that can be executed in a case where manual driving return abandonment is input.

This list is generated with reference to the following input information.

Information 324*a*=return quality evaluation value (+abnormal return transition detection flag) based on driver, driving (posture) return transition evaluation, driver posture tracking information Information 325=in-vehicle autonomous sensing information, information acquired by a radar, a LIDAR, a camera, ToF, a sonar, V2V communication, and the like.

Information 326=operating vehicle dynamics information

The evacuation process candidate selection unit 333 generates a list in which a process that minimizes the influence on the surroundings is set higher as the list of evacuation processes that can be executed in a case where manual driving return abandonment is input.

The budget management unit 334 calculates and manages a budget based on a return behavior evaluation value and the like of the driver until reaching the takeover point of manual driving. This process is the process described above with reference to FIG. 26.

That is, a budget (time) management is performed in which the arrival time of the takeover point from automatic driving to manual driving is t(ToR_point) (takeover request point), and the calculation takeover budget (time) for taking over at a default success rate RRR (requested recovery rate) at this arrival time is assumed as ΔtMTBT (minimum transition budget time), and on this premise, a process to issue a takeover notification or warning before {t(ToR_point)−ΔtMTBT (Minimum Transition Budget Time)} is performed prior to the predicted arrival time t(ToR_point) of the ToR_point.

The early evacuation control execution unit 335 executes evacuation control for cases where manual driving takeover abandonment is input from the takeover abandonment input unit 221. Specifically, an evacuation process such as deceleration, slow driving, movement to a traveling road other than the current traveling road or a parking lot or a roadside zone, or the like is performed.

Note that in this evacuation process, a process selected by the driver or the like from the list generated by the evacuation process candidate selection unit 333 is executed. In a case where there is no selection by the driver or the like, the process at the top of the list, that is, the process that minimizes the influence on the surroundings is selected and executed.

The penalty generation, recording unit 336 generates a penalty for the driver who has declared abandonment of takeover and records the penalty in the storage unit.

As mentioned above, the penalty has various aspects and are not limited to a specific method. Its main purpose is to build an incentive mechanism to encourage the driver in high-quality early answer and response to the system notification without delay and negligence.

For example, the following penalties are imposed.

Limiting the upper limit of traveling speed of the vehicle,

Forced guidance to an evacuation site,

Temporary evacuation to a service area and forced acquisition of break time,

Generation of rumble strips pseudo-vibration on the steering wheel and seat,

Warning sound output,

Increased insurance premium burden,

Unpleasant feedback such as foul odors,

Penalty charge.

For example, the above penalties are imposed.

When short-, medium-, and long-term penalty feedback is constantly executed in this way, it acts on human behavioral psychology from an ergonomic point of view, and avoidance behaviors become habits, that is, it becomes an important mechanism for improving safety.

Early takeover abandonment with respect to a request from automatic driving to manual driving has the advantage of being able to start an early response with options that are safer and have less impact on other road users. On the other hand, if the takeover abandonment is used repeatedly and frequently without much thought, there is a concern that the consciousness of takeover will decrease and the risk of creating a difficult situation for safe evacuation due to the careless takeover abandonment will increase, for example.

Accordingly, there is provided a function for performing an early takeover abandonment response when it is determined that the takeover is not possible, and a penalty is given to the driver in a case where the early takeover abandonment is used frequently or late return is performed.

For this purpose, a usage record that manages repeated misuse of takeover abandonment is retained.

Incentives will be given to the driver in a case where he or she voluntarily returns early. Further, a configuration may be employed to execute a penalty such as lowering the speed limit as a short-term penalty in a case where start or execution of the return procedure is delayed.

In this manner, in a case where the frequent use of unnecessary early abandonment or delay in return response by the driver occurs repeatedly, the system executes, for example, a hierarchical penalty according to the frequency. This configuration encourages the driver to improve the habit of early return behavior of manual driving.

Furthermore, when there is a risk of taking over such as poor physical conditions of the driver, it is possible to give up early without hesitation. In a case where it is possible to return, it is possible to execute a quick return upon receiving a return notification, and the takeover will be carried out without disturbing the flow of surrounding vehicles using the road.

Note that the function cannot be utilized if the records that improve the behavioral characteristics of the driver are tampered with and invalidated, and thus it is desirable to provide the recorded data with a tamper-proof configuration.

As described above, the configuration of the present disclosure can be used in combination with a penalty function with respect to excessive dependent use and delay in notification response by the system, and a secondary effect of encouraging making habits of early abandonment by the driver and early takeover performance when performing the takeover.

6. Configuration Example of Information Processing Apparatus

The above-mentioned processing can be executed by applying the configuration of the moving apparatus described with reference to FIG. 8, but a part of the processing is executed by, for example, an information processing apparatus that can be attached to and detached from the moving apparatus.

Next, a hardware configuration example of such an information processing apparatus will be described with reference to FIG. 38.

Figure 38:
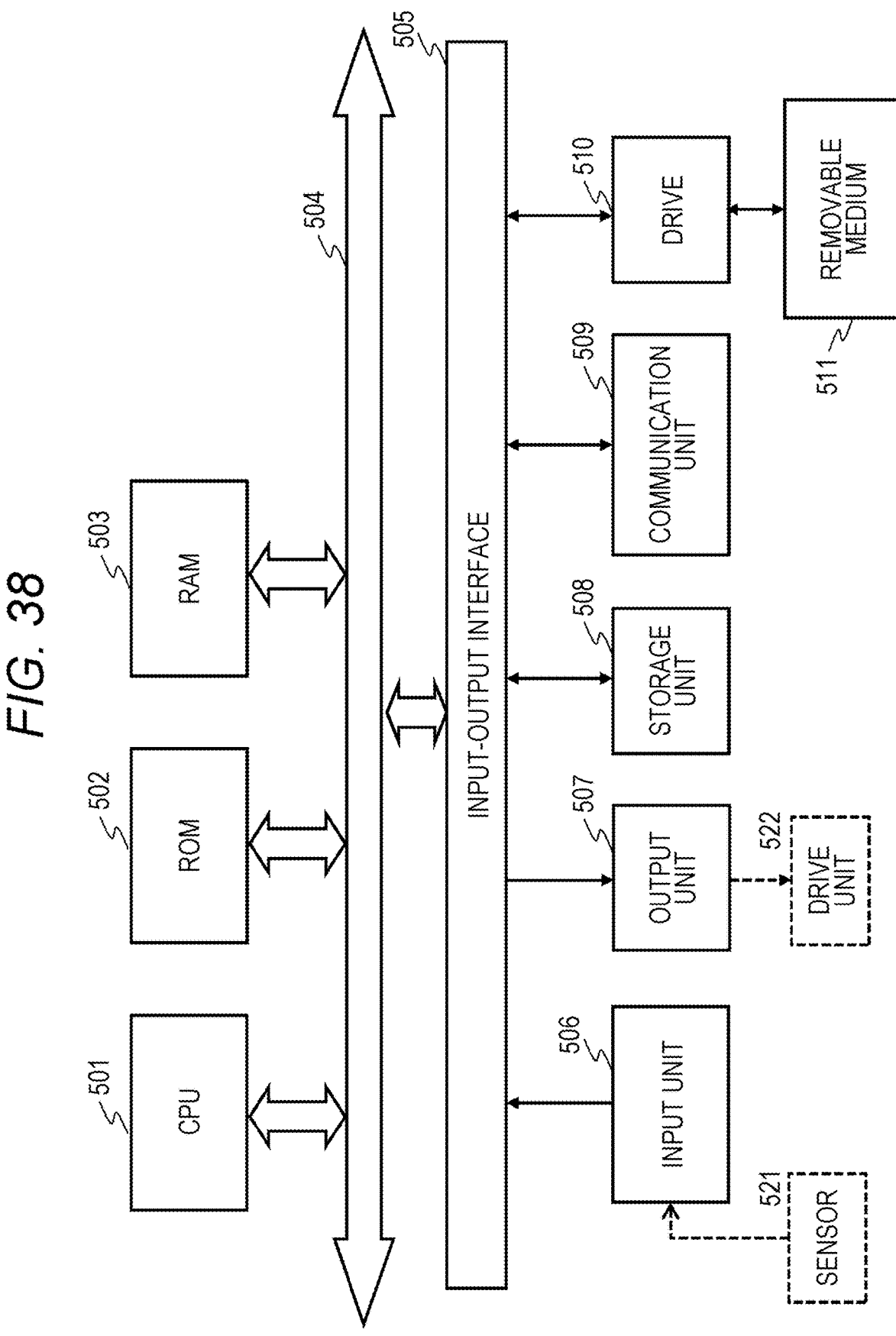
FIG. 38 is a diagram describing a hardware configuration example of the information processing apparatus.

FIG. 38 is a diagram illustrating a hardware configuration example of the information processing apparatus.

A central processing unit (CPU) 501 functions as a data processing unit that executes various processes according to a program stored in a read only memory (ROM) 502 or a storage unit 508. For example, processes according to the sequence described in the above-described embodiment are executed.

A random access memory (RAM) 503 stores programs, data, and the like to be executed by the CPU 501. The CPU 501, the ROM 502, and the RAM 503 are connected to each other by a bus 504.

The CPU 501 is connected to an input-output interface 505 via the bus 504, and to the input-output interface 505, an input unit 506 that includes various switches, a keyboard, a touch panel, a mouse, a microphone, a status data acquisition unit such as a sensor, a camera, a GPS, and the like, and an output unit 507 that includes a display, a speaker, and the like are connected.

Note that the input information from the sensor 521 is also input to the input unit 506.

Furthermore, the output unit 507 also outputs drive information for the drive unit 522 of the moving apparatus.

The CPU 501 inputs a command, status data, and the like input from the input unit 506, executes various processes, and outputs a processing result to the output unit 507, for example.

The storage unit 508 connected to the input-output interface 505 includes, for example, a hard disk, and the like and stores programs executed by the CPU 501 and various data. A communication unit 509 functions as a data communication transmitting-receiving unit via a network such as the Internet or a local area network, and communicates with an external device.

A drive 510 connected to the input-output interface 505 drives a removable medium 511 such as a magnetic disk, an optical disk, a magneto-optical disk, or a semiconductor memory such as a memory card, and executes recording or reading of data.

7. Summary of Configuration of Present Disclosure

As described above, the embodiment of the present disclosure has been described in detail with reference to the specific embodiment. However, it is obvious that those skilled in the art can make modifications and substitutions of the embodiment without departing from the gist of the present disclosure. In other words, the present invention has been disclosed in the form of exemplification, and should not be interpreted in a limited manner. In order to determine the gist of the present disclosure, the claims should be taken into consideration.

Note that the technology disclosed in the present description can take the following configurations.

(1) An information processing apparatus including:

a takeover abandonment input unit that inputs, to a system, takeover refusal information for a driver to refuse driving takeover to change automatic driving of a vehicle to manual driving; and a data processing unit that executes an evacuation process of an automatic driving vehicle in response to an input from the takeover abandonment input unit.

(2) The information processing apparatus according to (1), in which the data processing unit generates options of an evacuation process that is selectable before the takeover refusal information is input, and executes an evacuation process selected from the options after the takeover refusal information is input.

(3) The information processing apparatus according to (1) or (2), in which the data processing unit executes as the evacuation process, any one of deceleration, stop, or movement to a traveling road other than a current traveling road or a parking lot or a roadside zone.

(4) The information processing apparatus according to any one of (1) to (3), in which the data processing unit selects and executes an evacuation process that has little influence on surroundings.

(5) The information processing apparatus according to any one of (1) to (4), in which the data processing unit inputs observation information of the driver and determines whether or not it is difficult for the driver to return to manual driving by a specified time on the basis of the observation information that has been input, and executes an evacuation process of an automatic driving vehicle in a case where it is determined that it is difficult to return.

(6) The information processing apparatus according to any one of (1) to (5), in which the data processing unit acquires traveling road information of the vehicle and uses the traveling road information that has been acquired to generate an option that is executable as the evacuation process.

(7) The information processing apparatus according to (6), in which the traveling road information is information acquired from a local dynamic map (LDM) or communication information acquired from a leading vehicle.

(8) The information processing apparatus according to any one of (1) to (7), in which the data processing unit inputs observation information of the driver, and calculates a necessary time for the driver to return to manual driving on the basis of the observation information that has been input.

(9) The information processing apparatus according to (8), in which the data processing unit determines an execution timing of a manual driving return request notification to the driver according to the necessary time.

(10) The information processing apparatus according to (8) or (9), in which the data processing unit evaluates return quality of the driver to manual driving on the basis of a response of the driver to the manual driving return request notification.

(11) The information processing apparatus according to (10), in which the data processing unit determines a risk that the driver is not able to return to manual driving until reaching a switching point that is a start position of a manual driving section on the basis of an evaluation result of the return quality.

(12) The information processing apparatus according to (11), in which in a case where the data processing unit determines that there is a high risk that the driver is not able to return to manual driving until reaching the switching point that is the start position of the manual driving section, the data processing unit executes an evacuation process of the automatic driving vehicle.

(13) The information processing apparatus according to any one of (1) to (12), in which in a case where the driver inputs takeover abandonment refusal information to manual driving to the system, the data processing unit causes an input history of the takeover abandonment refusal information to be recorded in a storage unit in order to impose a penalty on the driver.

(14) A moving apparatus that is switchable between automatic driving and manual driving, the moving apparatus including:

a driver information acquisition unit that acquires driver information of a driver of the moving apparatus;

an environmental information acquisition unit that acquires surrounding information of the moving apparatus;

a takeover abandonment input unit that inputs, to a system, takeover refusal information for a driver to refuse driving takeover to change automatic driving of the moving apparatus to manual driving; and a data processing unit that checks a switching point from automatic driving to manual driving on the basis of information acquired by the environmental information acquisition unit and executes a manual driving return request notification to the driver before reaching the switching point, in which the data processing unit further executes an evacuation process of an automatic driving vehicle in response to an input from the takeover abandonment input unit.

(15) The moving apparatus according to (14), in which the data processing unit generates options of an evacuation process that is selectable before the takeover refusal information is input, and executes an evacuation process selected from the options after the takeover refusal information is input.

(16) The moving apparatus according to (14) or (15), in which the data processing unit executes as the evacuation process, any one of deceleration, stop, or movement to a traveling road other than a current traveling road or a parking lot or a roadside zone.

(17) The moving apparatus according to any one of (14) to (16), in which the data processing unit selects and executes an evacuation process that has little influence on surroundings.

(18) An information processing method to be executed in an information processing apparatus, the method including executing, by a data processing unit:

a step of detecting an input to a system of takeover refusal information for a driver to refuse driving takeover to change automatic driving of a vehicle to manual driving; and a step of executing an evacuation process of an automatic driving vehicle in response to an input of the takeover abandonment information.

(19) An information processing method to be executed in a moving apparatus, the moving apparatus being switchable between automatic driving and manual driving, the method including:

a driver information acquisition step of acquiring, by a driver information acquisition unit, driver information of a driver of the moving apparatus;

an environmental information acquisition step of acquiring, by an environmental information acquisition unit, surrounding information of the moving apparatus; and by a data processing unit, executing a step of checking a switching point from automatic driving to manual driving on the basis of information acquired by the environmental information acquisition unit and executing a manual driving return request notification to the driver before reaching the switching point, a step of detecting an input to a system of takeover refusal information for a driver to refuse driving takeover to change automatic driving of the moving apparatus to manual driving, and a step of executing an evacuation process of an automatic driving vehicle in response to an input of the takeover abandonment information.

(20) A program for causing an information processing apparatus to execute information processing including executing, by a data processing unit:

a step of detecting an input to a system of takeover refusal information for a driver to refuse driving takeover to change automatic driving of a vehicle to manual driving; and a step of executing an evacuation process of an automatic driving vehicle in response to an input of the takeover abandonment information.

Furthermore, a series of processes described in the description can be executed by hardware, software, or a combined configuration of the both. In a case of executing processes by software, a program recording a processing sequence can be installed and run on a memory in a computer incorporated in dedicated hardware, or the program can be installed and run on a general-purpose computer capable of executing various processes. For example, the program can be recorded in advance on a recording medium. In addition to being installed on a computer from a recording medium, the program can be received via a network such as a local area network (LAN) or the Internet and installed on a recording medium such as an internal hard disk.

Note that the various processes described in the description are not only executed in time series according to the description, but may be executed in parallel or individually according to processing capability of the apparatus that executes the processes or as necessary. Furthermore, a system in the present description is a logical set configuration of a plurality of devices, and is not limited to one in which devices with respective configurations are in the same housing.

INDUSTRIAL APPLICABILITY

As described above, according to the configuration of one embodiment of the present disclosure, a configuration is achieved in which evacuation control such as deceleration or stop of a vehicle is executed in response to an application from the driver of the vehicle for refusal of switching to manual driving.

Specifically, for example, It is a moving apparatus that is switchable between automatic driving and manual driving and includes a driver information acquisition unit that acquires driver information of a driver of the moving apparatus, an environmental information acquisition unit that acquires surrounding information of the moving apparatus, a takeover abandonment input unit that inputs, to a system, takeover refusal information for a driver to refuse driving takeover to change automatic driving of the moving apparatus to manual driving, and a data processing unit that checks a switching point from automatic driving to manual driving on the basis of information acquired by the environmental information acquisition unit and executes a manual driving return request notification to the driver before reaching the switching point. The data processing unit executes an early planned evacuation process of the vehicle in response to a takeover abandonment input while minimizing the influence on other road users, while avoiding excessive dependent use of the driver on the system.

With this configuration, a configuration is achieved in which evacuation control such as deceleration or stop of a vehicle is executed in response to an application from the driver of the vehicle for refusal of switching to manual driving.

REFERENCE SIGNS LIST

10 Automobile
11 Data processing unit
12 Driver information acquisition unit
13 Environmental information acquisition unit
14 Communication unit
15 Notification unit
20 Driver
30 Server
50 Information terminal
100 Moving apparatus 101 Input unit
102 Data acquisition unit
103 Communication unit
104 In-vehicle device
105 Output control unit
106 Output unit
107 Drive system control unit
108 Drive system
109 Body system control unit
110 Body system
111 Storage unit
112 Automatic driving control unit
121 Communication network
131 Detection unit
132 Own position estimation unit
133 Situation analysis unit
134 Planning unit
135 Operation control unit
141 Outside-vehicle information detection unit
142 Inside-vehicle information detection unit
143 Vehicle state detection unit
151 Map analysis unit
152 Traffic rule recognition unit
153 Situation recognition unit
154 Situation prediction unit
155 Safety determination unit
161 Route planning unit
162 Action planning unit
163 Operation planning unit
171 Emergency avoidance unit
172 Acceleration-deceleration control unit
173 Direction control unit
200 Moving apparatus
201 Driving history information acquisition unit
202 Biological information acquisition unit
203 Posture information acquisition unit
204 LDM-vehicle dependent return system request acquisition unit
205 Return notification, warning timing calculation unit
206 Return prediction response delay evaluation unit
207 Return delay measure processing unit
208 Return time grace determination unit
209 Emergency process execution unit
210 Return delay penalty generation, recording unit
211 Driver return characteristic dictionary
212 Return characteristic learning unit
221 Takeover abandonment input unit
250 Data processing unit
331 Optimum return notification point calculation unit
332 Return characteristic dictionary
333 Evacuation process candidate selection unit
334 Budget management unit
335 Early evacuation control execution unit
336 Penalty generation, recording unit
501 CPU
502 ROM
503 RAM
504 Bus
505 Input-output interface
506 Input unit
507 Output unit
508 Storage unit
509 Communication unit
510 Drive
511 Removable medium
521 Sensor
522 Drive unit

71

The invention claimed is:

1. An information processing apparatus comprising:
at least one processor configured to:
obtain, from at least one input device disposed in a vehicle having an automatic driving mode and a manual driving mode, takeover refusal information indicative of a driver failing to takeover to change the automatic driving mode of the vehicle to the manual driving mode;
generate a plurality of options corresponding to a respective plurality of evacuation processes of the vehicle;
output the plurality of options for display to the driver and/or a passenger of the vehicle;
receive input indicating a selected option of the plurality of options; and
cause the vehicle to execute, in response to the takeover refusal information, an evacuation process corresponding to the selected option.

2. The information processing apparatus according to claim 1, wherein:
the evacuation process comprises any one of:
a deceleration;
a stop; or
a movement to:
a traveling road other than a current traveling road;
a parking lot; and/or
a roadside zone.

3. The information processing apparatus according to claim 1, wherein:
outputting the plurality of options for display comprises arranging the plurality of options with a default option configured to be displayed first;
the input indicating the selected option comprises an elapsing of a predetermined waiting time; and
the selected option is the default option.

4. The information processing apparatus according to claim 1, wherein:
the at least one processor is configured to obtain the takeover refusal information by:
receiving observation information of the driver from the at least one input device; and
determining, based on the observation information, that the driver cannot return to manual driving by a specified time.

5. The information processing apparatus according to claim 1, wherein:
the at least one processor is configured to generate options of the plurality of options based on traveling road information.

6. The information processing apparatus according to claim 5, wherein:
the traveling road information comprises:
information acquired from a local dynamic map (LDM); and/or
communication information acquired from a leading vehicle.

7. The information processing apparatus according to claim 1, wherein:
the at least one processor is further configured to:
receive observation information of the driver; and
calculate a necessary time for the driver to return to manual driving based on the observation information.

8. The information processing apparatus according to claim 7, wherein:

the at least one processor is further configured to determine an execution timing of a manual driving return request notification to the driver based on the necessary time.

9. The information processing apparatus according to claim 8, wherein:
the at least one processor is further configured to evaluate a return quality of the driver based on a response of the driver to the manual driving return request notification.

10. The information processing apparatus according to claim 9, wherein:
the at least one processor is further configured to determine a risk that the driver is not able to return to manual driving until reaching a switching point that is a start position of a manual driving section based on an evaluation result of the return quality.

11. The information processing apparatus according to claim 10, wherein:
the at least one processor is configured to determine the selected option based on a determination that the driver is not able to return to manual driving until reaching the switching point that is the start position of the manual driving section.

12. The information processing apparatus according to claim 1, wherein:
the at least one processor is further configured to cause an input history of the takeover refusal information to be recorded in a storage unit in order to impose a penalty on the driver based on the driver failing to takeover.

13. The information processing apparatus of claim 1, wherein the at least one processor is further configured to dynamically update the plurality of options based on progress of the vehicle in the automatic driving mode.

14. A moving apparatus that is switchable between an automatic driving mode and a manual driving mode, the moving apparatus comprising:
at least one driver sensor configured to acquire driver information of a driver of the moving apparatus;
at least one environmental sensor configured to acquire surrounding information of the moving apparatus; and
at least one processor configured to:
determine a switching point from the automatic driving mode to the manual driving mode based on the surrounding information;
execute a manual driving return request notification to the driver before reaching the switching point,
obtain, from the at least one driver sensor, driver information indicative of the driver failing to takeover to change the automatic driving mode of the moving apparatus to the manual driving mode;
generate a plurality of options corresponding to a respective plurality of evacuation processes of the moving apparatus;
output the plurality of options for display to the driver and/or a passenger of the moving apparatus;
receive input indicating a selected option of the plurality of options; and
cause the moving apparatus to execute an evacuation process corresponding to the selected option.

15. The moving apparatus according to claim 14, wherein:
the evacuation process comprises any one of:
a deceleration;
a stop; or
a movement to:
a traveling road other than a current traveling road;
a parking lot; and/or
a roadside zone.

16. The moving apparatus according to claim 14, wherein:

outputting the plurality of options for display comprises
  arranging the plurality of options with a default option
  configured to be displayed first;

the input indicating the selected option comprises an
  elapsing of a predetermined waiting time; and the selected option is the default option.

17. An information processing method to be executed in
an information processing apparatus, the information pro-
cessing method comprising:

obtaining, from at least one input device disposed in a
  vehicle having an automatic driving mode and a
  manual driving mode, takeover refusal information
  indicative of a driver failing to takeover to change the
  automatic driving mode of the vehicle to the manual
  driving mode;

generating a plurality of options corresponding to a
  respective plurality of evacuation processes of the
  vehicle;

outputting the plurality of options for display to the
  driver and/or a passenger of the vehicle;

receiving input indicating a selected option of the
  plurality of options; and causing the vehicle to execute, in response to the
  takeover refusal information, an evacuation process
  corresponding to the selected option.

* * * * *